(12) United States Patent
Okuno

(10) Patent No.: US 7,982,943 B2
(45) Date of Patent: Jul. 19, 2011

(54) LIGHT SOURCE APPARATUS

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/012,377

(22) Filed: Jan. 24, 2011

(65) Prior Publication Data

US 2011/0116282 A1   May 19, 2011

Related U.S. Application Data

(62) Division of application No. 11/883,364, filed as application No. PCT/JP2007/050591 on Jan. 17, 2007.

(30) Foreign Application Priority Data

| Jan. 20, 2006 | (JP) | 2006-013013 |
| Jan. 20, 2006 | (JP) | 2006-013014 |
| Jan. 20, 2006 | (JP) | 2006-013021 |

(51) Int. Cl.
*H01S 3/10* (2006.01)
*G02F 1/35* (2006.01)

(52) U.S. Cl. ............ 359/327; 359/326; 359/341.1; 359/341.3; 372/6; 372/25

(58) Field of Classification Search .......... 359/326–332, 359/341.1, 341.3; 372/6, 25; 385/122
See application file for complete search history.

(56) References Cited

U.S. PATENT DOCUMENTS

| 5,960,146 A | 9/1999 | Okuno et al. |
| 6,618,531 B1 | 9/2003 | Goto et al. |
| 6,717,963 B1 | 4/2004 | Foursa |
| 6,813,429 B2 | 11/2004 | Price et al. |
| 7,085,041 B2 | 8/2006 | Okuno |
| 7,181,115 B2 * | 2/2007 | Aikawa et al. ............... 385/123 |

(Continued)

FOREIGN PATENT DOCUMENTS

JP   11-160744   6/1999

(Continued)

OTHER PUBLICATIONS

International Search Report issued in International Application No. PCT/JP2007/050591, dated Feb. 27, 2007.

(Continued)

*Primary Examiner* — Daniel Petkovsek
(74) *Attorney, Agent, or Firm* — McDermott Will & Emery LLP

(57) ABSTRACT

The present invention relates to a light source apparatus that has a base structure capable of generating SC light and further having a structure that enables the shaping of the spectral waveform of the SC light, power adjustment of the SC light, or adjustment of the frequency of repetition of the pulse train that contains the SC light. For example, a light source apparatus that enables shaping of spectral waveforms comprises a seed light source that emits seed light which is a pulse train or continuous light; an optical fiber that generates SC light from the seed light, and spectrum shaping means for completely or partially changing the spectral waveform of the SC light. The shaping of the spectral waveform changes the maximum power of the seed light by changing the optical coupling efficiency of the seed light source and optical fiber, for example, thereby suitably deforms the spectrum of the SC light.

1 Claim, 39 Drawing Sheets

U.S. PATENT DOCUMENTS

| | | |
|---|---|---|
| 7,346,247 B2 | 3/2008 | Goto et al. |
| 2002/0131693 A1 | 9/2002 | Islam et al. |
| 2003/0043451 A1 | 3/2003 | Kato et al. |
| 2003/0118349 A1 | 6/2003 | Ohara et al. |
| 2005/0012987 A1 | 1/2005 | Okuno |

FOREIGN PATENT DOCUMENTS

| | | |
|---|---|---|
| JP | 2003-167281 | 6/2003 |
| JP | 2004-527001 | 9/2004 |
| JP | 2005-10212 | 1/2005 |
| JP | 2006-293215 | 10/2006 |

OTHER PUBLICATIONS

Okuno, T., et al., "Wideband-NIR pulse-laser source utilizing nonlinear effects in optical fibers," Proceedings of the 21st NIR Forum organized by Japan Council of NIR Spectroscopy (JCNIRS), 4 pages, Nov. 9, 2005.

Yamamoto, T., et al., "270-360 GHz tunable beat signal light generator for photonic local oscillator," Electronic Letters, Jul. 18, 2002, 2 pages, vol. 38, No. 15.

Oguri, A., et al., "Repetition-rate and wavelength tunable optical pulse source by using comb-like profiled fiber compression and supercontinuum generation," The Institute of Electronics, Information and Communication Engineers, IEICE Technical Report, OCS2005-92 (Jan. 2006), pp. 1-10, Jan. 2006.

International Preliminary Report on Patentability and Written Opinion of the International Searching Authority issued in International Application No. PCT/JP2007/050591, dated Jul. 31, 2008.

Chinese Office Action, with English translation, issued in Chinese Patent Application No. 200780002590.X, mailed Jan. 15, 2010.

T. Okuno et al., "Generation of the Ultra-Broad-Band Supercontinuum by Dispersion-Flattened and Decreasing Fiber," IEEE Photonics Technology Letters, IEEE Service Center, Piscataway, NJ, US, vol. 10, No. 1, ISSN: 1041-1135, Jan. 1, 1998.

European Search Report issued in European Patent Application No. 07706906.0 dated Mar. 25, 2010.

Chinese Office Action, w/ English translation thereof, issued in Chinese Patent Application No. CN 200780002590.X dated May 7, 2010.

* cited by examiner

Fig.5
(a)
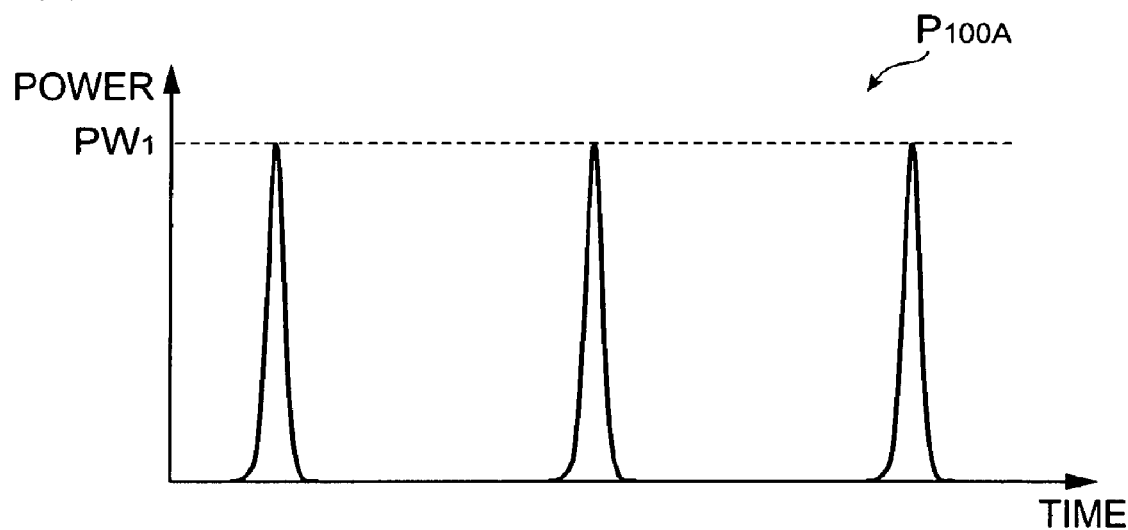
(b)
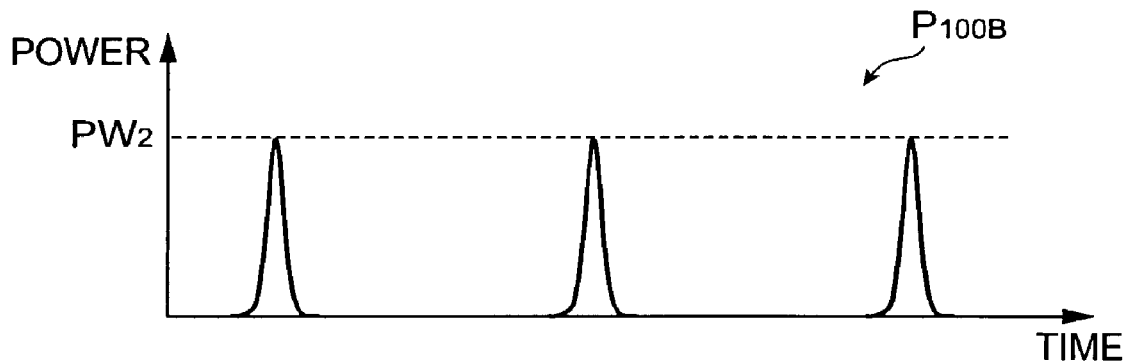

Fig.8
(a)
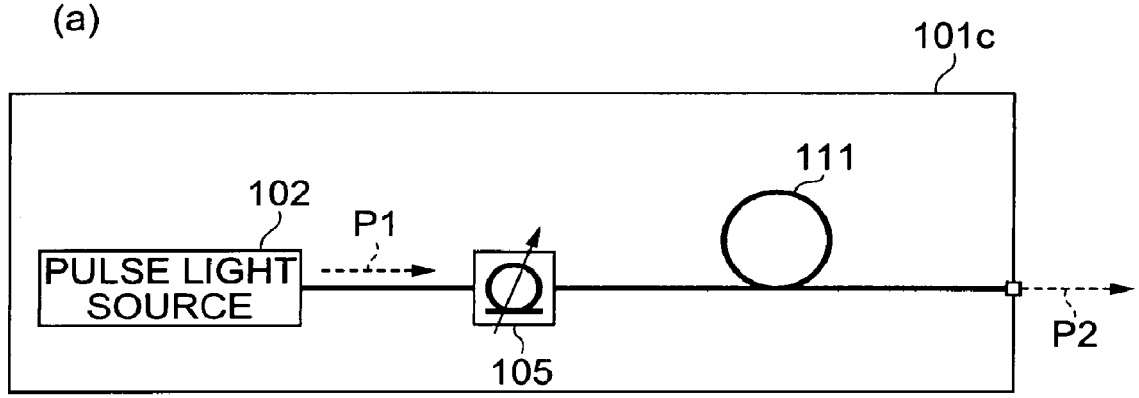
(b)
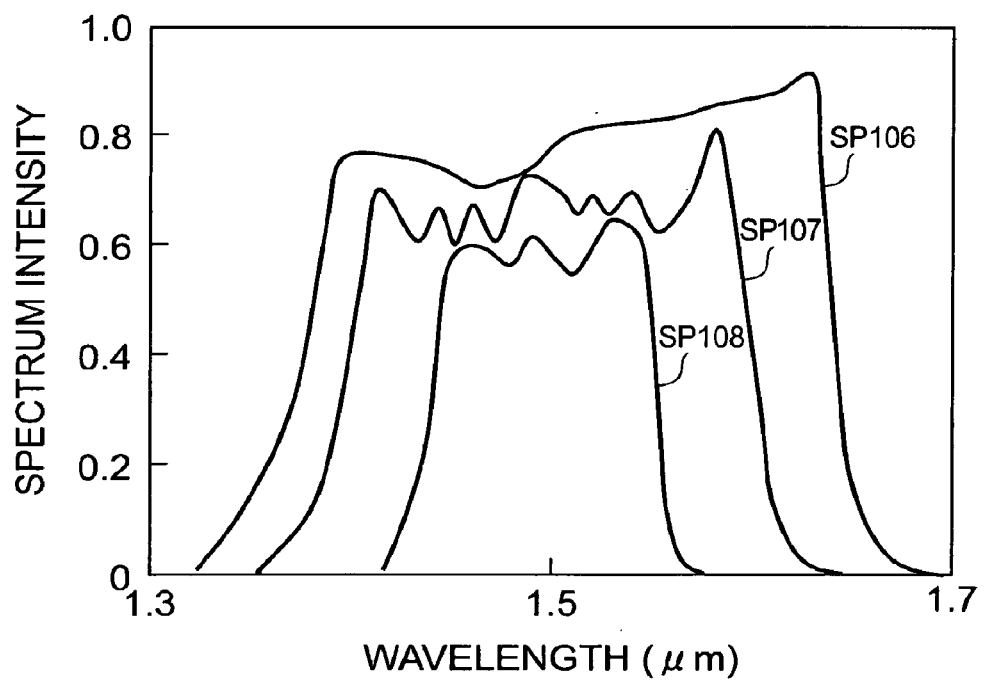

*Fig.10*
(a)
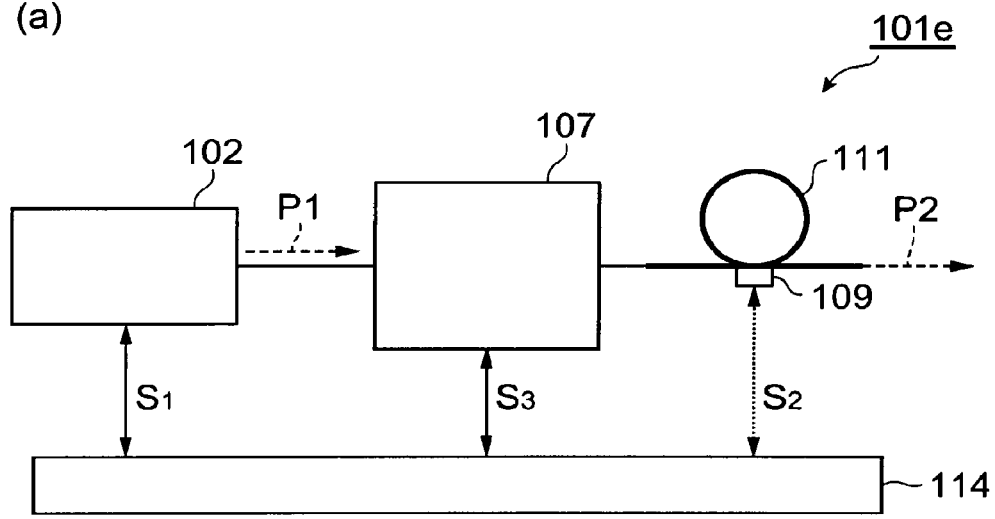
(b)
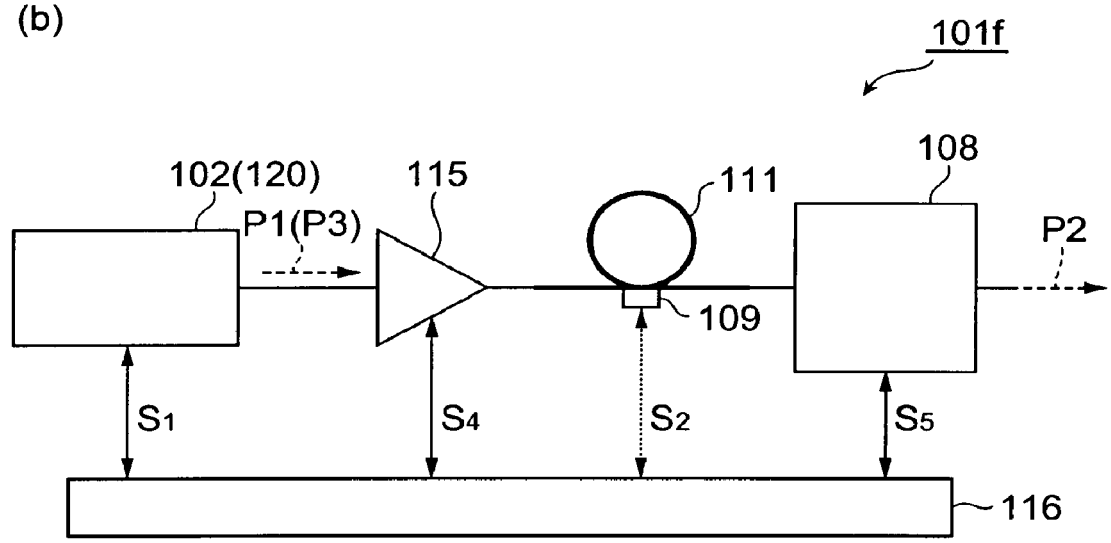

*Fig.24*
(a)
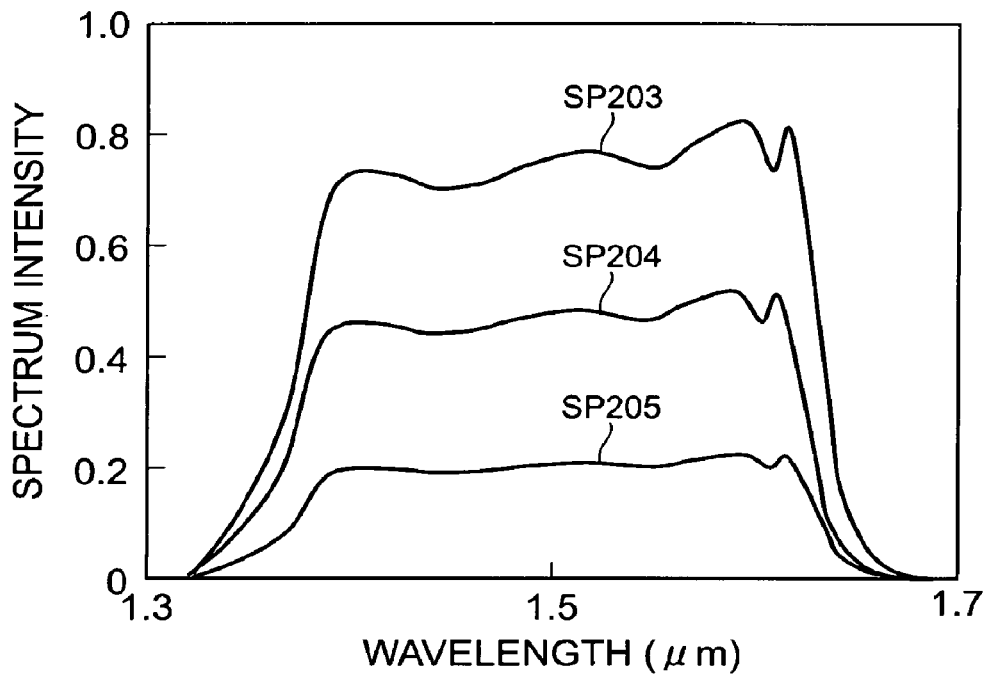
(b)
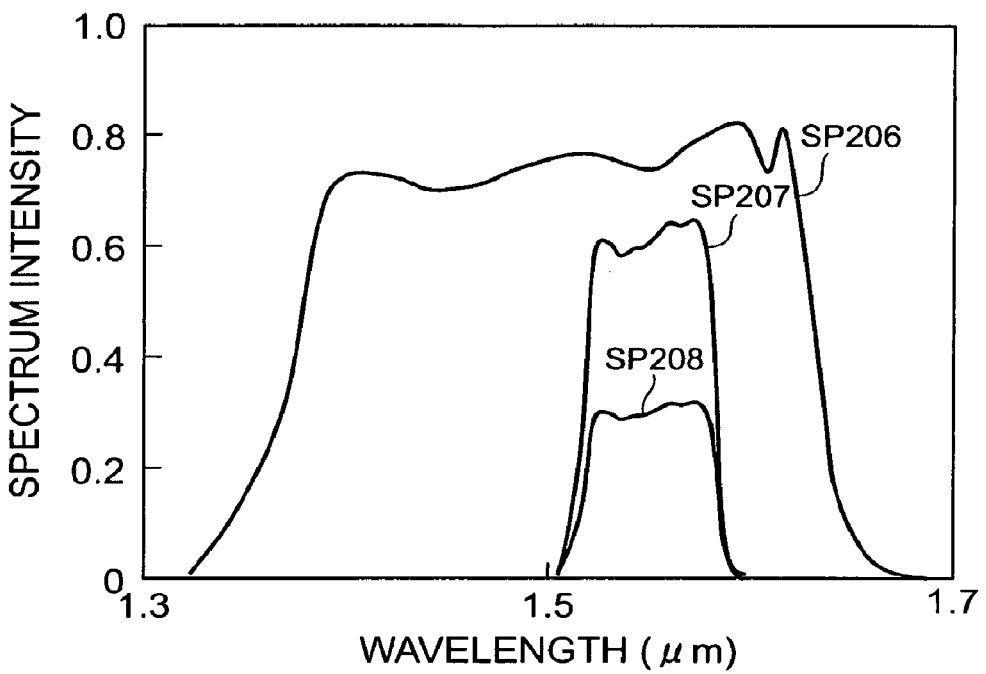

Fig.25
(a)
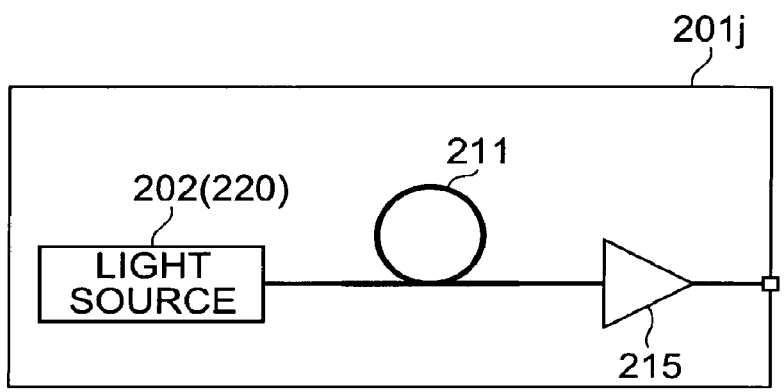
(b)
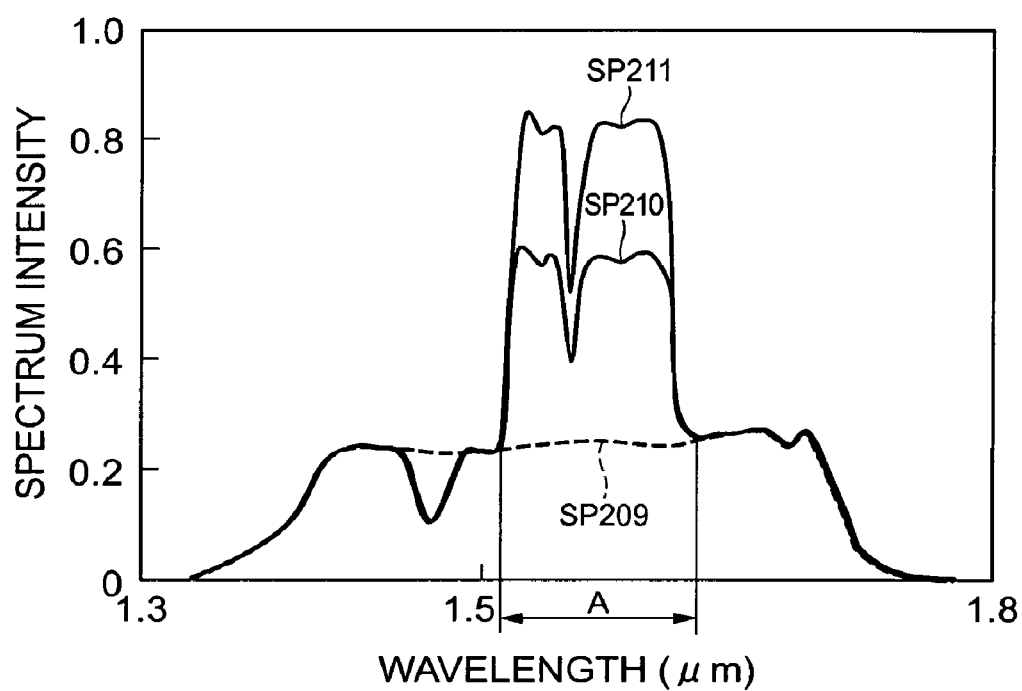

*Fig.26*
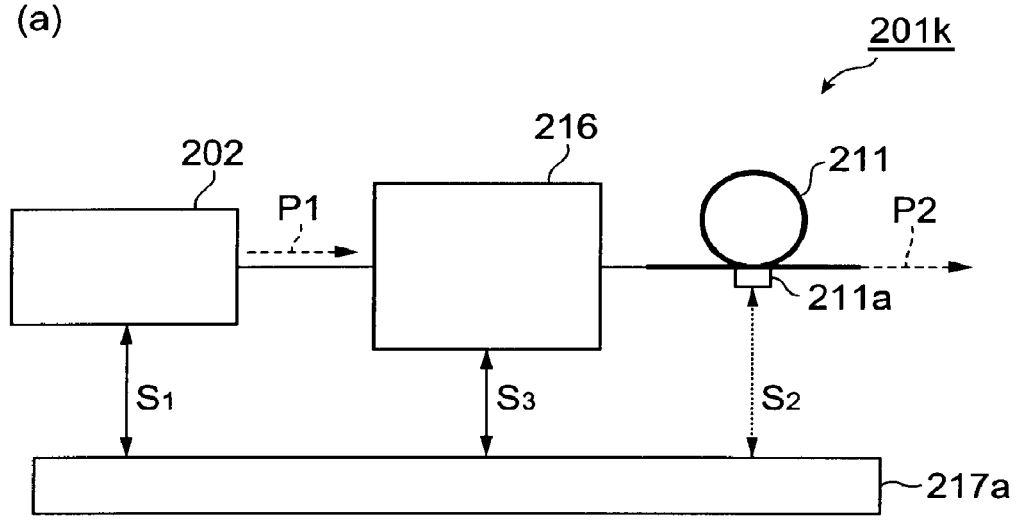
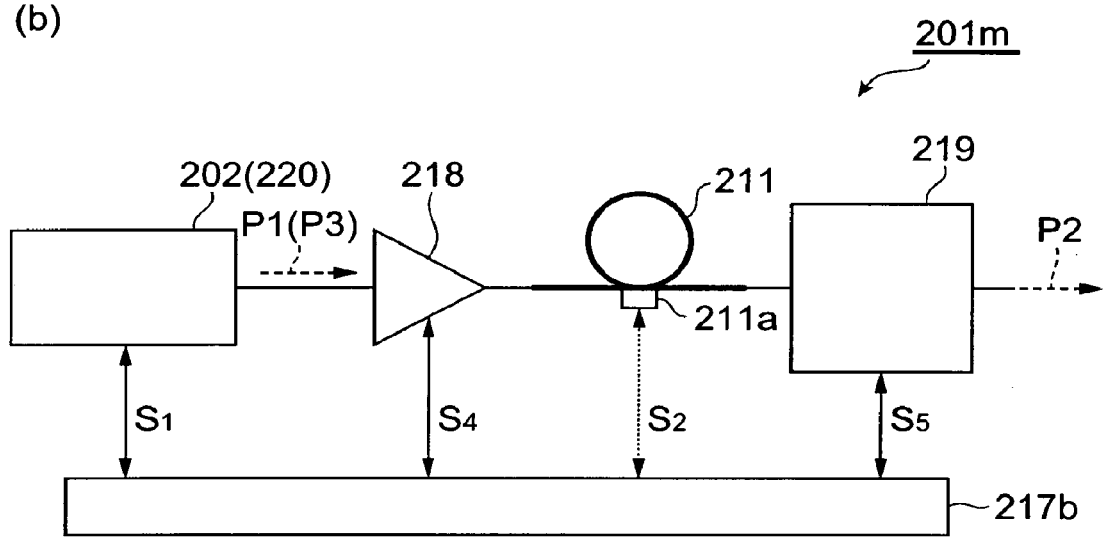

Fig.32
(a)
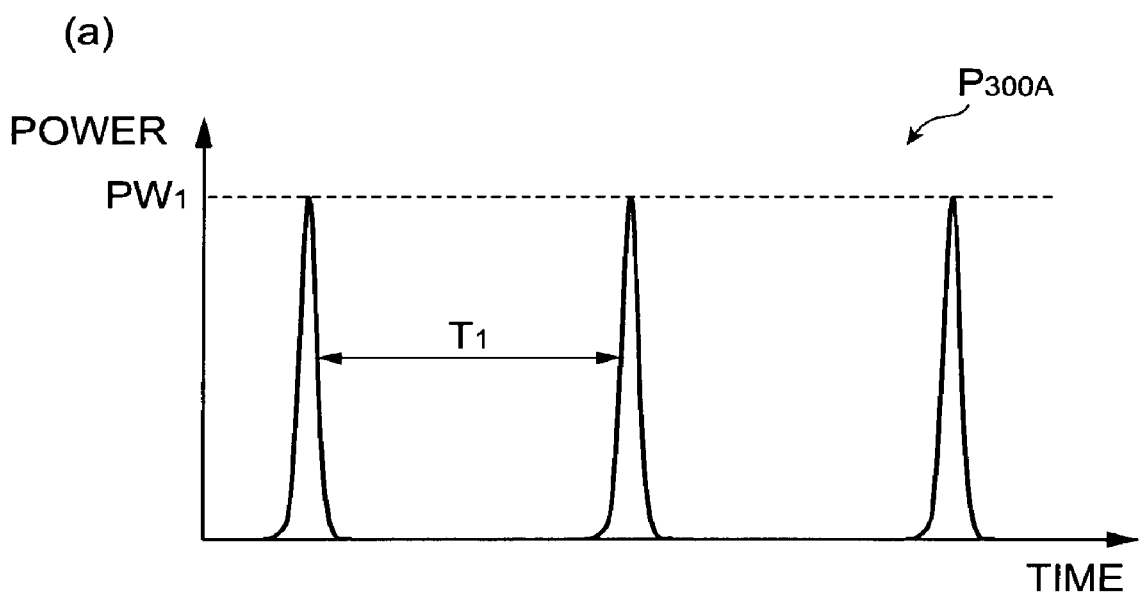
(b)
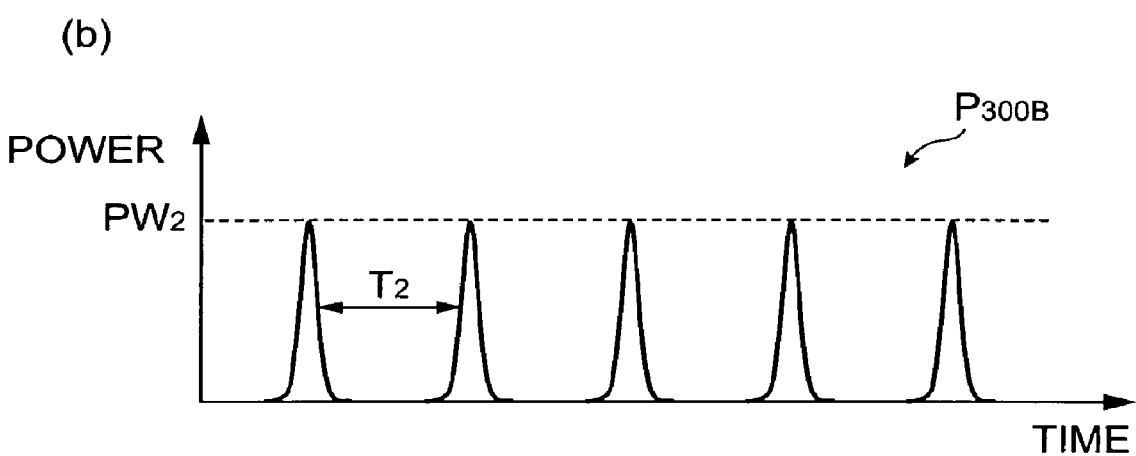

*Fig.37*
(a)
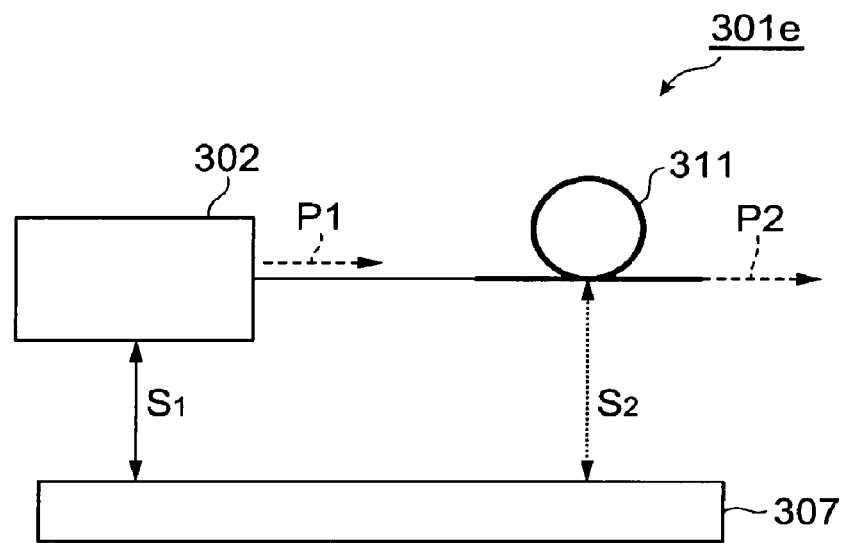
(b)
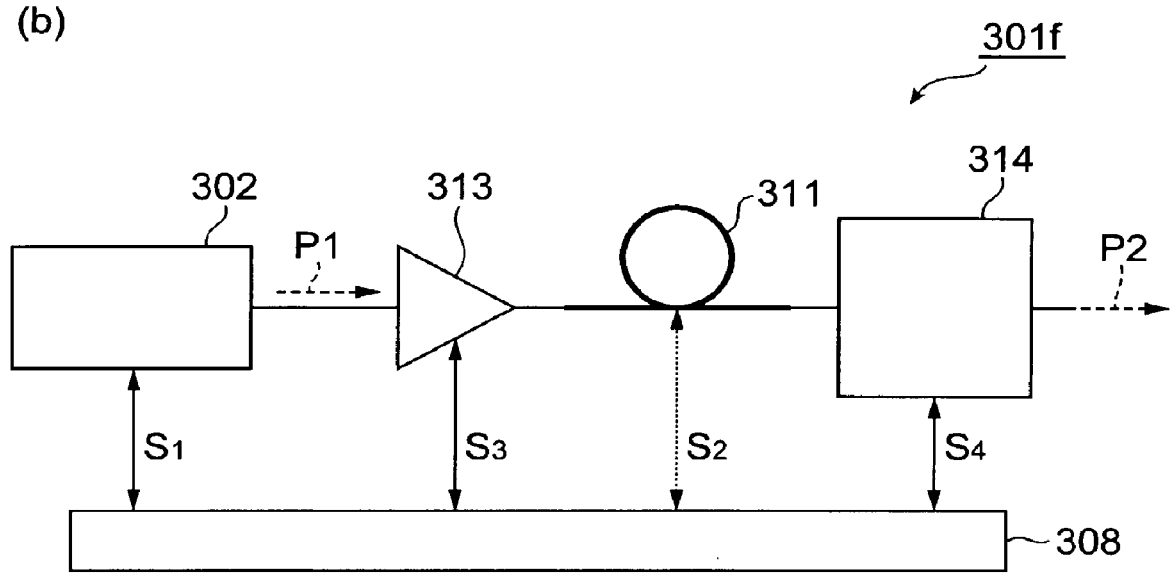

LIGHT SOURCE APPARATUS

RELATED APPLICATIONS

This application is a Divisional of U.S. patent application Ser. No. 11/883,364, filed on May 16, 2008, which is a U.S. National Phase under 35 U.S.C. §371 of International Application No. PCT/JP2007/050591, filed on Jan. 17, 2007 which in turn claims the benefit of Japanese Application No. 2006-013013, Japanese Patent Application No. 2006-013014 and Japanese Patent Application No. 2006-013021 filed on Jan. 20, 2006, the disclosures of which Applications are incorporated by reference herein.

TECHNICAL FIELD

The present invention relates to a light source apparatus for outputting Supercontinuum (SC) light.

BACKGROUND ART

An SC light source, which is one example of a wideband light source, is an important light source that is expected to be applied to a variety of fields of application from the standpoint of the high output characteristic, wide range characteristic, and spectrum flatness. Although a variety of constitutions have been proposed as such SC light source apparatus, a constitution that generates SC light within an optic fiber is generally widely used on account of being straightforward and allowing an increase in the interaction length and because spectrum control is also straightforward.

Further, a coherent wideband light source disclosed in Patent Document 1 and a wideband infrared pulse laser light source disclosed in Non-Patent Document 1 for example, are known as an SC light source apparatus of this kind.

Patent Document 1: Japanese Patent Application Laid-Open No. H11-160744

Non-Patent Document 1: Okuno and five others, "Wideband near infrared pulse laser light source that uses nonlinearity of optical fiber", Proceedings of the Twenty-first Near Infrared Forum, the Near infrared Society, November 2005, page 173

DISCLOSURE OF THE INVENTION

Problems that the Invention is to Solve

The present inventors have examined a conventional SC light source apparatus, and as a result, have discovered the following problems. That is, there are cases where a conventional SC light source apparatus is utilized while changing the spectral shape of SC light depending on the field of application.

For example, when the density of a plurality of materials are measured in order in infrared spectroscopy measurement, when the spectral shape of the SC light can be changed in accordance with the characteristic absorption wavelength for each of the plurality of materials, the measurement accuracy can be improved further. However, it has been difficult to completely or partially deform the spectral shape of the SC light in this way using a conventional SC light source apparatus.

When the object to be measured in the infrared spectroscopy measurement is a low scatterer, there are cases where there is the desire to increase the power of the SC light that is irradiated onto the object to be measured in order to accurately measure the scattered light. Conversely, in order to avoid a variation or degeneration in the object to be measured that results from interaction between the SC light and object to be measured, there are often cases where there is the desire to reduce the power of the SC light irradiated onto the object to be measured. Moreover, when the power of the SC light is adjusted, the ability to adjust the power while maintaining the spectral waveform of the SC light in order to maintain the measurement accuracy is desirable.

In addition, the generation of the SC light that utilizes the optical fiber is implemented by introducing strong pulse light (seed pulse light) to an optical fiber. Further, the SC light that exits the optical fiber is also pulse-shaped and the frequency of repetition thereof matches the frequency of repetition of the seed pulse light. Cyclical pulse-shaped SC light of this kind is used when checking the wavelength dependence of the fluorescence life of the object to be measured, for example. More particularly, if the frequency of repetition is equal to or less than 100 MHz, the energy per single pulse of the seed pulse light can be easily increased. For this reason, extremely wide-range SC light such as SC light with a bandwidth of 500 nm, for example, is obtained easily and is suitable when checking the wavelength dependence of the fluorescence life. However, in such cases, when the frequency of repetition of the pulse is fixed, irradiation with SC light at a cycle that corresponds to the lengths of the fluorescence lives of various objects to be measured cannot be expected. As a result, the measurement accuracy and measurement efficiency have been kept low in the case of conventional SC light source apparatuses.

The present invention has been developed to eliminate the problems described above. It is an object of the present invention to provide a light source apparatus that comprises a base structure that generates SC light and further comprises any of the following structures: a structure for completely or partially deforming the spectral shape of the emitted SC light, a structure for changing the power of the light while maintaining the spectral waveform of the emitted SC light, and a structure for optionally changing the frequency of repetition of the pulse train containing the SC light.

Means for Solving the Problems

The light source apparatus according to the present invention comprises, as the base structure, a seed light source that emits seed light which is an optical pulse train or continuous light, and an optical fiber for generating SC light the spectral width of which is enlarged by the seed light.

The light source apparatus according to the first embodiment comprises a seed light source, an optical fiber used for SC light generation, and spectrum shaping means for completely or partially deforming the spectral waveform of the SC light. Further, the light source apparatus according to the first embodiment mainly has a first constitution that utilizes an optical pulse train as the seed light and a second constitution that utilizes continuous light as seed light.

In accordance with a light source apparatus of a first constitution according to the first embodiment that utilizes an optical pulse train as seed light, the spectral shape of the SC light can be completely or partially deformed by the spectrum shaping means. Accordingly, when the densities of a plurality of materials are measured in sequence in infrared spectroscopy measurement, for example, the spectral shape of the SC light can be changed in accordance with the absorption wavelength that is characteristic to each of the plurality of materials and the measurement accuracy improves further.

Furthermore, in the case of the light source apparatus of the first constitution according to the first embodiment, the spectrum shaping means may also change the spectral shape of the SC light by changing the maximum power of the respective pulses contained in the optical pulse train. Accordingly, it is possible to expand or reduce the spectral width of the SC light and change the wavelength dependence of the spectrum intensity.

In the case of the light source apparatus of the first constitution according to the first embodiment, the spectrum shaping means may also change the maximum power of the respective pulses contained in the optical pulse train by changing the output power of the excitation laser light source contained in the seed light source. The output power of the excitation laser light source can be easily controlled by means of the current amount that is supplied to the excitation laser light source. Therefore, according to the light source apparatus of the first constitution, the maximum power of the respective pulses contained in the optical pulse train can be easily changed by using one parameter such as the current amount of the excitation laser light source.

In the case of the light source apparatus of the first constitution according to the first embodiment, the spectrum shaping means may also comprise an optical amplifier having a variable gain that is optically coupled between the seed light source and optical fiber. The spectral shape of the SC light can be easily controlled by using the optical amplifier to amplify the maximum power of the respective pulses contained in the optical pulse train and optionally adjusting the gain. Further, in this case, because the output power of the seed light source may be constant, an optical pulse train is obtained stably. In addition, in this case, the spectral shape of the light entering the optical amplifier and the spectral shape of the light emitted by the optical amplifier may also be different from one another. In addition to the maximum power of the respective pulses of the optical pulse train entering the optical fiber, by also considering the change in the spectral shape of the optical pulse train of the optical amplifier, the spectral shape of the SC light can be approximated according to the desired shape.

In the case of the light source apparatus of the first constitution according to the first embodiment, the spectrum shaping means may also be an optical attenuator that has a variable attenuation rate and is disposed between the seed light source and the optical fiber. The maximum power of the respective pulses contained in the optical pulse train is attenuated by the optical attenuator and the maximum power of the respective pulses of the optical pulse train can be controlled without greatly affecting the spectral shape, temporal waveform, and noise characteristic of the optical pulse train by optionally adjusting the attenuation rate. Therefore, the spectral shape of the SC light is accurately controlled by the light source apparatus of the first constitution according to the first embodiment.

In the case of the light source apparatus of the first constitution according to the first embodiment, the spectrum shaping means may also change the optical coupling efficiency of the seed light source and optical fiber by utilizing the shift in the optical axis between the seed light source and optical fiber. The maximum power of the respective pulses contained in the optical pulse train is also changed by changing the optical coupling efficiency in this manner. This constitution also allows the spectral shape of the SC light to be suitably controlled and losses are kept low in comparison with a case where the optical amplifier and optical attenuator are applied.

In the case of the light source apparatus of the first constitution according to the first embodiment, the spectrum shaping means is disposed such that same is optically connected between the seed light source and optical fiber and the spectrum shaping of the SC light may also be changed by changing the temporal waveform of the respective pulses contained in the optical pulse train entering the optical fiber. The spectral shape of the SC light can also be suitably changed with such a constitution.

In the case of the light source apparatus of the first constitution according to the first embodiment, the spectrum shaping means is disposed such that same is optically connected between the seed light source and optical fiber and the spectral shape of the SC light may also be changed by changing the center wavelength of the optical pulse train entering the optical fiber. The spectral shape of the SC light is affected by the dispersion characteristic of the optical fiber and the center wavelength of the optical pulse train. Therefore, with the light source apparatus that comprises such spectrum shaping means, the spectral shape of the SC light can be suitably changed.

In the case of the light source apparatus of the first constitution according to the first embodiment, the spectrum shaping means is disposed such that same is optically connected between the seed light source and optical fiber and the spectral shape of the SC light may also be changed by changing the chirp characteristic of the optical pulse train entering the optical fiber. The spectral shape of the SC light can also be suitably changed by means of wavelength variation in the pulse, that is, by making the chirp characteristic variable.

In the case of the light source apparatus of the first constitution according to the first embodiment, the spectrum shaping means is disposed such that same is optically connected between the seed light source and optical fiber and the spectral shape of the optical pulse train entering the optical fiber may also be changed. The spectrum shaping of SC light can also be performed by the spectrum shaping means.

In the case of the light source apparatus of the first constitution according to the first embodiment, the spectrum shaping means is disposed such that same is optically connected between the seed light source and optical fiber and the spectral shape of the SC light may also be changed by changing the polarization direction of the optical pulse train entering the optical fiber. The spectral shape of the SC light is affected by the polarization dependence of the optical fiber and the polarization of the optical pulse train. Therefore, the light source apparatus that comprises such spectrum shaping means permits suitable changes to the spectral shape of SC light.

Meanwhile, the light source apparatus of the second constitution according to the first embodiment comprises a seed light source, an optical fiber used for SC light generation, and spectrum shaping means but utilizes continuous light as seed light. Even when the light introduced to the optical fiber is continuous light, provided that the continuous light has a relatively high power, SC light can be generated in the optical fiber. Further, according to the light source apparatus of the second constitution, the spectral waveform of the SC light can be completely or partially deformed by the spectrum shaping means. Hence, when the densities of a plurality of materials are measured in sequence in the infrared spectroscopy measurement, for example, spectrum shaping of the SC light is possible in accordance with the absorption wavelength characteristic to each of the plurality of materials and, therefore, the measurement accuracy improves.

In the case of the light source apparatus of the second constitution according to the first embodiment, the power of the continuous light introduced to the optical fiber is preferably 100 mW or more. In this case, the SC light of a bandwidth of a few dozen nm or more can be suitably generated in the optical fiber.

Further, in the case of the light source apparatus of the first or second constitution according to the first embodiment, a wavelength of 1550 nm is preferably contained in the wavelength range of the seed light (optical pulse train or continuous light) introduced to the optical fiber. In this case, efficient SC light generation in the low loss wavelength range of the optical fiber is possible.

In the case of the light source apparatus of the first or second constitution according to the first embodiment, the spectrum shaping means may also comprise a band-variable filter that is optically connected to the exit end of the optical fiber. In this case, the spectral shape of the SC light can be easily changed to a shape with the desired bandwidth.

In the case of the light source apparatus of the first or second constitution according to the first embodiment, the spectrum shaping means may also change the spectral shape of the SC light by controlling the temperature of the optical fiber. Because the dispersion characteristic of the optical fiber is suitably changed by such spectrum shaping means and, therefore, the spectral shape of the SC light can be suitably changed. Further, in this case, the spectrum shaping means may also include a temperature element that is provided in contact with the optical fiber. The temperature of the optical fiber can be easily controlled using this constitution.

Furthermore, in the case of the light source apparatus of the first or second constitution according to the first embodiment, the spectrum shaping means may also be a curved portion that has a variable curvature and is formed in an optical waveguide for emitting SC light outside the light source apparatus. Through the provision of such a curved portion in the SC light optical waveguide, the SC light can be afforded an optional bend loss and the spectral shape can be suitably changed.

The light source apparatus of the first or second constitution according to the first embodiment may also further comprise detection means for detecting the spectral shape of the SC light that is optically connected to the exit end of the optical fiber. As a result of the detection means detecting the spectral shape of the SC light, the spectrum shaping means can be feedback-controlled by utilizing information on the detected spectral shape. In this case, control of the spectrum shaping can be performed highly accurately and stably.

In the case of the light source apparatus of the first or second constitution according to the first embodiment, the spectral width of the SC light is preferably ten or more times the spectral width of the seed light (optical pulse train or continuous light) that is introduced to the optical fiber. When the spectral width of the SC light is ten or more times the spectral width of the optical pulse train (or continuous light), the deformation of the spectral shape of the SC light that arises from fluctuations in the optical pulse train and optical fiber characteristics (non-linearity) is striking. Hence, in such cases, it is desirable for the spectral shape of the SC light to be optionally deformed by the spectrum shaping means.

In the case of the light source apparatus of the first or second constitution according to the first embodiment, the spectrum intensity of the SC light at wavelength 1400 nm is preferably larger than the spectrum intensity of the SC light at a wavelength of 1600 nm by 3 dB or more. In cases where infrared spectroscopy measurement is performed on an organism or the like, for example, because a wavelength region close to wavelength 1400 nm is a wavelength region that is absorbed by moisture, by making the spectrum intensity of the SC light in this wavelength region 3 dB or more than the other wavelength region (wavelength of 1600 nm, for example), the measurement accuracy can be increased by avoiding a lack of spectral information for this wavelength region.

In the case of the light source apparatus of the first or second constitution according to the first embodiment, the spectrum intensity of the SC light close to a wavelength 1560 nm is preferably even. In cases where a change in the glucose density is measured by the infrared spectroscopy measurement, for example, the phenomenon whereby the absorption peak wavelength in a wavelength region close to the wavelength 1560 nm shifts in accordance with the glucose density is sometimes utilized. Here, if the spectrum intensity of the SC light close to wavelength 1560 nm is even, the change in the glucose density can be measured highly accurately. Further, the 'close to wavelength 1560 nm' mentioned here refers to a range no less than a wavelength 1530 nm and no more than 1590 nm, for example. Further, the 'spectrum intensity is even' refers to the fact that the difference between the maximum spectrum intensity in the wavelength range and the minimum spectrum intensity is equal to or less than 50% of the maximum spectral wavelength.

In the case of the light source apparatus of the first or second constitution according to the first embodiment, the spectrum shaping means may also control at least any of the fusion-bonding conditions of the light exit end and light entrance end of the optical fiber used for SC light generation. For example, the connection loss can be controlled by changing the conditions of the fusion-bonding of the output fiber of the seed light source and the optical fiber used for SC light generation. The spectral shape of the SC light emitted by the wavelength dependence of the loss at the fusion-bonding point can be deformed. Thus, if the fusion-bonding conditions are controlled at the fusion-bonding point of the light entrance end of the optical fiber used for SC light generation and the output fiber of the seed light source, a superior result is obtained. In other words, by optionally changing the fusion-bonding conditions, because the SC characteristic of the SC light generation optical fiber with respect to the seed light that is introduced changes due to the dispersion variation and loss wavelength dependence and so forth at the fusion bonding point between the SC light generation optical fiber and the output fiber, the spectral shape of the SC light emitted by the optical fiber used for the SC light generation can also be controlled to obtain the desired shape.

Thereafter, the light source apparatus according to the second embodiment comprises a seed light source, an optical fiber used for SC light generation, and power adjustment means for changing the power of the SC light. In addition, the light source apparatus according to the second embodiment mainly has a first constitution that utilizes an optical pulse train as the seed light and a second constitution that utilizes continuous light as the seed light.

In the case of the light source apparatus of the first constitution according to the second embodiment which utilizes an optical pulse train as the seed light, the power adjustment means changes the power of the SC light in a state where the spectral waveform of the SC light emitted by the light source apparatus is maintained in a partial or total wavelength region that is contained in the spectral bandwidth of the SC light. According to such a light source apparatus of the first constitution, the power of the SC light in the wavelength region can be optionally adjusted while maintaining the spectral waveform of the SC light in the wavelength region required for measurement by the power adjustment means. In this specification, 'the spectral waveform of the SC light' refers to the undulating state along the wavelength axis of the spectrum intensity characteristic of the SC light. In addition, 'the spectral waveform is maintained' refers to the fact that the ratio between the spectrum intensities prior to and after a change in each wavelength is substantially uniform over this wavelength range.

In the case of the light source apparatus of the first constitution according to the second embodiment, the power adjustment means may also change the power of the SC light by changing the point value of the power waveform of the respective pulses contained in the optical pulse train. In this case, the power of the SC light can be changed to the desired intensity while suitably maintaining the spectral waveform of the SC light.

In the case of the light source apparatus of the first constitution according to the second embodiment, the power adjustment means may also change the point value of the power waveform of the respective pulses contained in the optical pulse train by changing the output power of the excitation laser light source contained in the seed light source. The output power of the excitation laser light source can be easily controlled by the current amount supplied to the excitation laser light source. Hence, with the light source apparatus that changes the excitation power, the point value of the power waveform of the respective pulses contained in the optical pulse train can be easily changed by using one parameter such as the current amount of the excitation laser light source.

In the case of the light source apparatus of the first constitution according to the second embodiment, the power adjustment means may also comprise an optical amplifier having a variable gain that is disposed so as to be optically connected between the seed light source and optical fiber. The power of the SC light can be easily kept at the desired intensity by increasing the point value of the power waveform of the respective pulses contained in the optical pulse train by means of the optical amplifier and optionally adjusting the gain. In this case, the output power of the seed light source may also be constant and, therefore, the optical pulse train is obtained stably. The spectral shape introduced to the optical amplifier and the spectral shape of the light emitted by the optical amplifier may also be different from one another. By considering the changes to the spectral shape of the optical pulse train in the optical amplifier in addition to the point value of the power waveform of the respective pulses introduced to the optical fiber, the power of the SC light can be approximated accurately in accordance with the desired intensity while suitably maintaining the spectral shape of the SC light.

In the case of the light source apparatus of the first constitution according to the second embodiment, the power adjustment means may also comprise an optical attenuator that has a variable attenuation rate and is disposed so as to be optically connected between the seed light source and optical fiber. The point value of the power waveform of the respective pulses of the optical pulse train can be controlled without affecting the noise characteristic, the temporal waveform and the spectral shape of the optical pulse train by using the optical attenuator to attenuate the power of the respective pulses contained in the optical pulse train and optionally adjusting the attenuation rate. Therefore, with the light source apparatus to which the optical attenuator is applied, the power of the SC light can be approximated accurately according to the desired intensity.

In the case of the light source apparatus of the first constitution according to the second embodiment, the power adjustment means may also change the optical coupling efficiency of the seed light source and optical fiber by utilizing the shift in the optical axis between the seed light source and optical fiber. The point value of the power waveform of the respective pulses contained in the optical pulse train can be changed by changing the optical coupling efficiency of the seed light source and optical fiber. In this case, the power of the SC light can be suitably controlled and the light loss can be kept low in comparison with a case where an optical amplifier and an optical attenuator are applied.

In the case of the light source apparatus of the first constitution according to the second embodiment, the power adjustment means may also maintain the spectral shape of the SC light by changing the temporal waveform of the respective pulses contained in the optical pulse train introduced to the optical fiber. In this case, the power of the SC light can be changed while suitably maintaining the spectral waveform of the SC light.

In the case of the light source apparatus of the first constitution of the second embodiment, the power adjustment means may also maintain the spectral waveform of the SC light by changing the center wavelength of the optical pulse train introduced to the optical fiber. The spectral waveform of the SC light is affected by the center wavelength of the optical pulse train and the dispersion characteristic of the optical fiber. Hence, with this light source apparatus, which changes the center wavelength of the optical pulse train, the power of the SC light can be changed while suitably maintaining the spectral waveform of the SC light.

In the case of the light source apparatus of the first constitution according to the second embodiment, the power adjustment means may also maintain the spectral waveform of the SC light by changing the spectral shape of the optical pulse train introduced to the optical fiber. In this case, the power of the SC light can be changed while suitably maintaining the spectral waveform of the SC light.

In the case of the light source apparatus of the first constitution according to the second embodiment, the power adjustment means may also maintain the spectral waveform of the SC light by changing the polarization direction of the optical pulse train introduced to the optical fiber. The spectral waveform of the SC light is affected by the polarization dependence of the optical fiber and polarization of the optical pulse train. Hence, with this light source apparatus, which changes the polarization direction, the power of the SC light can be changed while suitably maintaining the spectral waveform of the SC light.

Meanwhile, a light source apparatus of a second constitution according to the second embodiment comprises a seed light source, an optical fiber used for SC light generation, and spectrum shaping means but utilizes continuous light as the seed light. The power adjustment means changes the power of the SC light in a state where the spectral waveform of the SC light emitted by the light source apparatus is maintained in a partial or complete wavelength region that is contained in the spectral bandwidth of the SC light. Even when the light introduced to the optical fiber is continuous light, SC light can be suitably generated in the optical fiber as long as the continuous light has a relatively high power. Further, with the light source apparatus, the power of the SC light in the wavelength region can be changed by the power adjustment means while maintaining the spectral waveform of the SC light of the wavelength region required for measurement.

In the case of the light source apparatus of the second constitution according to the second embodiment, the power of the continuous light introduced to the optical fiber is preferably 100 mW or more. In this case, SC light is suitably generated in the optical fiber.

Furthermore, in the case of the light source apparatus of the first or second constitution according to the second embodiment, the wavelength range of the continuous light (optical pulse train or continuous light) introduced to the optical fiber preferably includes wavelength 1550 nm. In this case, efficient SC light generation in the low loss wavelength region of the optical fiber is possible.

The light source apparatus of the first or second constitution according to the second embodiment may further comprise temperature control means for controlling the temperature of the optical fiber. This constitution can suitably change the dispersion characteristic of the optical fiber and, therefore, the power of the SC light can be approximated accurately according to the desired value while suitably further maintaining the spectral waveform of the SC light emitted by the light source apparatus. In addition, the temperature control means preferably comprises a temperature adjustment element that is provided in contact with the optical fiber. This is because the temperature of the optical fiber can be easily controlled.

In the case of the light source apparatus of the first or second constitution according to the second embodiment, the power adjustment means may also comprise a curved portion that has a variable curvature and is formed in the optical waveguide for emitting SC light outside the light source apparatus. By providing such a curved portion in the SC light optical waveguide, the SC light can be afforded an optional bend loss and the power of the SC light can be changed while suitably maintaining the spectral waveform of the SC light.

In the case of the light source apparatus of the first or second constitution according to the second embodiment, the power adjustment means may also comprise an optical attenuator that has a variable attenuation rate and is disposed so as to be optically connected to the light exit end of the optical fiber. With this light source apparatus, to which such an optical attenuator is applied, the power of the SC light can be changed while suitably maintaining the spectral waveform of the SC light by attenuating the SC light by using the optical attenuator for which the attenuation rate has a sufficiently low wavelength dependence, for example. Further, the difference between the maximum attenuation rate and the minimum attenuation rate of the optical attenuator in the wavelength region is preferably no more than 20 dB. This is because keeping the wavelength dependence of the loss constant with respect to a variable attenuation amount of 20 dB or more is not easy and an attenuator that achieves this comes at a high cost. In addition, it is sufficient to change the intensity by 20 dB in a normal application.

In the case of the light source apparatus of the first or second constitution according to the second embodiment, the power adjustment means may also comprise an optical amplifier that has a variable gain and is disposed so as to be optically connected to the exit end of the optical fiber. With this light source apparatus, to which an optical amplifier of this kind is applied, the power of the SC light can be changed while suitably maintaining the spectral waveform of the SC light by amplifying the SC light by using an optical amplifier for which the wavelength dependence of the attenuation rate is sufficiently low, for example.

In the case of the light source apparatus of the first or second constitution according to the second embodiment, the power adjustment means may also change the power of the SC light by changing the frequency of repetition of the SC light. In this case, the power of the SC light can be changed while suitably maintaining the spectral waveform of the SC light.

Even in a case where the seed light source emits an optical pulse train, the power adjustment means of the light source apparatus according to the second embodiment may also change the frequency of repetition of the SC light by changing the frequency of repetition of the optical pulse train introduced to the optical fiber. In this case, the frequency of repetition of the SC light can be changed while suitably maintaining the spectral waveform of the SC light. In addition, the frequency of repetition of the optical pulse train is preferably changed while maintaining the point value of the power waveform of the respective optical pulses contained in the optical pulse train introduced to the optical fiber.

The light source apparatus of the first or second constitution according to the second embodiment may further comprise detection means for detecting at least one of the SC light power and spectral shape which is optically connected to the exit end of the optical fiber. As a result of the detection means detecting at least one of the spectral shape and power of the SC light, the power adjustment means can be feedback-controlled by utilizing the detection result. In this case, the maintenance of the spectral waveform of the SC light and the control of the power of the SC light can be performed highly accurately and stably.

In the case of the light source apparatus of the first or second constitution according to the second embodiment, the spectral width of the SC light is preferably ten or more times the spectral width of the seed light introduced to the optical fiber (optical pulse train or continuous light). When the spectral width of the SC light is ten or more times the spectral width of the optical pulse train (or continuous light), the deformation of the spectral shape of the SC light arising from the fluctuations of the optical pulse train and the characteristic of the optical fiber (nonlinearity) is striking. Therefore, in such a case, the power of the SC light in the wavelength region required for measurement is desirably changed optionally by the power adjustment means.

Thereafter, a light source apparatus according to a third embodiment comprises a seed light source, an optical fiber used for SC light generation (an SC optical pulse train containing SC light is generated), and frequency adjustment means for changing the frequency of repetition of the SC optical pulse train. Further, the light source apparatus according to the third embodiment mainly has a first constitution that utilizes an optical pulse train as the seed light and a second constitution that utilizes continuous light as seed light.

According to a light source apparatus of a first constitution according to the third embodiment that utilizes an optical pulse train as seed light, the frequency of repetition of the SC optical pulse train can be optionally changed by the frequency adjustment means. In this case, when the wavelength dependence of the fluorescence life of the object to be measured is investigated, for example, the SC light can be irradiated with a cycle that corresponds to the length of the fluorescence life of a variety of objects to be measured and, therefore, the measurement accuracy and measurement efficiency can be improved. In addition, in the optical sampling waveform monitoring that utilizes the four-wave phenomenon which is one of the nonlinear phenomena, sampling of the waveform to be measured can be carried out with optimum timing. As a result, there is the advantage that the monitoring accuracy can be effectively improved or the advantage that the comb interval (in other words, the light wavelength interval) in the optical frequency comb can be adjusted.

In the case of the light source apparatus of the first constitution according to the third embodiment, the frequency adjustment means changes the frequency of repetition when the seed light source emits an optical pulse train. Thus, by arbitrarily adjusting the frequency of repetition of the optical pulse train by directly controlling the seed light source, the frequency adjustment means is able to change the frequency of repetition of the SC optical pulse train by means of a simple constitution.

In addition, in the case of the light source apparatus of the first constitution according to the third embodiment, the frequency adjustment means may also comprise a dividing section, a delay section, and a combining section. The dividing section is disposed so as to be optically connected between the seed light source and optical fiber and divides an optical pulse train off to a plurality of optical waveguides. The delay section is provided in some of the optical waveguides of the plurality of optical waveguides and temporally delays the optical pulse train. The combining section combines optical pulse trains from a plurality of optical waveguides. Thus, because the frequency adjustment means has a constitution that delays some of the divided optical pulse trains before combining same with another optical pulse train, the frequency of repetition of the SC optical pulse train can be suitably changed.

In the case of the light source apparatus of the first constitution of the third embodiment, the frequency adjustment means is optically connected between the seed light source and optical fiber and may also change the frequency of repetition of an optical pulse train by extracting pulses cyclically from the optical pulse train. In this case, the frequency adjustment means is able to suitably change the frequency of repetition of the SC optical pulse train. Further, this light source apparatus, which changes the frequency of repetition of the optical pulse train may also further comprise an optical amplifier that is disposed so as to be optically connected between the frequency adjustment means and the optical fiber. In this constitution, a high-power optical pulse train can be efficiently generated as a result of the pulses being amplified following extraction by the frequency adjustment means. For this reason, a broadening of the spectral bandwidth of the SC optical pulse train can be efficiently implemented.

In the case of the light source apparatus of the first constitution according to the third embodiment, the frequency adjustment means is optically connected to the exit end of the optical fiber and may also change the frequency of repetition of the SC optical pulse train by extracting pulses cyclically from the SC optical pulse train. In this case, the frequency adjustment means is able to suitably change the frequency of repetition of the SC optical pulse train and easily adjust downward the average power of the SC optical pulse train.

In the case of the light source apparatus of the first constitution according to the third embodiment, the pulse extraction cycle of the frequency adjustment means may be optionally changeable. In this case, the freedom for changing the frequency of repetition of the SC optical pulse train increases.

In the case of the light source apparatus of the first constitution according to the third embodiment, the spectral width of the SC optical pulse train is preferably ten or more times the spectral width of the optical pulse train received by the optical fiber. When the spectral width of the SC optical pulse train is ten or more times the spectral width of the optical pulse train, the deformation of the spectral shape of the SC optical pulse train arising from the optical pulse train and fluctuations in the optical fiber characteristic is striking. Hence, in such a case, the frequency of repetition of the SC optical pulse train is desirably controlled by the frequency adjustment means. Further, because the frequency of repetition of the SC optical pulse train is optionally changeable, the freedom of the spectrum control of the SC optical pulse train also increases.

The light source apparatus of the first constitution according to the third embodiment may also further comprise pulse intensity adjustment means for changing the maximum power of the respective pulses contained in the optical pulse train that is disposed so as to be optically connected between the seed light source and the optical fiber. As a result of this constitution, the maximum power and spectrum intensity of the respective pulses contained in the SC optical pulse train can be suitably controlled while the spectral shape of the SC optical pulse train is substantially kept constant. Such pulse intensity adjustment means can be suitably implemented by means of an optical amplifier having a variable gain and an optical attenuator having a variable attenuation rate. Further, the pulse intensity adjustment means can also be attained by changing the optical coupling efficiency between the seed light source and optical fiber by utilizing the shift in the optical axis between the seed light source and optical fiber and by changing the maximum power of the respective pulses contained in the optical pulse train.

The light source apparatus of the first constitution according to the third embodiment is disposed so as to be optically connected between the seed light source and the optical fiber and may also further comprise polarization adjustment means for changing the polarization direction of the optical pulse train entering the optical fiber. In cases where an optical fiber with large polarization dependence is applied, the maximum power and spectrum intensity of the respective pulses contained in the SC optical pulse train can be suitably controlled while keeping the spectral shape of the SC optical pulse train substantially constant by disposing the polarization adjustment means between the seed light source and optical fiber.

Meanwhile, the light source apparatus of the second constitution according to the third embodiment also comprises a seed light source, an optical fiber used for SC light generation (an SC optical pulse train containing SC light is generated) and frequency adjustment means for changing the frequency of repetition of the SC optical pulse train but utilizes continuous light as seed light. Even when the light introduced to the optical fiber is continuous light, provided that the continuous light has a relatively high power, SC light can be suitably generated in the optical fiber. Further, with the light source apparatus of the second constitution, the frequency of repetition of the SC optical pulse train can be changed by the frequency adjustment means. Therefore, as per the light source apparatus of the first constitution that utilizes an optical pulse train as the seed light as mentioned earlier, an increase in the measurement efficiency and measurement accuracy in the measurement of the wavelength dependence of the fluorescence life, an increase in the monitoring accuracy in the optical sampling waveform monitoring, or an adjustment of the comb interval of the optical frequency comb can be suitably implemented.

In the case of the light source apparatus of the second constitution according to the third embodiment, the frequency adjustment means may also change the frequency of repetition of the SC optical pulse train by changing the power of the continuous light. When the power of the continuous light introduced to the optical fiber is changed, because the conditions of the pulses generated in the optical fiber change, the frequency of repetition of the pulses also changes. Hence, this apparatus makes it possible to suitably change the frequency of repetition of the SC optical pulse train.

In the case of the light source apparatus of the second constitution according to the third embodiment, the power of the continuous light received by the optical fiber is preferably 500 mW or more. In this case, because the pulse conditions in the optical fiber are suitably changed, the frequency of repetition of the SC optical pulse train can be suitably changed.

The light source apparatus of the first or second constitution according to the third embodiment may also further comprise detection means for detecting the frequency of repetition of the SC optical pulse train which is optically connected to the exit end of the optical fiber. As a result of the detection means detecting the frequency of repetition of the SC optical pulse train, the frequency of repetition can be fed back to the frequency adjustment means. Hence, according to the light source apparatus comprising the detection means, control of the frequency of repetition can be performed highly accurately and stably.

The light source apparatus of the first or second constitution according to the third embodiment may also further comprise temperature control means for controlling the temperature of the optical fiber. As a result of this constitution, the dispersion characteristic of the optical fiber can be suitably changed and, therefore, the maximum power and spectrum intensity of the respective pulses contained in the SC optical pulse train can be suitably controlled while keeping the spectral shape of the SC optical pulse train substantially stable.

In the case of the light source apparatus of the first or second constitution according to the third embodiment, the optical waveguide for emitting the SC optical pulse train outside the apparatus may also have a curved portion. In this case, the curved portion preferably has a variable curvature. By providing the optical waveguide for the SC optical pulse train with such a curved portion, the SC optical pulse train is afforded an optional bend loss and the spectral shape can be suitably changed.

In the case of the light source apparatus of the first or second constitution according to the third embodiment, the frequency of repetition of the SC optical pulse train is preferably 1 kHz or more but 1 GHz or less, and the width of the adjustable range of adjustment by the frequency adjustment means is preferably 20% or more of the center frequency value of the adjustable range. In this case, fine adjustment of the measurement cycle in the measurement of the wavelength dependence of the fluorescence life, the sampling cycle in the optical sampling waveform monitoring, and the comb interval of the optical frequency comb, for example, can be suitably performed.

In the case of the light source apparatus of the first or second constitution according to the third embodiment, the frequency of repetition of the SC optical pulse train may be 10 MHz or more but 100 MHz or less and the width of the adjustable range of the adjustment by the frequency adjustment means may also be 10 MHz or more. In this case, the response characteristics of a multiplicity of materials can be suitably measured in the measurement of the wavelength dependence of the fluorescence life, for example. Further, an adjustable range that is adequate for the sampling cycle in the optical sampling waveform monitoring, for example, is obtained.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

In accordance with the light source apparatus according to the present invention, a variety of effects are obtained as a result of providing the seed light source and optical fiber for generating the SC light together with spectrum shaping means, power adjustment means, and frequency adjustment means. For example, full or partial modifications to the spectral shape of the emitted SC light can be achieved by the spectrum shaping means. Further, it is possible to change the power of the SC light while retaining the spectral shape of the emitted SC light by means of the power adjustment means. In addition, changes to the frequency of repetition of the SC optical pulse train can be made by the frequency adjustment means.

BRIEF DESCRIPTION OF THE DRAWINGS

FIG. 5 shows diagrams for explaining the variation in the waveform of the incident light entering the optical fiber with respect to the positional relationship between the condensing lens and optical fiber;

FIG. 8 shows diagrams for explaining the constitution and operation of the first modified example of the light source apparatus according to the first embodiment;

FIG. 10 is a graph showing the respective constitution of the third and fourth modified examples of the light source apparatus according to the first embodiment;

FIG. 24 is a graph showing an example of the spectral shape of the output light from the optical attenuator of the light source apparatus according to the second embodiment;

FIG. 25 shows diagrams for explaining the constitution and difference of the eighth modified example of the light source apparatus according to the second embodiment;

FIG. 26 is a block diagram showing the respective constitutions of the ninth and tenth modified examples of the light source apparatus according to the second embodiment;

FIG. 32 is a graph showing the output waveform from the time division multiplexing processing section of the light source apparatus according to the third embodiment;

FIG. 37 is a block diagram showing the constitution of the third and fourth modified examples of the light source apparatus according to the third embodiment;

Figure 1:
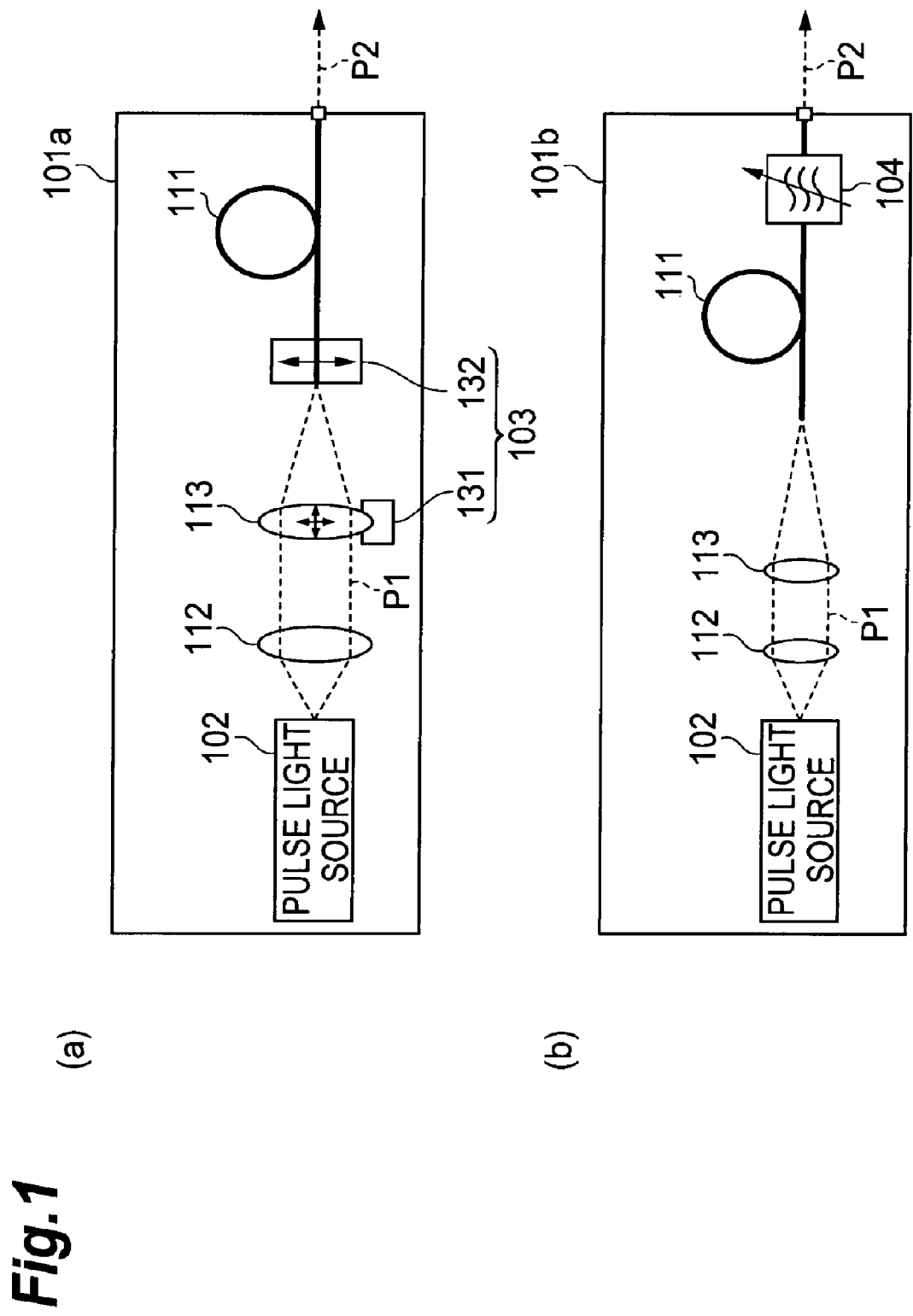
FIG. 1 shows a representative constitution of a first embodiment of a light source apparatus according to the present invention.

DESCRIPTION OF THE REFERENCE NUMERALS 101a to 101h . . . light source apparatus; 102, 102a to 102c . . . pulse light source (seed light source); 103 . . . optical axis adjustment section; 104 . . . band-variable filter; 105 . . . pulse compressor/enlarger; 106 . . . optical attenuator; 107 . . . pulse shaping section; 108 . . . spectrum shaping section; 109 . . . temperature adjustment element; 111 . . . optical fiber; 112 . . . collimator lens; 113 . . . condensing lens; 114, 116, 117 . . . control section; 115 . . . optical amplifier; 115 . . . frequency control section; 118 . . . detector; 119 . . . divider; 120 . . . continuous light source (seed light source); 121 . . . semiconductor laser device; 122a . . . LN modulator; 122b, 124c, 152 . . . signal generator; 123 . . . cavity; 124a . . . mirror reflector; 124b . . . piezo motor; 125 . . . saturable absorber mirror; 128 . . . Er: Yb co-doped glass plate; 131 . . . first drive section; 132 . . . second drive section; P1 . . . optical pulse train; P2 . . . SC light; and P3 . . . continuous light.

201a to 201n . . . light source apparatus; 202, 202a to 202c . . . pulse light source (seed light source); 203, 204 . . . time division multiplexing processing section; 205 . . . pulse extraction section; 206 . . . optical generator; 207 . . . optical attenuator; 208 . . . optical axis adjustment section; 209 . . . pulse compressor/enlarger; 210 . . . optical amplifier; 211 . . . optical fiber; 211a . . . temperature adjustment element; 212, 215, 218 . . . optical amplifier; 214 . . . optical attenuator; 216 . . . pulse shaping section; 217a to 217c . . . control section; 219 . . . power adjustment section; 220 . . . continuous light source (seed light source); 221 . . . semiconductor laser device; 222a . . . LN modulator; 222b, 224c, 252 . . . signal generator; 223 . . . cavity; 224a . . . mirror reflector; 224b . . . piezo motor; 225 . . . saturable absorber mirror; 228 . . . Er: Yb co-doped glass plate; 230 . . . detector; 231, 241 . . . divider; 232, 233, 242 to 244 . . . optical waveguide; 234 . . . delay device; 235, 245 . . . combiner; 242a, 243a . . . delay device; 251 . . . optical switch; 252 . . . signal generator; 281 . . . first drive section; 282 . . . second drive section; P1 . . . optical pulse train; P2 . . . SC light; and P3 . . . continuous light.

301a to 301h . . . light source apparatus; 302, 302a to 302c . . . pulse light source (seed light source); 303, 304 . . . time division multiplexing processing section; 305 . . . pulse extraction section; 306 . . . signal generator; 307 to 309 . . . control section; 311 . . . optical fiber; 312, 313, 318 . . . optical amplifier; 314, 315 . . . frequency control section; 316 . . . detector; 316a . . . wavelength-variable filter; 316b . . . optical detection element; 316c . . . PLL circuit; 317 . . . divider; 320 . . . continuous light source; 321 . . . semiconductor laser element; 322a . . . LN modulator; 322b, 324c, 352 . . . signal generator; 323 . . . cavity; 324a . . . mirror reflector; 324b . . . piezo motor; 325 . . . saturable absorber mirror; 328 . . . Er:Yb co-doped glass plate; 331, 341 . . . divider; 332, 333, 342 to 344 . . . optical waveguide; 334 . . . delay device; 335, 345 . . . combiner; 342a, 343a . . . delay device; 351 . . . optical switch; 360 . . . optical amplifier; P1 . . . optical pulse train; and P2 . . . SC optical pulse train.

BEST MODES FOR CARRYING OUT THE INVENTION

In the following, embodiments of a light source apparatus according to the present invention will be explained in detail with reference to FIGS. 1 to 39. In the description of the drawings, identical or corresponding components are designated by the same reference numerals, and overlapping description is omitted.

First Embodiment

First, the first embodiment of the light source apparatus according to the present invention will be described in details with reference to FIGS. 1 to 13. FIG. 1 shows a representative constitution of a first embodiment of a light source apparatus according to the present invention. As the light source apparatus according to the first embodiment, the light source apparatus 101a shown in the area (a) of FIG. 1 comprises a pulse light source 102, an optical axis adjustment section 103, an optical fiber 111, a collimator lens 112, and a condensing lens 113. This pulse light source 102 is a seed light source that emits an optical pulse train P1 as seed light upon receiving a supply of power from a power supply device.

The optical fiber 111 is optically connected to the pulse light source 102 via the collimator lens 112 and condensing lens 113 and emits pulse-shaped supercontinuum (SC) light P2 upon receipt of the optical pulse train P1. More specifically, the optical fiber 111 generates SC light P2 by enlarging the spectral width of the optical pulse train P1 by a factor of two or more, for example. Further, the wavelength region of the optical pulse train P1 preferably includes 1550 nm and the center wavelength of the wavelength region is preferably close to 1550 nm. In this case, the efficient SC light generation in the low loss wavelength region of the optical fiber 111 is possible.

The optical axis adjustment section 103 is included in the spectrum shaping means for deforming the spectral shape of the SC light P2. The optical axis adjustment section 103 changes the optical coupling efficiency between the pulse light source 102 and optical fiber 111 by utilizing any optical axis between the pulse light source 102 and the optical fiber 111. As a result, the maximum power of the respective pulses contained in the optical pulse train P1 changes. In the light source apparatus 101a, the optical axis adjustment section 103 comprises a first drive section 131 that displaces the condensing lens 113 and a second drive section 132 that changes the light entrance end of the optical fiber 111. The first drive section 131 displaces the condensing lens 113 in the optical axis direction or in a direction of intersection with optical axis direction to change the coupling efficiency between the pulse light source 102 and optical fiber 111. The second drive section 132 displaces the optical entrance end of the optical fiber 111 in a direction of intersection with the optical axis direction to change the coupling efficiency between the pulse light source 102 and optical fiber 111.

Meanwhile, as the light source apparatus according to the first embodiment, the light source apparatus 101b shown in the area (b) of FIG. 1 comprises the pulse light source 102, a band-variable filter 104, the optical fiber 111, the collimator lens 112, and the condensing lens 113. Further, the constitution and functions of the pulse light source 102, optical fiber 111, collimator lens 112, and condensing lens 113 are the same as those of the case of the light source apparatus 101a.

The band-variable filter 104 is included in the spectrum shaping means for deforming the spectral shape of the SC light P2. The band-variable filter 104 is optically connected to the light exit end of the optical fiber 111 and is capable of limiting the bandwidth of the SC light P2 emitted by the optical fiber 111 and changing the bandwidth thus limited and the center wavelength thereof. The SC light P2 passes through the band-variable filter 104 before exiting the light source apparatus 101b.

Figure 2:
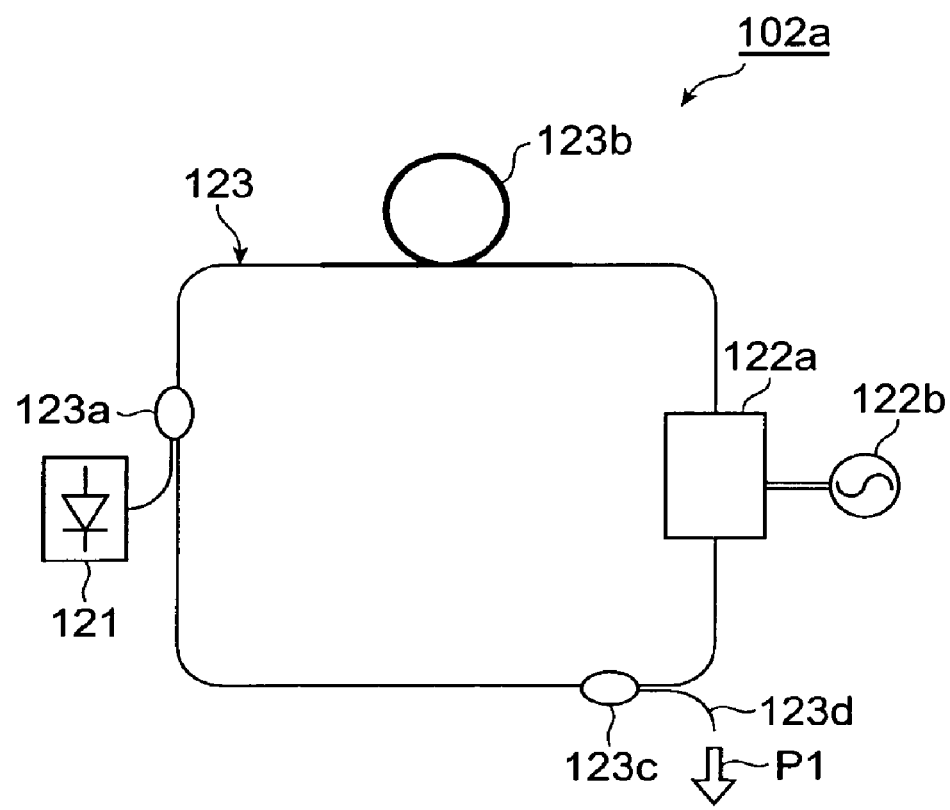
FIG. 2 shows a first constitution of the pulse light source that can be applied to the light source apparatus according to the first embodiment.

Here, FIG. 2 shows the constitution of the pulse light source 102a as a first constitution of the pulse light source 102 that can be applied to the light source apparatus according to the first embodiment. The pulse light source 102a is a so-called active mode-synchronization type ultrashort pulse light generation source. In other words, the pulse light source 102a comprises a semiconductor laser device 121, an LN modulator 122a, a signal generator 122b that drives the LN modulator 122a, and a ring-link cavity (light source path) 123. The semiconductor laser device 121 is optically connected to the ring-like part of a cavity 123 via a coupler 123a. Further, the ring-like part of the cavity 123 is optically connected to the output light source waveguide 123d via the coupler 123c. Erbium-doped fiber (EDF) 123b and the LN modulator 122a are optically connected in series to the ring-like part of the cavity 123.

When an electrical pulse signal of a predetermined frequency is sent by the signal generator 122b to the LN modulator 122a, the optical loss of the LN modulator 122a decreases in a cycle that corresponds with the frequency. Excited light is made to enter the ring-like part of the cavity 123 from the semiconductor laser device 121. Further, if the LN modulator 122a is controlled such that the oscillation occurs when the phases of the respective modes contained in the light excited by the excitation light are synchronized, the ultrashort pulse laser light having a pulse width on the order of a few femtoseconds arises and is irradiated cyclically to the outside from the output light waveguide 123d. Each of the light source apparatuses 101a and 101b shown in regions (a) and (b) of FIG. 1 utilizes the cyclical ultrashort pulse light as an optical pulse train P1. Further, the frequency of repetition of the optical pulse train P1 matches the frequency of the electrical pulse signal that is sent from the signal emitter 122b to the LN modulator 122a.

Figure 3:
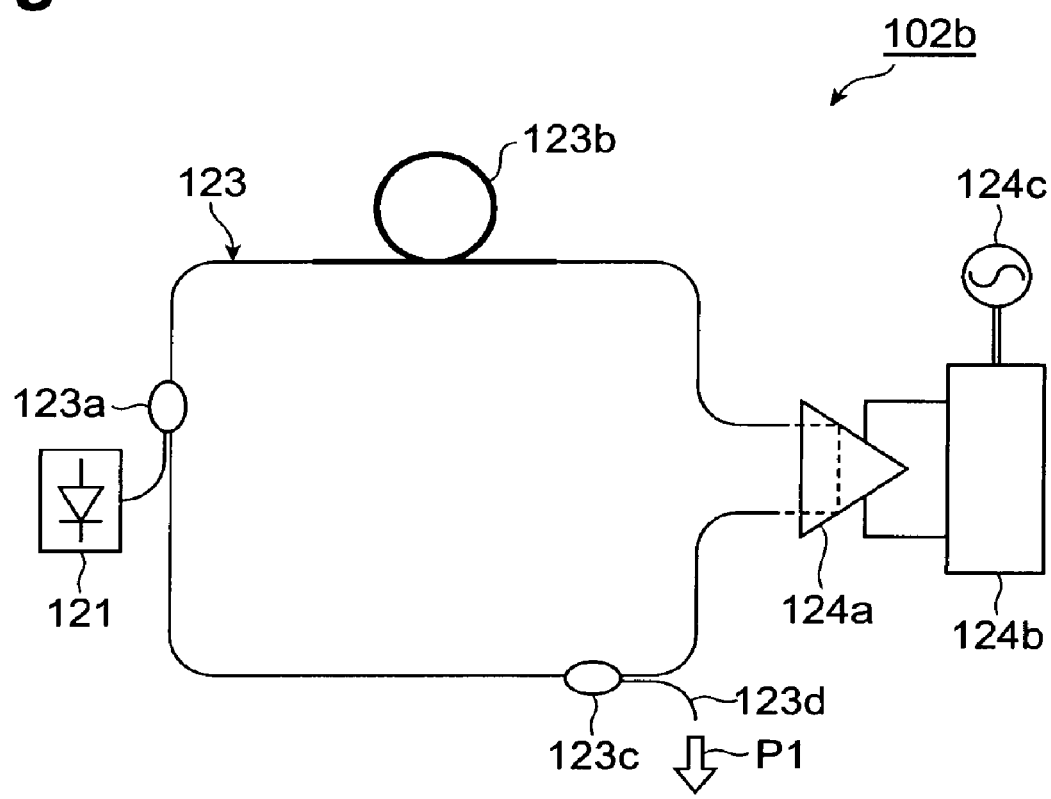
FIG. 3 shows a second constitution of the pulse light source that can be applied to the light source apparatus according to the first embodiment.

FIG. 3 shows the constitution of the pulse light source 102b as a second constitution of the pulse light source 102 (the pulse light source that can be applied to the light source apparatus according to the first embodiment). The pulse light source 102b is a so-called passive-mode synchronization ultrashort pulse light generation source and is constituted by a ring-type resonator. In other words, the pulse light source 102b comprises the semiconductor laser device 121, a ring-like cavity (optical waveguide) 123, a mirror reflector 124a, a piezo motor 124b that is attached to the mirror reflector 124a, and a signal generator 124c that drives the piezo motor 124b. The pulse light source 102b is similar to the pulse light source 102a (FIG. 2) of the first constitution in that the semiconductor laser device 121 is optically connected to the cavity 123, the cavity 123 has an output optical waveguide 123d, and in that the EDF 123b is optically connected to the ring-like part of the cavity 123.

A minor reflector 124a is provided in the pulse light source 102b in place of the LN modulator 122a of the pulse light source 102a. The minor reflector 124a constitutes part of the ring-like part of the cavity 123 and the length of the ring-like part of the cavity 123 changes cyclically as a result of the vibratory motion of the position of the minor reflector 124a. The vibratory motion of the minor reflector 124a is supplied by the piezo motor 124b. Further, the frequency of vibratory motion is controlled by the signal generator 124c that drives the piezo motor 124b.

When the signal generator 124c sends an electrical pulse signal of a predetermined frequency to the piezo motor 124b, the length of the cavity 123 changes according to a cycle that corresponds with the frequency. The excited light from the semiconductor laser device 121 is made to enter the ring-like part of the cavity 123. Further, ultrashort pulse laser light having a pulse width on the order of a few femtoseconds is produced at the instant that the length of the cavity 123 satisfies the soliton condition. The ultrashort pulse light is emitted cyclically to the outside from the output optical waveguide 123d as the optical pulse train P1. Here, the frequency of repetition of the optical pulse train P1 matches the frequency of the electrical pulse signal sent to the piezo motor 124b by the signal generator 124c. In the case of the pulse light source 12b, because the cyclical ultrashort pulse light is produced as a result of the mirror reflector 124a being driven mechanically, there is a tendency for the frequency of repetition of the optical pulse train P1 to be small in comparison with the pulse light source 102a (FIG. 2) which has a constitution that electrically drives the LN modulator 122a.

Figure 4:
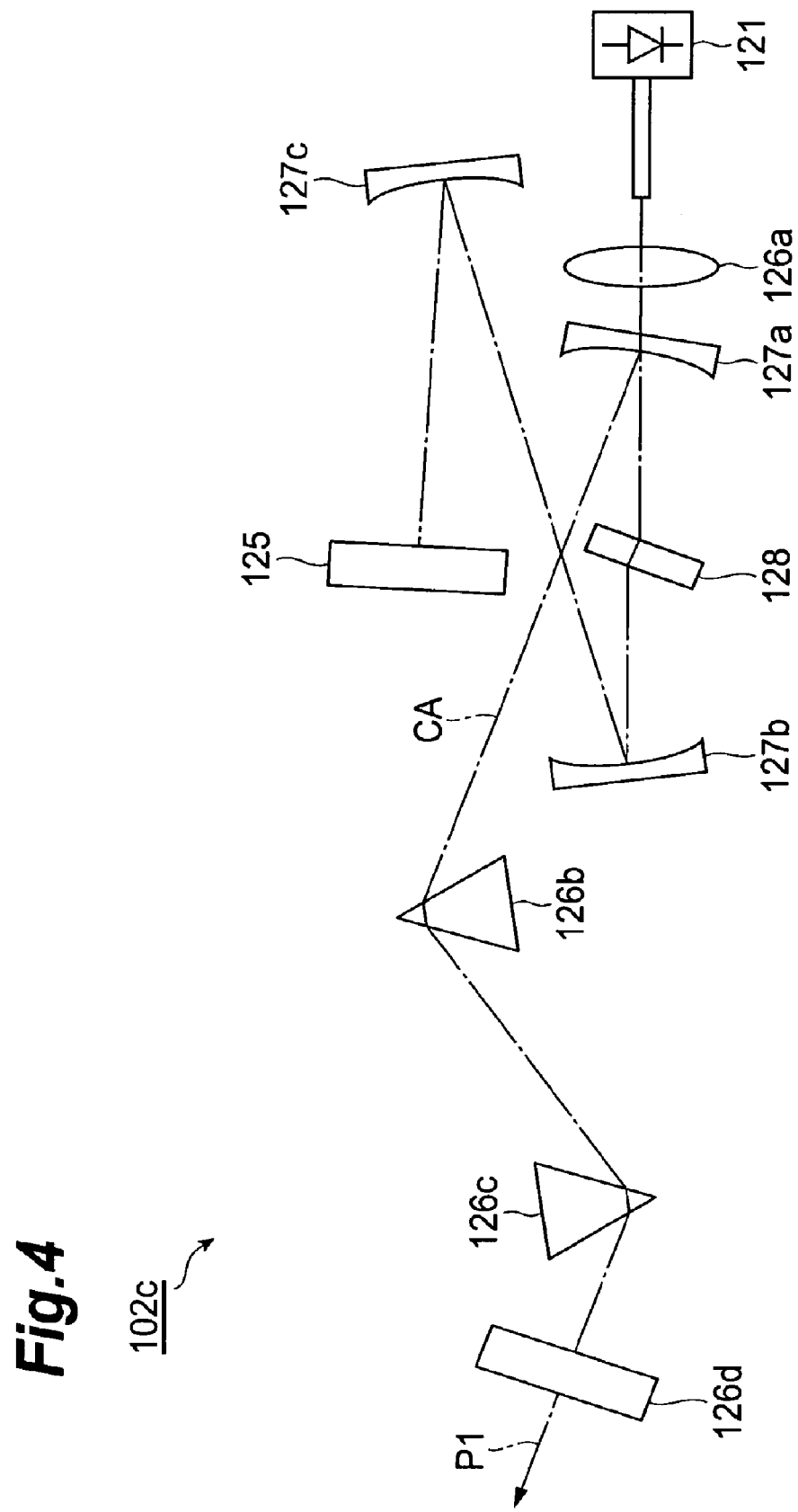
FIG. 4 shows a third constitution of the pulse light source that can be applied to the light source apparatus according to the first embodiment.

Furthermore, FIG. 4 shows the constitution of the pulse light source 102c as a third constitution of the pulse light source 102. The pulse light source 102c is a so-called passive mode synchronization-type ultrashort pulse light generation source and is constituted by a solid-state laser made of Er: Yb-co-doped glass. In other words, the pulse light source 102c comprises the semiconductor laser device 121, a saturable absorber mirror 125 in which a saturable absorber and minor reflector are integrally constituted, a collimator lens 126a, prisms 126b and 126c, an output coupler 126d, minors 127a to 127c, and an Er: Yb-co-doped glass plate 128. The constituent elements other than the semiconductor laser device 121 and collimator lens 126a constitute a cavity CA for laser oscillation.

The excited light that is emitted by the semiconductor laser device 121 reaches the Er: Yb-co-doped glass plate 128 via the collimator lens 126a and minor 127a and excites the Er: Yb-co-doped glass plate 128. The Er: Yb-co-doped glass plate 128 is disposed on cavity CA that comprises minors 127a to 127c together with the saturable absorber minor 125, prisms 126b and 126c, and output coupler 126d. The light passing along the cavity CA travels back and forth between the saturable absorber mirror 125 and output coupler 126d while being amplified by the Er: Yb-co-doped glass plate 128.

The saturable absorber mirror 125 possesses the property of absorbing weak light and reflecting strong light. Because the intensity of the light is maximum when the phases of the respective modes contained in the light that reaches the saturable absorber mirror 125 are synchronized, the saturable absorber mirror 125 functions as a mirror reflector and laser oscillation occurs only at this moment. Therefore, the laser light is ultrashort pulse light having a pulse width on the order of a few femtoseconds and is emitted to the outside from the output coupler 126d as the optical pulse train P1. Here, the frequency of repetition of the optical pulse train P1 has a value that corresponds with the length of the cavity CA.

The operations of each of the light source apparatuses 101a and 101b with the above constitution will now be described. Further, any of the pulse light sources 102a to 102c shown in FIGS. 2 to 4 are applied as the pulse light source 102 and emits the optical pulse train P1. The optical pulse train P1 has a structure in which ultrashort pulse light having a pulse width on the order of a few femtoseconds is aligned cyclically. The optical pulse train P1 is condensed by the condensing lens 113 after being collimated by the collimator lens 112. Further, the maximum power of the respective optical pulses of the optical pulse train P1 emitted by the pulse light source 102 is on the order of 70 to 80 kW, for example. Furthermore, the frequency of repetition of the optical pulse train P1 is on the order of 50 MHz. The pulse width of the optical pulse train P1 is equal to or less than 300 femtoseconds, for example. Further, the temporal average power of the optical pulse train P1 is on the order of 70 to 80 mW, for example.

The optical pulse train P1 is made to enter the optical fiber 111 after being condensed by the condensing lens 113. Further, the pulse-shaped SC light P2 which is rendered by extending the spectral bandwidth of the respective optical pulses by a factor of two or more is generated as a result of the nonlinear optical effect of the optical fiber 111 (the adiabatic soliton compression effect). The SC light P2 exits from the light exit end of the light source apparatus 101a.

The optical coupling efficiency between the pulse light source 102 and light entrance end of the optical fiber 111 in the light source apparatus 101a (area (a) of FIG. 1) is optionally set by the optical axis adjustment section 103. More specifically, by changing the shift length between the optical axis of the condensing lens 113 and the optical axis of the entrance end of the optical fiber 111 or the shift length between the focal point of the condensing lens 113 and the entrance end position of the optical fiber 111 by means of the first and second drive sections 131 and 132, the optical coupling efficiency between the pulse light source 102 and optical fiber 111 is adjusted.

Here, the area (a) of FIG. 5 is a graph that shows an example of an incident waveform P100A that enters the optical fiber 111 in a case where the optical axes of the condensing lens 113 and entrance end of the optical fiber 111 match and where the focal point of the condensing lens 113 and entrance end position of the optical fiber 111 match (that is, in cases where the coupling efficiency between the pulse light source 102 and optical entrance end of the optical fiber 111 has a maximum value). Furthermore, the area (b) of FIG. 5 is a graph that shows an example of an incident waveform P100B that enters the optical fiber 111 in a case where there is a shift between the optical axis of the condensing lens 113 and the optical axis of the entrance end of the optical fiber 111 and in a case where there is a shift between the focal point of the condensing lens 113 and entrance end of the optical fiber 111.

Suppose that the maximum power of the respective pulses contained in the optical pulse train P1 is PW1 (see the area (a) in FIG. 5) in cases where the optical coupling efficiency between the pulse light source 102 and optical entrance end of the optical fiber 111 is maximum and that the maximum power of the respective pulses contained in the optical pulse train P1 is PW2 which is smaller than PW1 (see the area (b) in FIG. 5) in cases where there is a shift between the optical axis of the condensing lens 113 and the optical axis of the entrance end of the optical fiber 111 or in cases where there is a shift between the focal point of the condensing lens 113 and the position of the entrance end of the optical fiber 111. Thus, when the maximum power of the respective pulses contained in the optical pulse train P1 changes, the spectral shape of the SC light P2 produced as a result of the nonlinear optical effect of the optical fiber 111 is deformed. This fact is utilized to change the optical coupling efficiency between the pulse light source 102 and the optical entrance end of the optical fiber 111 so that the spectral shape of the SC light P2 in the light source apparatus 101a (area (a) in FIG. 1) takes on the desired shape.

Figure 6:
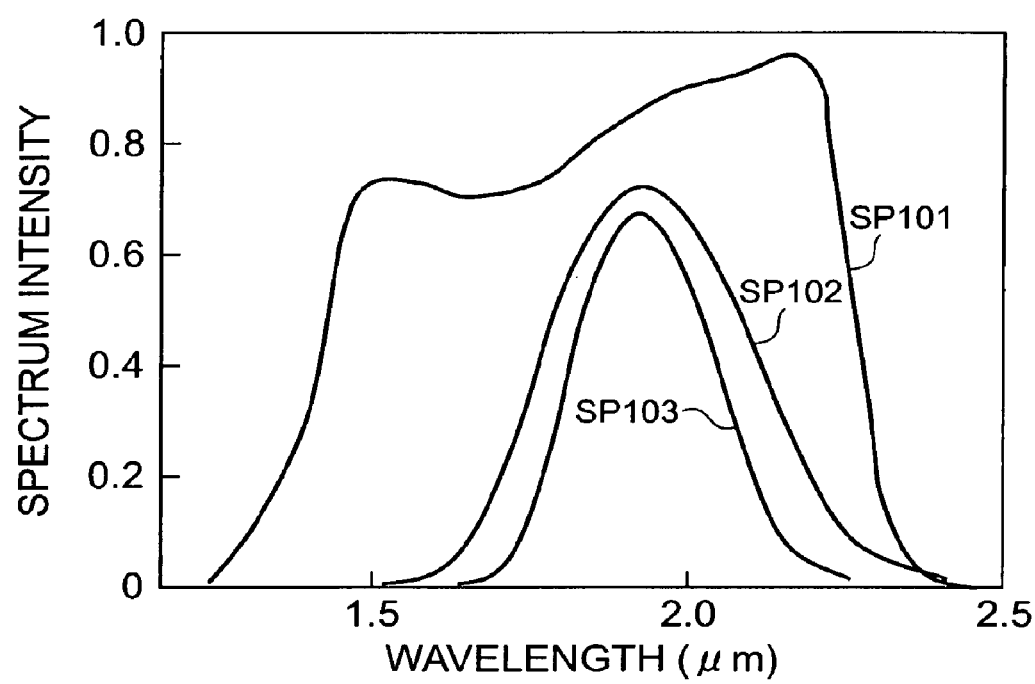
FIG. 6 is a graph showing an example of the spectral shape of the SC light emitted by the optical fiber (SP101) and an example of the spectral shape of the SC light passing through band-variable filters (SP102 and SP103)

Furthermore, the spectral bandwidth of the SC light P2 emitted by the optical fiber 111 is changed by the band-variable filter 104 in the light source apparatus 101b (area (b) in FIG. 1). Here, FIG. 6 shows an example of the spectral shape of the SC light P2 emitted by the optical fiber 111 (spectrum SP101) and an example of the spectral shape of the light P2 that has passed through the band-variable filter 104 (spectrum SP102, SP103). Further, in FIG. 6, the spectrum SP103 is a spectrum in a case where the passband of the band-variable filter 104 is smaller than that of the spectrum SP102. Further, in FIG. 6, the vertical axis is the normalized spectrum intensity. As shown in FIG. 6, in the light source apparatus 101b (area (b) of FIG. 1), the shape mainly pertaining to the bandwidth in the spectral shape of the SC light P2 suitably changes as a result of the band-variable filter 104 such that the desired shape is achieved.

Further, although the light source apparatus 101b comprising the optical axis adjustment section 103 and the light source apparatus 101a comprising the band-variable filter 104 were described in the description above, the light source apparatus according to the first embodiment preferably further comprises both the optical axis adjustment section 103 and the band-variable filter 104. As a result of this constitution, the freedom when varying the spectral shape of the SC light P2 increases.

As described hereinabove, according to each of the light source apparatuses 101a and 101b of the first embodiment, the spectral shape of the SC light P2 can be optionally deformed by the optical axis adjustment section 103 or band-variable filter 104. As a result, when the density of the plurality of materials are measured in sequence in the infrared optical spectroscopy, for example, the spectral shape of the SC light can be changed in accordance with the characteristic absorption length of each of the plurality of materials and, therefore, the measurement accuracy improves further.

Figure 7:
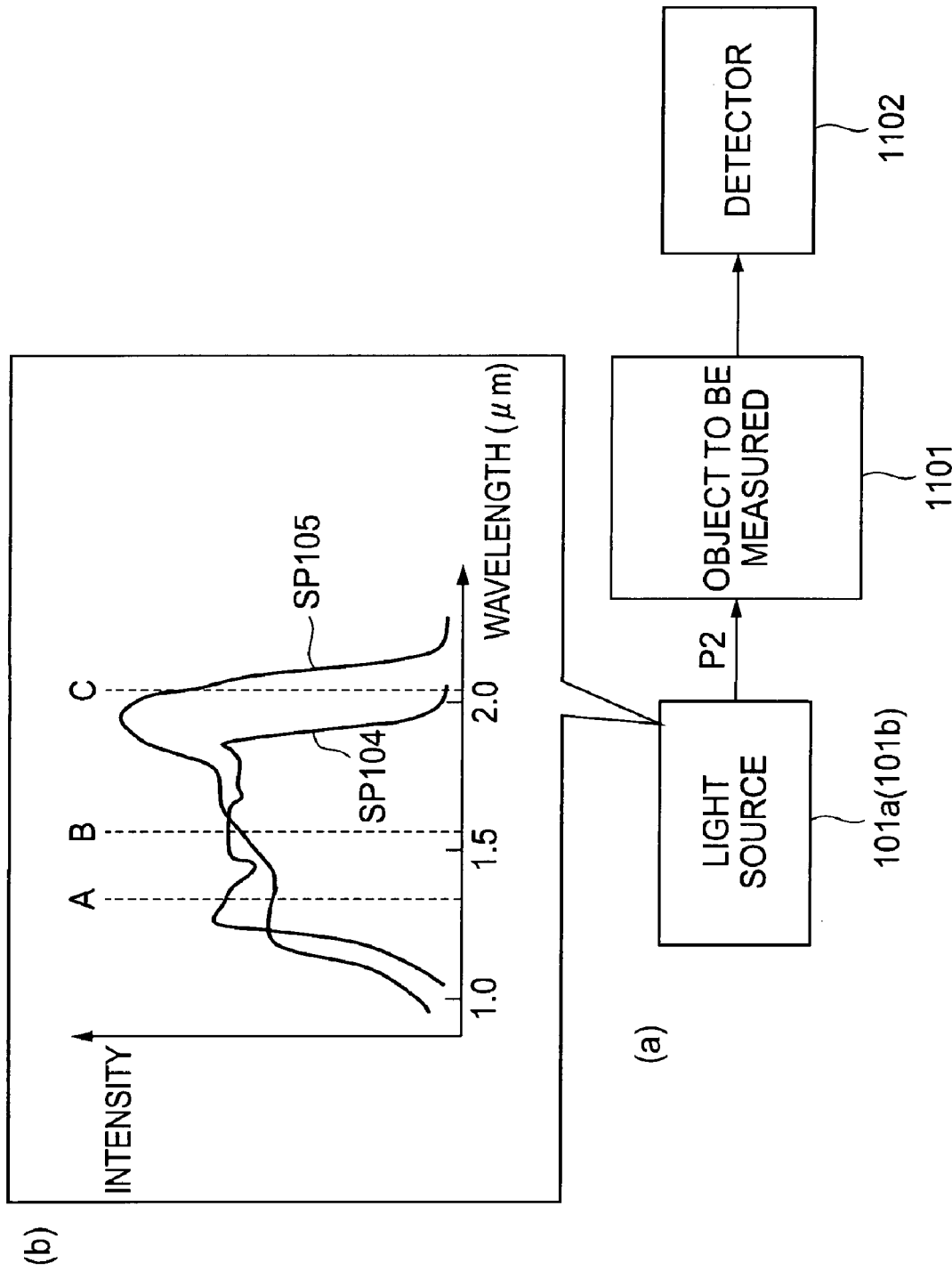
FIG. 7 shows diagrams for explaining infrared spectroscopy measurement.

Here, FIG. 7 shows diagrams for explaining infrared spectroscopy measurement. As shown in the area (a) of FIG. 7, first the light P2 emitted by the light source apparatus 101a (101b) is irradiated onto the object to be measured 1101. The light transmitted by the object to be measured 1101 is then detected by a detector 1102. Thereupon, the wavelength component that matches the absorption wavelength that is characteristic of the material contained in the object to be measured 1101 in the SC light P2 irradiated onto the object to be measured 1101 is absorbed by the object to be measured 1101 in accordance with the density of the material. Therefore, the density of the material contained in the object to be measured 1101 is grasped by comparing the spectral shape of the SC light P2 and the spectral shape of the light that has passed through the object to be measured 1101.

The area (b) of FIG. 7 shows an example of the spectral shape of light P2 emitted by the light source apparatus 101a or light source apparatus 101b. For example, in cases where the object to be measured 1101 contains water (an organism or the like), the wavelength region absorbed by the moisture is close to a wavelength of 1400 nm (wavelength λ shown in the area (b) in FIG. 7). Therefore, as a result of making the spectrum intensity of the SC light in the wavelength region 3 dB or more, for example, larger than another wavelength region (wavelength 1600 nm, for example), a loss of spectral information in the wavelength region is avoided, whereby the measurement accuracy can be raised. Therefore, in such cases, the spectral shape of SC light P2 is preferably deformed by the optical axis adjustment section 103 and/or band-variable filter 104 so that the spectral shape of the SC light P2 assumes a shape such as that of the spectrum SP 104 shown in the area (b) of FIG. 7, for example.

The zero dispersion wavelength is equal to or more than 1400 nm and equal to or less than 1600 nm and the input wavelength of the optical pulse train is adjusted toward a longer wavelength than the zero dispersion wavelength, whereby there is the possibility that the spectrum intensity of the SC light at wavelength 1400 nm can be made 3 dB or larger than the spectrum intensity of the SC light at wavelength 1600 nm. Naturally, the external filter may be used.

Furthermore, in cases where a change in the glucose density contained in the object to be measured 1101, for example, is measured, a phenomenon whereby the absorption peak wavelength shifts in accordance with the glucose density under the influence of the hydrogen coupling of the water molecules in the wavelength region close to wavelength 1560 nm (wavelength B shown in the area (b) of FIG. 7) is sometimes utilized (See Japanese Patent Application Laid-Open No. H10-325794, for example). Here, when the spectrum intensity of SC light P2 close to wavelength 1560 nm is flat, the intensity of the SC light P2 at the peak wavelength is substantially constant even when the absorption peak wavelength changes. Accordingly, a variation in the glucose density can be measured highly accurately. Hence, even in such a case, the spectral shape of the SC light P2 is preferably deformed by the optical axis adjustment section 103 and/or band-variable filter 104 such that the spectral shape of the SC light P2 assumes a shape like that of the spectrum SP104 shown in the area (b) of FIG. 7, for example. Thus, a minute variation such as a shift in the absorption peak wavelength can be detected more sensitively because the SC light P2 has a flat spectrum intensity characteristic in proximity to the absorption peak wavelength of the object to be measured. The flatness of the spectrum intensity characteristic at this point is preferably 50% or less of the maximum spectrum intensity.

For example, because the input wavelength of the optical pulse train being equal to or less than 1560 nm and the zero dispersion wavelength of the optical fiber being adjusted toward a shorter wavelength than the input wavelength of the optical pulse train, the spectrum intensity of the SC light close to wavelength 1560 nm can be flat. Further, even when an adjustment is made so that the input wavelength of the optical pulse train is from 1500 to 1620 nm and the wavelength dispersion value of the optical fiber at the input wavelength is negative, the spectrum intensity of the SC light close to wavelength 1560 nm can be made flat. Naturally, an external filter may also be used.

Furthermore, in cases where the glucose density, CO2 density, or NOx density contained in the object to be measured 1101, for example, are measured, the spectrum intensity of the SC light P2 in the wavelength region close to wavelength 2.1 μm (wavelength C shown in the area (b) of FIG. 7) at which these materials exhibit a large absorption characteristic is preferably large. Therefore, in such cases, the spectral shape of the SC light P2 is preferably deformed by the optical axis adjustment section 103 and/or band-variable filter 104 so that the spectral shape of the SC light P2 assumes a shape like that of the spectrum SP105.

The light source apparatus 101a shown in the area (a) of FIG. 1 comprises the optical axis adjustment section 103 as the spectrum shaping means and the maximum power of the respective pulses contained in the optical pulse train P1 is changed as a result of the optical axis adjustment section 103 utilizing the optical axis shift between the pulse light source 102 and optical fiber 111 to change the optical coupling efficiency between the pulse light source 102 and optical fiber 111. As a result of this constitution, the spectrum shaping of the SC light P2 can be suitably controlled and, in comparison with a case where an optical amplifier and optical attenuator are used between the pulse light source 102 and optical fiber 111, the optical loss can be kept low.

The light source apparatus 101b shown in the area (b) of FIG. 1 comprises the band-variable filter 104 as the spectrum shaping means and the band-variable filter 104 is optically connected to the output end of the optical fiber 111. As a result of this constitution, the spectral shape of the SC light P2 is easily deformed to a shape with the desired bandwidth.

In the light source apparatus 101a (or light source apparatus 101b), the spectral width of the SC light P2 may be equal to or more than ten times that of the spectral width of the optical pulse train P1 received by the optical fiber 111. When the spectral width of the SC light P2 is equal to or more than ten times that of the spectral width of the optical pulse train P1, the deformation of the spectral shape of the light P2 that arises as a result of a fluctuation in the characteristic of the optical pulse train P1 and optical fiber 111 (non-linearity) is obvious. Hence, in this case, the spectrum shaping of the SC light P2 can be controlled by the spectrum shaping means (in the first embodiment, the optical axis adjustment section 103 and band-variable filter 104).

First Modified Example of the First Embodiment

FIG. 8 shows the constitution of a first modified example of the light source apparatus according to the first embodiment. In FIG. 8, the area (a) shows the constitution of a light source apparatus 101c according to the first modified example and the light source apparatus 101c comprises the pulse light source 102, a pulse compressor/enlarger 105 and the optical fiber 111. A detailed description of the constitution and functions of the pulse light source 102 and optical fiber 111 will be omitted because the constitution and functions are the same as the case of the light source apparatuses 101a and 101b.

The pulse compressor/enlarger 105 is included in the spectrum shaping means for shaping the spectral shape of the SC light P2. More specifically, the pulse compressor/enlarger 105 is disposed so as to be optically connected between the pulse light source 102 and optical fiber 111. As a result of the pulse compressor/enlarger 105 changing the pulse shape such as the respective optical pulse time widths and height (maximum power) contained in the optical pulse train P1, the spectral shape of the SC light P2 is deformed to the desired shape. A dispersion device such as a variable dispersion compensator, for example, is suitable as a pulse compression/enlarger 105.

Here, the area (b) of FIG. 8 shows the change in the spectral shape of SC light P2 in a case where the time widths of the respective pulses contained in the optical pulse train P1 are changed. Further, the area (b) of FIG. 8 shows spectra for when the length of the optical fiber 111 is ten meters and the temporal average power of the optical pulse train P1 is 100 mW. Further, in the area (b) of FIG. 8, the spectrum SP106 represents a spectrum for when the pulse time width of the optical pulse train P1 is 200 femtoseconds, the spectrum SP107 represents a spectrum for when the pulse time width of the optical pulse train P1 is 0.5 picoseconds, and the spectrum SP108 represents a spectrum for when the pulse time width of the optical pulse train P1 is one picosecond. Further, in the area (b) of FIG. 8, the vertical axis is the normalized spectrum intensity.

As shown in the area (b) of FIG. 8, as a result of the time widths of the respective optical pulses contained in the optical pulse train P1 being changed by the pulse compressor/enlarger 105, the spectral shape (mainly spectral bandwidth) of the SC light P2 can be effectively changed. Therefore, the spectrum shaping means of the first embodiment is suitably implemented by the pulse compressor/enlarger 105 of the first modified example.

Second Modified Example of the First Embodiment

Figure 9:
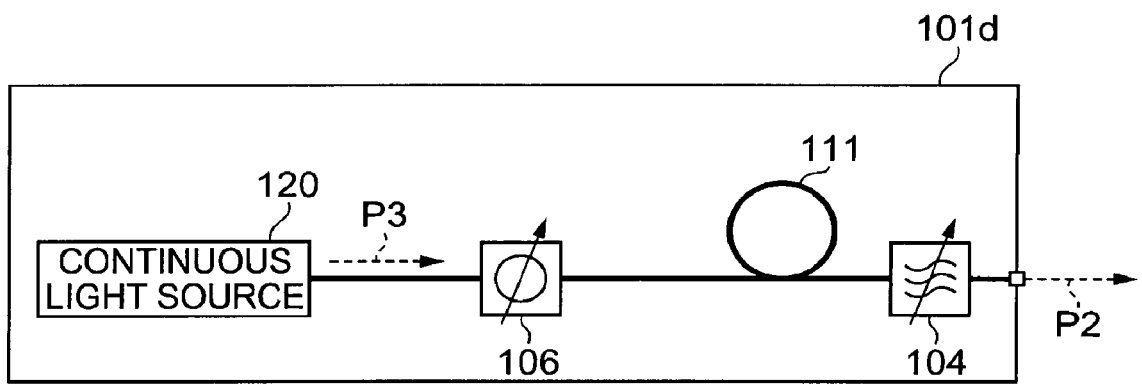
FIG. 9 shows the constitution of the second modified example of the light source apparatus according to the first embodiment.

FIG. 9 shows the constitution of the second modified example of the light source apparatus according to the first embodiment. The light source apparatus 101d according to the second modified example shown in FIG. 9 comprises a continuous light source 120, an optical attenuator 106 with a variable attenuation rate, an optical fiber 111, and a band-variable filter 104. The constitution and function of the optical fiber 111 and band-variable filter 104 are the same as those of the light source apparatuses 101a and 101b.

In the second modified example, the continuous light source 120 is a seed light source that emits continuous light P3. The continuous light source 120 supplies continuous light P3 to the optical fiber 111 via an optical attenuator 106. Even when the seed light that enters the optical fiber 111 is continuous light, SC light P2 can be generated within the optical fiber 111 if the continuous light has relatively high power.

The optical attenuator 106 is included in the spectrum shaping means for deforming the spectral shape of the SC light P2. More specifically, the optical attenuator 106 deforms the spectral shape of the light P2 by changing the power of the continuous light P3. In other words, if the power of the continuous light P3 that enters to the optical fiber 111 is changed, because the conditions of the pulse (SC light P2) generated in the optical fiber 111 then change, the spectral shape of the light P2 is also deformed. Hence, the spectrum shaping means of the first embodiment are suitably implemented by the optical attenuator 106 with a variable attenuation rate, as per the second modified example.

Further, in the second modified example, the power of the continuous light P3 that enters the optical fiber 111 is preferably equal to or more than 100 mW. As a result, the SC light P2 can be suitably generated in the optical fiber 111. Further, as per the second modified example, the spectral shape of the SC light P2 can be approximated according to the desired shape as a result of the band-variable filter 104 also being disposed at the light exit end of the optical fiber 111.

Third Modified Example of the First Embodiment

The area (a) in FIG. 10 is a block diagram showing the constitution of the third modified example of the light source apparatus according to the first embodiment. The light source apparatus 101e according to the third modified example shown in the area (a) of FIG. 10 comprises the pulse light source 102, a pulse shaping section 107, the optical fiber 111, and a control section 114. The constitution of the pulse light source 102 and optical fiber 111 is the same as that of the light source apparatuses 101a and 101b.

The pulse shaping section 107 comprises spectrum shaping means for deforming the spectral shape of the SC light P2 and is disposed so as to be optically connected between the pulse light source 102 and optical fiber 111. The optical axis adjustment section 103 shown in the area (a) of FIG. 1, the pulse compressor/enlarger 105 shown in the area (a) of FIG. 8 (first modified example), or the optical attenuator 106 shown in FIG. 9 (second modified example), for example, can be applied to the pulse shaping section 107.

Further, spectrum shaping of the SC light P2 may be executed by applying the band-variable filter to the pulse shaping section 107 and changing the spectral shape (more particularly at least one of the spectral width and center wavelength) of the optical pulse train P1 that is introduced to the optical fiber 111. The spectral shape of the SC light P2 is subjected to the effect of the spectral width and center wavelength of the optical pulse train P1 in addition to the effect of the dispersion characteristic of the optical fiber 111 and, therefore, the spectral shape of the SC light P2 can be suitably changed as a result of the band-variable filter being disposed such that same is optically connected between the pulse light source 102 and optical fiber 111.

Furthermore, the pulse shaping section 107 can also implement spectrum shaping of the SC light P2 by changing the polarization direction of the optical pulse train P1 that is introduced to the optical fiber 111. The spectral shape of the SC light P2 is subjected to the effects of the polarization of the optical pulse train P1 and the polarization dependence of the optical fiber 111 and, therefore, the spectral shape of the SC light P2 can be suitably changed by changing the polarization direction of the optical pulse train P1.

The control section 114 also functions as spectrum shaping means for deforming the spectral shape of the SC light P2. In other words, the control section 114 sends a control signal 51 for controlling the output power of the excitation laser light source of the pulse light source 102 (the semiconductor laser device 121 shown in FIGS. 2 to 4, for example) to the pulse light source 102. As a result, by changing the output power of the excitation laser light source, the maximum power of the respective pulses contained in the optical pulse train P1 is changed. Although the maximum power of the respective pulses of the optical pulse train P1 is changed by using the optical attenuator 106 in the second modified example (see FIG. 9), for example, the maximum power of the respective pulses of the optical pulse train P1 can also be changed by changing the output power of the excitation laser light source. Moreover, the output power of the excitation laser light source can easily be controlled by the amount of current supplied to the excitation laser light source. Therefore, as a result of this constitution, the maximum power of the respective pulses of the optical pulse train P1 can be easily changed by using one parameter such as the amount of current of the excitation laser light source.

The control section 114 functions as spectrum shaping means that deforms the spectral shape of the SC light P2 by controlling the temperature of the optical fiber 111. In other words, the control section 114 sends a control signal S2 for performing temperature control of the optical fiber 111 to a temperature adjustment element 109 such as a Peltier element that is provided in contact with the optical fiber 111. As a result, because the dispersion characteristic of the optical fiber 111 can be suitably changed, the spectral shape of the SC light P2 can be suitably changed. Further, the optical fiber 111 easily conducts the temperature of the temperature adjustment element 109 and is therefore preferably wound in a coil shape.

The control section 114 controls the pulse shaping section 107 in order to obtain SC light P2 with the desired spectral shape. For example, in cases where the pulse shaping section 107 comprises the optical axis adjustment section 103, the control section 114 sends a drive signal for driving first and second drive sections 131 and 132 respectively which are shown in the area (a) of FIG. 1 to the pulse shaping section 107 as the control signal S3. Furthermore, in cases where the pulse shaping section 107 comprises the pulse compressor/enlarger 105 (area (a) in FIG. 8) and cases where the pulse shaping section 107 comprises the optical attenuator 106 (FIG. 9), the control section 114 sends the control signal S3 for controlling the pulse compressor/enlarger 105 and optical attenuator 106 to the pulse shaping section 107. As a result, SC light P2 with the desired spectral shape can be suitably obtained.

Fourth Modified Example of the First Embodiment

The area (b) in FIG. 10 is a block diagram showing the constitution of the fourth modified example of the light source apparatus according to the first embodiment. The light source apparatus 101f according to the fourth modified example shown in the area (b) of FIG. 10 comprises the pulse light source 102 (or continuous light source 120), a spectrum shaping section 108, the optical fiber 111, an optical amplifier 115, and a control section 116. The constitutions of the pulse light source 102 (continuous light source 120) and optical fiber 111 are the same as those of the light source apparatuses 101a and 101b above.

The optical amplifier 115 is included in the spectrum shaping means for deforming the spectral shape of the SC light P2 and changes the spectral shape of the SC light P2 by changing the maximum power of the respective pulses contained in the optical pulse train P1. The gain of the optical amplifier 115 can be varied. Hence, the optical amplifier 115 receives a control signal S4 for controlling the gain from the control section 116 and amplifies the optical pulse train P1 (or continuous light P3 from the continuous light source 120) from the pulse light source 102 at the gain that corresponds with the control signal S4.

As per the fourth modified example, the spectrum shaping means may comprise an optical amplifier 115 having a variable gain that is disposed so as to be optically connected between the pulse light source 102 (continuous light source 120) and the optical fiber 111. As a result of this constitution, the spectrum shaping of the SC light P2 can be easily controlled. Further, in cases where the pulse light source 102 is applied as a seed light source, the maximum power of the respective pulses of the optical pulse train P1 may be fixed and, therefore, the optical pulse train P1 is stably obtained. Further, in this case, the spectral shape of the light introduced to the optical amplifier 115 and the spectral shape of the light emitted by the optical amplifier 115 may be different from one another. In addition to the maximum power of the respective pulses of the optical pulse train P1 that is introduced to the optical fiber 111, the spectral shape of the SC light P2 can also be approximated according to the desired shape by also considering the change in the spectral shape of the optical pulse train P1 of the optical amplifier 115.

The spectrum shaping section 108 is included in another spectrum shaping means for deforming the spectral shape of the SC light P2. The band-variable filter 104 of the second modified example shown in FIG. 9, for example, can be applied to the spectral shape section 108. The spectrum shaping section 108 may also be a curved portion whose curvature is variable and which is formed in an optical waveguide for emitting the SC light P2 outside the apparatus. As a result of the optical waveguide for emitting the SC light P2 being provided with a curved portion of this kind an optional bend loss is supplied to the SC light P2 and the spectral shape of the SC light P2 can be suitably changed. The spectrum shaping section 108 receives a control signal S5 for controlling the spectral shape of the SC light P2 from the control section 116 and either changes the passband to establish a spectral shape that corresponds with the control signal S5 or changes the curvature of the optical waveguide. As a result, the spectrum shaping of the SC light P2 can be suitably controlled.

The control section 116 sends the control signal 51 for controlling the output power of the excitation laser light source of the pulse light source 102 (continuous light source 120) to the pulse light source 102 (continuous light source 120) as per the control section 14 of the third modified example in addition to the control signals S4 and S5. Here, by changing the output power of the excitation laser light source, the maximum power of the optical pulse train P1 (continuous light P3) is changed. Further, the control section 116 changes the dispersion characteristic of the optical fiber 111 by sending the control signal S2 for performing temperature control of the optical fiber 111 to the temperature adjustment element 109 that is provided in contact with the optical fiber 111.

Fifth Modified Example of the First Embodiment

Figure 11:
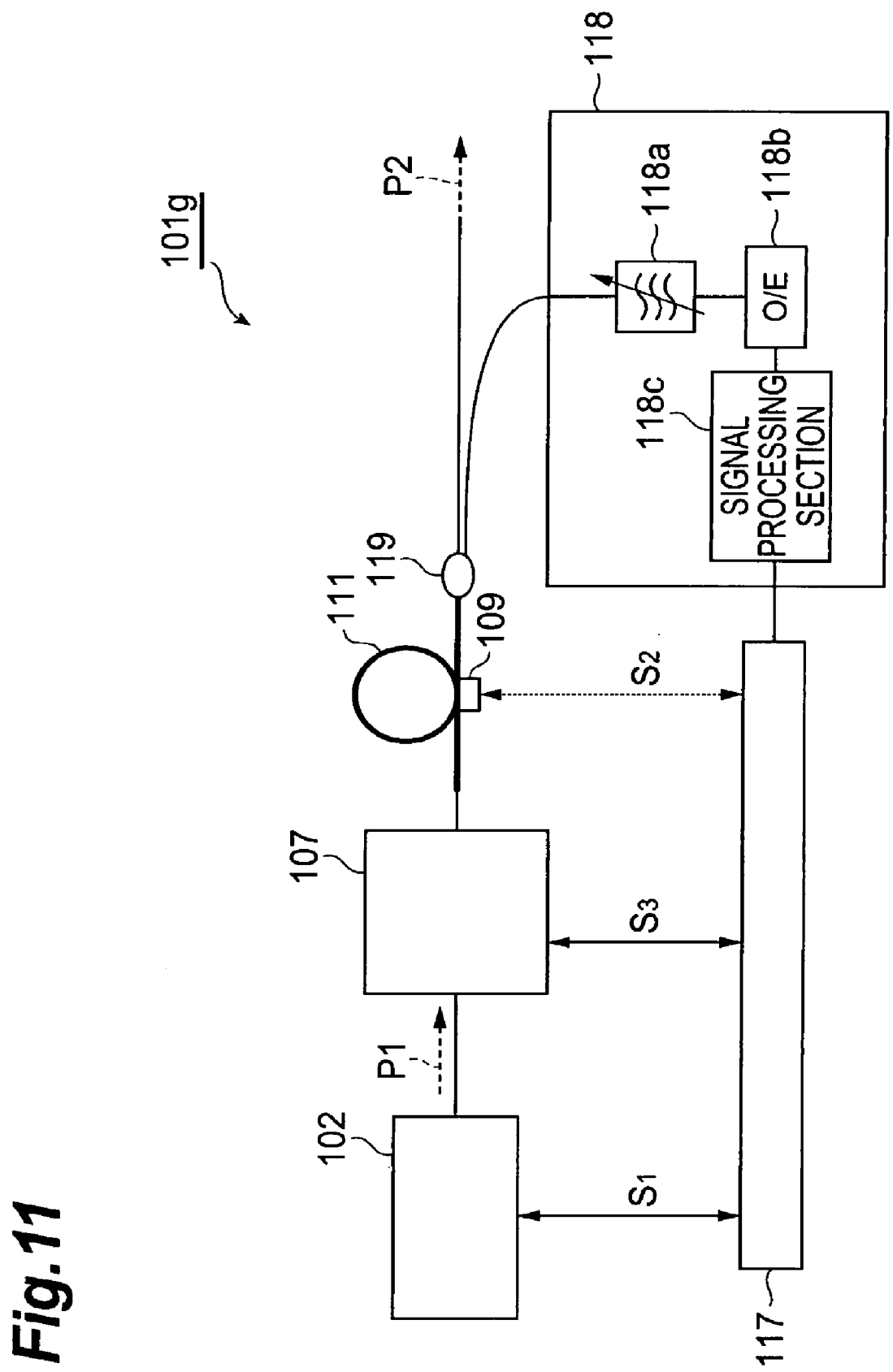
FIG. 11 is a block diagram showing the constitution of the fifth modified example of the light source apparatus according to the first embodiment.

FIG. 11 is a block diagram showing the constitution of a fifth modified example of the light source apparatus according to the first embodiment. The light source apparatus 101g according to the fifth modified example shown in FIG. 11 comprises the pulse light source 102, the pulse shaping section 107, the optical fiber 111, a control section 117, a detector 118, and a splitter 119. The constitution of the pulse light source 102, pulse shaping section 107, and optical fiber 111 is the same as that of the light source apparatuses 101a and 101b above.

The detector 118 is included in the detection means for detecting the spectral shape of the SC light P2. The detector 118 is optically connected via the splitter 119 to the exit end of the optical fiber 111 and captures a portion of the SC light P2. The detector 118 comprises a wavelength-variable filter 118a, an optical detection element 118b, and a signal processing section 118c. A portion of the SC light P2 that is captured by the detector 118 is O/E converted in the optical detection element 118b after passing through the wavelength-variable filter 118a to become a cyclical electrical signal. Further, the spectral shape (spectrum intensity of each frequency) is then detected in the signal processing section 118c based on the electrical signal. The detection result is then sent to the control section 117.

The control section 117 generates a control signal S1 for changing the output power of the excitation laser light source of the pulse light source 102, a control signal S2 for performing temperature control of the optical fiber 111, and a control signal S3 for controlling the pulse shaping section 107 based on the spectral shape of the SC light P2 detected by the detector 118 and sends each of these control signals to the pulse light source 102, temperature adjustment element 109, and pulse shaping section 107. Thus, as a result of the spectral shape of the light P2 being detected by the detector 118, the spectrum shaping means (pulse shaping section 107, control section 117) can be fed back by utilizing the detection result. As a result, the light source apparatus 101g according to the fifth modified example is able to perform control of the spectrum shaping highly accurately and stably.

Sixth Modified Example of the First Embodiment

Conventionally, the SC characteristic of the spectrum of the emitted SC light is limited by the seed light introduced to the optical fiber used for SC light generation and the optical fiber used for the generation of the optical pulse train and SC light, for example. Therefore, the result has been that a large degree of control of the SC characteristic has been undesirable after the seed light source (pulse light source, for example) and the SC light generation optical fiber have been put together. Therefore, in the sixth modified example of the light source apparatus according to the first embodiment, for the spectrum shaping means, a suitable wavelength characteristic is maintained proactively with respect to the dispersion and loss characteristic at the fusion point by controlling the fusion conditions at the end of the optical fiber used for SC light generation. According to this constitution, spectrum shaping of the SC light is possible even after the SC light generation optical fiber has been installed. The fusion process itself is a simple and highly reliable technology and, therefore, there is also no need to consider time degradation.

Figure 12:
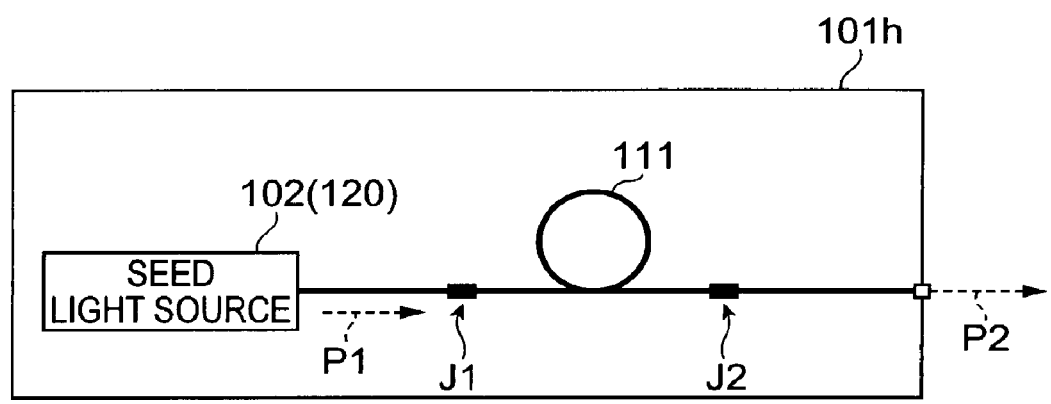
FIG. 12 shows the constitution of a sixth modified example of the light source apparatus according to the first embodiment.

FIG. 12 shows the constitution of a sixth modified example of the light source apparatus according to the first embodiment. As shown in FIG. 12, a light source apparatus 101h according to the sixth modified example comprises the pulse light source 102 that emits the pulse light P1 (or the continuous light source 120 that emits the continuous light), and the optical fiber 111 used for SC light generation. The light entrance end of the optical fiber 111 and the output fiber of the pulse light source 102 are fuse-connected at the point indicated by arrow J1. Further, the light exit end of the optical fiber 111 is fuse-connected to another optical fiber at the point indicated by arrow J2. The SC light P2 generated in the optical fiber 111 passes through the fusion point J2 and is emitted to the outside of the light source apparatus 101h.

Further, the fusion point of the spectrum shaping means controls the spectral shape of the SC light P2 by providing a loss wavelength dependence to only the light entrance end of the optical fiber 111, only the light exit end, or to both the light entrance end and the light exit end. As the optical fiber that is fuse-connected to the optical fiber 111, a single-mode optical fiber with a zero dispersion wavelength close to 1.3 μm, for example, a dispersion shift optical fiber with a zero dispersion wavelength close to 1.55 μm, a chalcogenide fiber, a high delta fiber for which the refractive index of the central core is slightly higher than that of the standard single mode optical fiber, a bismuth glass fiber, or a soft glass fiber whose main component is tellurite glass or lead glass are applicable. Furthermore, a rare earth-doped optical fiber doped with erbium or the like is also applicable. In addition, at the fusion point J1 and/or fusion point J2, a tapered fiber structure may be implemented by extending the fuse-connected optical fibers. In this case, the generation of the SC light P2 is also promoted in the tapered part and the spectral characteristic of the SC light P2 can be dynamically controlled.

Figure 13:
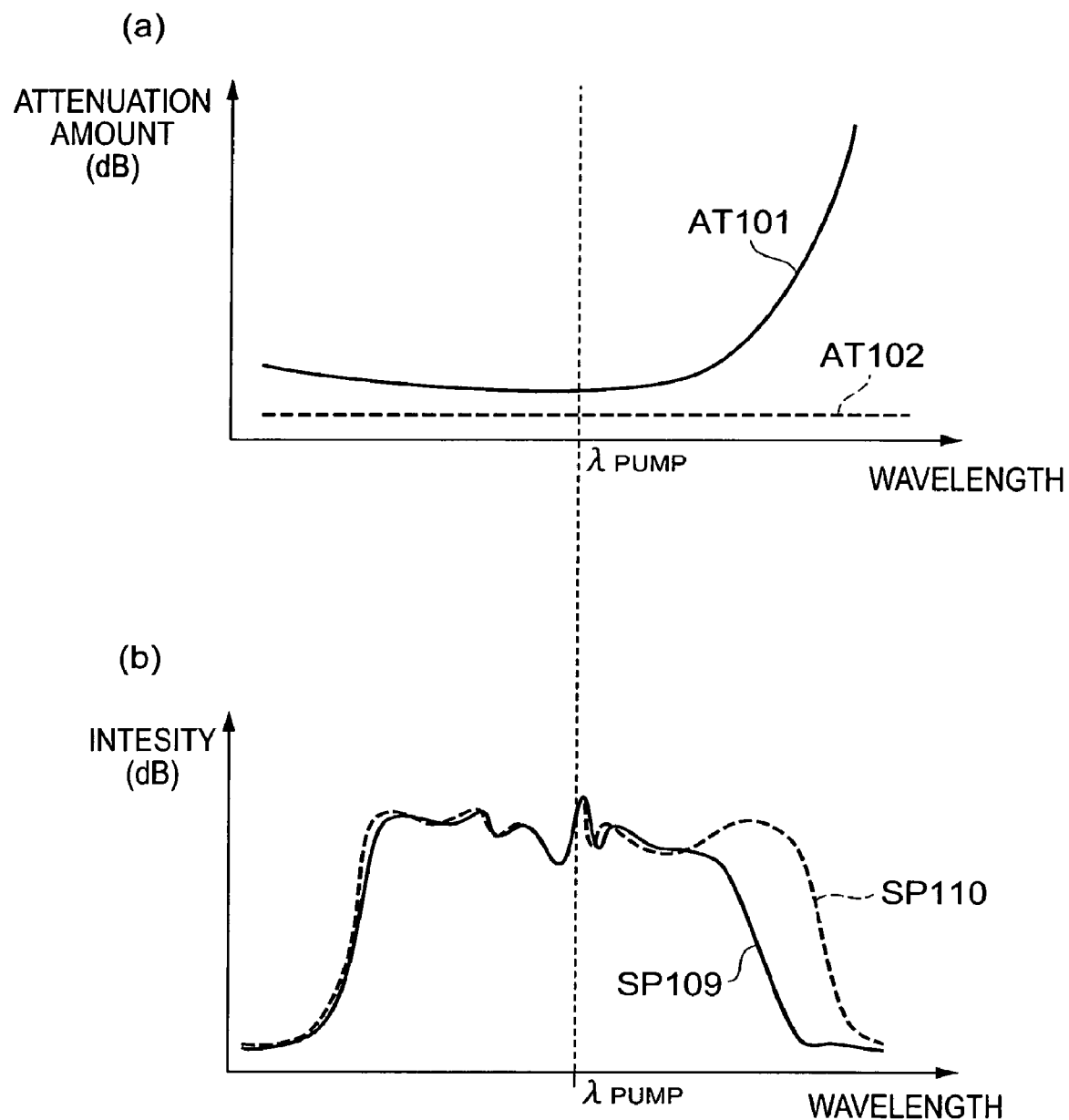
FIG. 13 shows diagrams for explaining the operation of the light source apparatus according to the sixth modified example shown in FIG. 12.

FIG. 13 shows diagrams for explaining the operation of the light source apparatus 101h according to the sixth modified example shown in FIG. 12. An attenuation spectrum at fusion point J1 is shown in the area (a) in FIG. 13. AT102 represents an attenuation spectrum in a state where no loss accompanies the fusion and AT101 represents an attenuation spectrum in which the fusion loss is provided with wavelength dependence such that the loss increases as the wavelength increases.

In a case where there is no loss accompanying the fusion (attenuation spectrum AT102), the spectrum of the SC light generated by the optical fiber 111 is the spectrum SP110 indicated in the area (b) of FIG. 13. Meanwhile, in cases where the fusion loss is provided with wavelength dependence at fusion point J1 (attenuation spectrum AT101), the spectrum of the SC light generated by the optical fiber 111 has a shape as per the spectrum SP109 shown in the area (b) of FIG. 13, the flat part narrows at wavelengths greater than the excitation wavelength λPUMP.

As mentioned hereinabove, the spectrum shaping of the SC light emitted by the light source apparatus 101h according to the sixth modified example in which the fusion conditions at least one end of the optical fiber 111 are controlled can be suitably implemented as the spectrum shaping means.

The light source apparatus according to the present invention described hereinabove is not limited to the above embodiments and respective modified examples and the addition of various modifications and constitutional elements is possible. For example, although a variety of aspects of the spectrum shaping means according to the present invention have been described in the embodiments and each of the modified examples above, the light source apparatus according to the present invention may be constituted by combining an optional plurality of means among the respective spectrum shaping means.

Second Embodiment

The second embodiment of the light source apparatus according to the present invention will be described in detail hereinbelow with reference to FIGS. 14 to 27.

Figure 14:
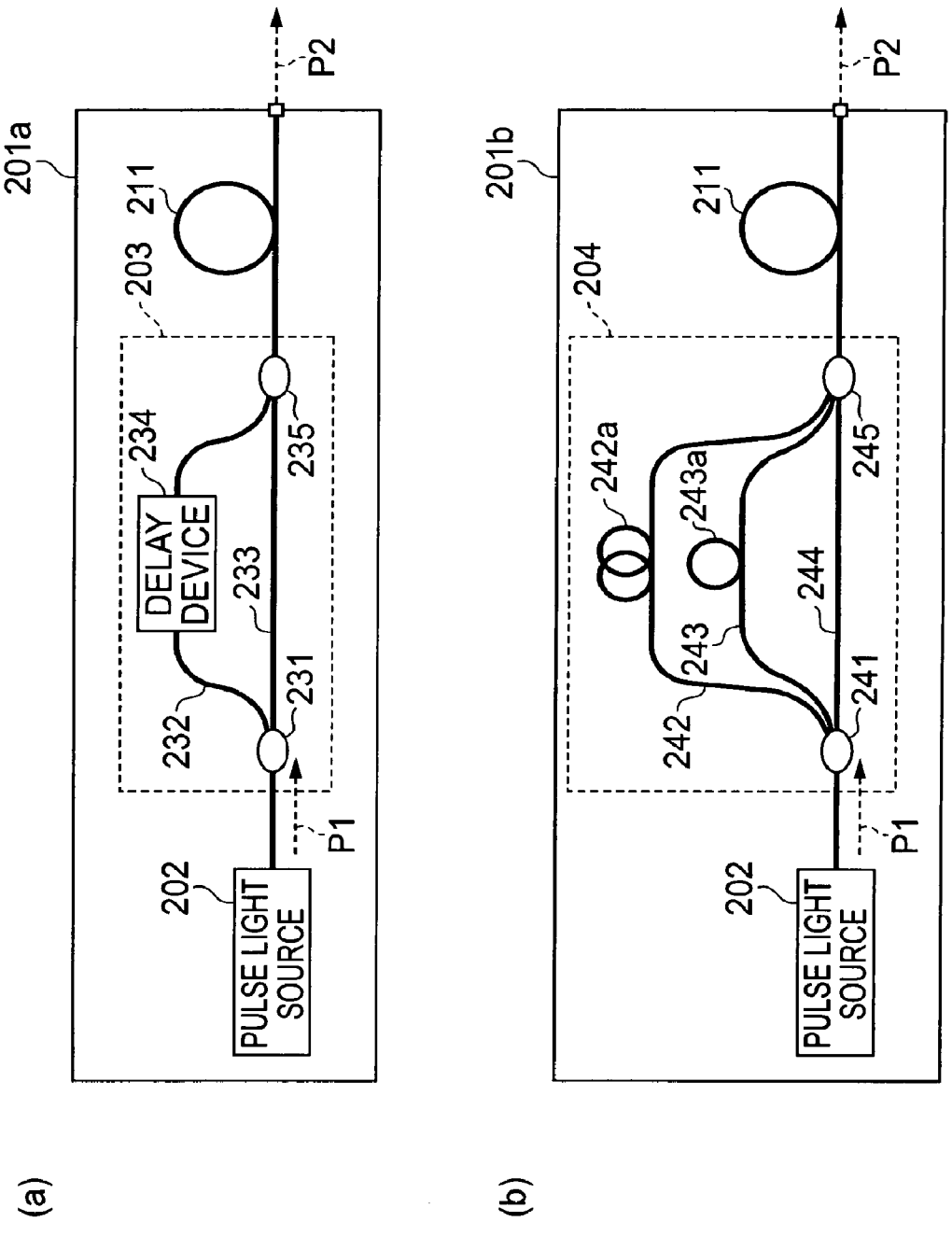
FIG. 14 shows a representative constitution of a second embodiment of a light source apparatus according to the present invention.

FIG. 14 shows a representative constitution of a second embodiment of a light source apparatus according to the present invention. First, the light source apparatus 201*a* shown in the area (a) of FIG. 14 comprises a pulse light source 202, a time division multiplexing processing section 203, and an optical fiber 211. The pulse light source 202 is a seed light source according to the second embodiment that emits the optical pulse train P1 upon receiving a supply of power from a power supply.

The optical fiber 211 is optically coupled to the pulse light source 202 via the time division multiplexing processing section 203 and pulse-shaped emits SC light P2 containing Supercontinuum (SC) light upon receiving the optical pulse train P1. More specifically, the optical fiber 211 generates SC light P2 by enlarging the spectral width of the optical pulse train P1 by a factor of two or more, for example. The center wavelength of the optical pulse train P1 is preferably close to 1550 nm. As a result, efficient SC light generation in the low loss wavelength region of the optical fiber 211 is possible.

The time division multiplexing processing section 203 is included in the power adjustment means for changing the power of the SC light P2. The time division multiplexing processing section 203 changes the frequency of repetition of the SC light P2 by changing the frequency of repetition of the optical pulse train P1 and, as a result, changes the temporal average power of the SC light P2.

The time division multiplexing processing section 203 is disposed in a state of being optically connected between the pulse light source 202 and optical fiber 211 and comprises a divider 231, a plurality of optical waveguides 232 and 233, a delay device 234, and a combiner 235. The divider 231 branches the optical pulse train P1 from the pulse light source 202 to the optical waveguides 232 and 233. The delay device 234 temporally delays the optical pulse train P1. Further, the delay device 234 is provided in one (optical waveguide 232 in the second embodiment) or both of the waveguides 232 and 233. The combiner 235 combines the optical pulse trains P1 from the waveguides 232 and 233. An optical switch for electing to divide the optical pulse train P1 off to the optical waveguides 232 and 233 or to guide the optical pulse train P1 only to the optical waveguide in which the delay device 234 has not been provided (optical waveguide 233) is provided in the divider 231. In this case, the frequency of repetition can be changed in a state where the average power output by the combiner 235 is kept constant. Further, an optical shutter and optical switch or an optical variable attenuator or the like that effectively block the light of either one of the optical waveguides 232 and 233 may also be introduced. In this case, the frequency of repetition can be changed without changing the energy of the pulse light output by the combiner 235.

A light source apparatus 201*b* that is shown in the area (b) of FIG. 14 comprises the pulse light source 202, a time division multiplexing processing section 204, and the optical fiber 211. The constitution and functions of the pulse light source 202 and optical fiber 211 are the same as those of the light source apparatus 201*a*.

The time division multiplexing processing section 204 comprises power adjustment means for changing the power of the SC light P2. The time division multiplexing processing section 204 changes the frequency of repetition of the SC light P2 by changing the frequency of repetition of the optical pulse train P1 as per the time division multiplexing processing section 203 shown in the area (a) of FIG. 14. As a result, the temporal average power of the SC light P2 changes.

The time division multiplexing processing section 204 is disposed in a state of being optically connected between the pulse light source 202 and optical fiber 211 and comprises a divider 241, a plurality of optical waveguides 242 to 244, and a combiner 245. The divider 241 divides off the optical pulse train P1 from the pulse light source 202 to the optical waveguides 242 to 244. The combiner 245 combines the optical pulse trains P1 from the optical waveguides 242 to 244.

Some of the optical waveguides 242 to 244, namely the optical waveguides 242 and 243 each comprise a delay path 242*a* and 243*a*. The delay paths 242*a* and 243*a* are parts for temporally delaying the optical pulse train P1 that passes through the optical waveguides 242 and 243 and constitute the delay section in the time division multiplexing processing section 204. The delay path 242*a* is longer than the delay path 243*a* and the delay times of the optical pulse train P1 grow sequentially longer from the optical waveguide 242, optical waveguide 243, and optical waveguide 244 in that order. Further, the divider 241 is provided with an optical switch for electing to divide the optical pulse train P1 off to the optical waveguides 242 to 244 or to guide the optical pulse train P1 only to the optical waveguide in which a delay path has not been provided (optical waveguide 244). In this case, the frequency of repetition can be changed in a state where the average power that is output by the combiner 245 is kept constant. Further, an optical shutter and optical switch or an optical variable attenuator or the like that effectively block the light of any of the optical waveguides 242, 243, and 244 may also be introduced. In this case, the frequency of repetition can be changed without changing the energy of the pulse light output by the combiner 245.

Figure 15:
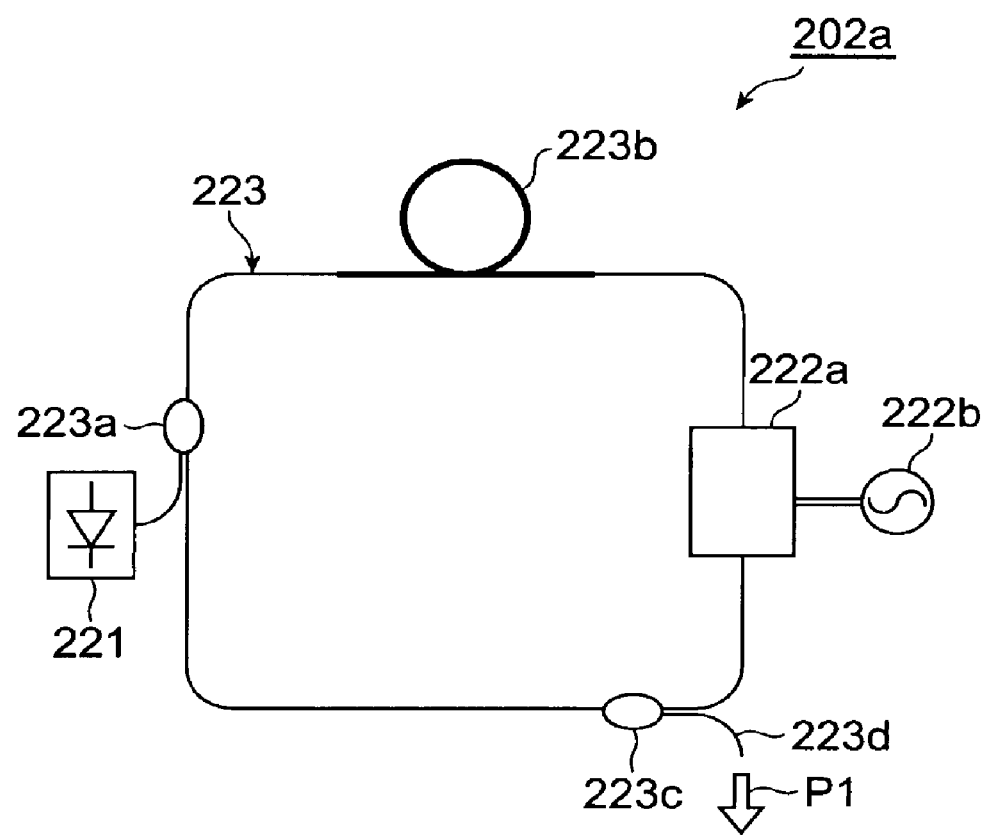
FIG. 15 shows a first constitution of the pulse light source that can be applied to the light source apparatus according to the second embodiment.

FIG. 15 shows the constitution of the pulse light source 202*a* as a first constitution of the pulse light source 202 that is applied to the light source apparatus according to the second embodiment. The pulse light source 202*a* is a so-called active-mode synchronization-type ultrashort pulse light generation source and is constituted by a ring-type resonator. In other words, the pulse light source 202*a* comprises a semiconductor laser device 221, an LN modulator 222*a*, a signal generator 222*b* for driving the LN modulator 222*a*, and a ring-type cavity (optical waveguide) 223. The semiconductor laser device 221 is optically connected to the ring-like part of the cavity 223 via a coupler 223*a*. Furthermore, the ring-like part of the cavity 223 is optically connected to an output optical waveguide 223*d* via a coupler 223*c*. An erbium-doped optical fiber (EDF) 223*b* and an LN modulator 222*a* are optically connected in series to the ring-like part of the cavity 223.

When an electrical pulse signal of a predetermined frequency is sent by the signal generator 222*b* to the LN modulator 222*a*, the optical loss in the LN modulator 222*a* decreases in a cycle that corresponds to the frequency. Excitation light is introduced by the semiconductor laser device 221 to the ring-like part of the cavity 223. Further, if the LN modulator 222*a* is controlled so that oscillation occurs when the phases of the respective modes contained in the light excited by the excitation light source are in sync, the ultrashort pulse laser light with a pulse width on the order of a few femtoseconds is produced and the ultrashort pulse laser light is emitted cyclically toward the outside by the output optical waveguide 223d. In the case of the light source apparatuses 201a and 201b shown in the areas (a) and (b) in FIG. 14, the frequency ultrashort pulse light is utilized as the optical pulse train P1. Thereupon, the frequency of repetition of the optical pulse train P1 matches the frequency of the electrical pulse signal that is sent to the LN modulator 222a by the signal generator 222b.

Figure 16:
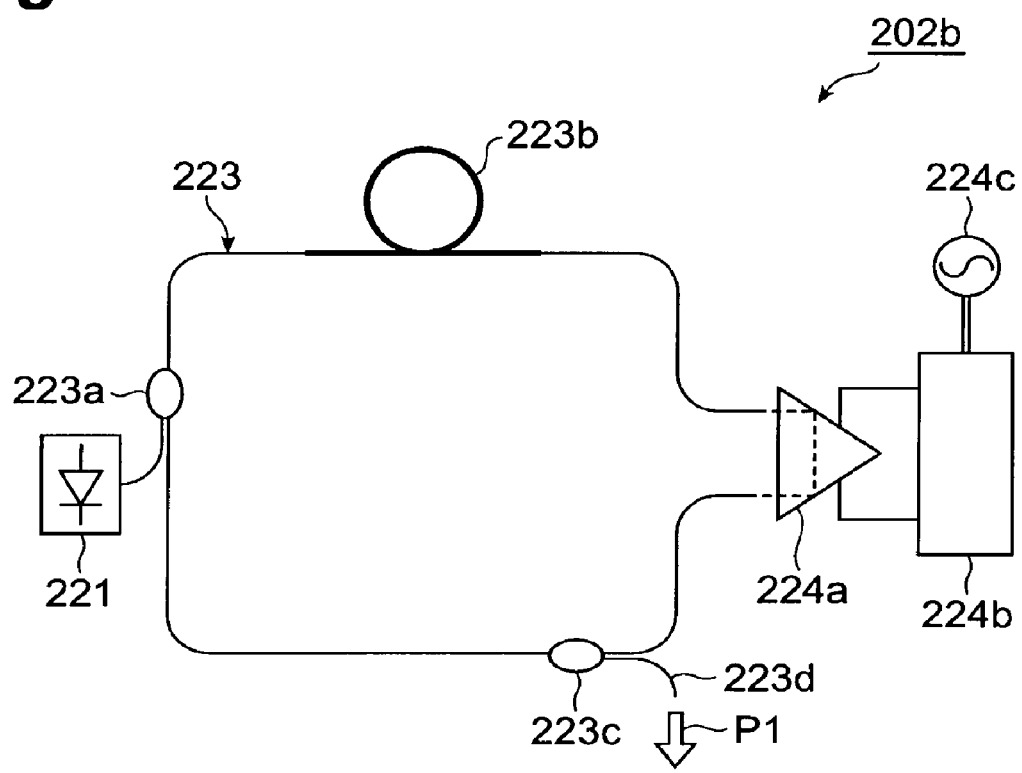
FIG. 16 shows a second constitution of the pulse light source that can be applied to the light source apparatus according to the second embodiment.

FIG. 16 shows the constitution of the pulse light source 202b for the second constitution of the pulse light source 202. The pulse light source 202b is a so-called passive mode synchronization-type ultrashort pulse optical generation source and is constituted by the ring-type resonator. In other words, the pulse light source 202b comprises the semiconductor laser device 221, the ring-type cavity (optical waveguide) 223, a mirror reflector 224a, a piezo motor 224b attached to the mirror reflector 224a, and a signal generator 224c that drives the piezo motor 224b. Further, the pulse light source 202b is the same as the pulse light source 202a (FIG. 15) in that the semiconductor laser device 221 is optically connected to the cavity 223 and the cavity 223 has the output semiconductor waveguide 223d and in that the EDF223b is optically connected to the ring-type part of the cavity 223.

In the pulse light source 202b, a minor reflector 224a is provided in place of the LN modulator 222a of the pulse light source 202a. The minor reflector 224a constitutes a part of the ring-like part of the cavity 223 and the length of the ring-like part of the cavity 223 changes cyclically as a result of the vibration of the position of the minor reflector 224a. The vibration of the minor reflector 224a is supplied by the piezo motor 224b. Further, the vibrational frequency is controlled by the signal generator 224c that drives the piezo motor 224b.

When a electrical pulse signal of a predetermined frequency is sent by the signal generator 224c to the piezo motor 224b, the length of the cavity 223 fluctuates at a cycle that corresponds to the frequency. Excitation light is introduced by the semiconductor laser device 221 to the ring-like part of the cavity 223. Further, an ultra-short pulse laser light having a pulse width on the order of a few femtoseconds is produced at the instant the length of the cavity 223 satisfies the soliton condition. The ultra-short pulse laser light is cyclically emitted to the outside by the output optical waveguide 223d as an optical pulse train P1. Thereupon, the frequency of repetition of the optical pulse train P1 matches the frequency of the electrical pulse signal sent to the piezo motor 224b by the signal generator 224c to the piezo motor 224b. Further, in the pulse light source 202b, because the cyclical ultrashort pulse light is produced by mechanically driving the minor reflector 224a, there is the tendency for the frequency of repetition of the optical pulse train P1 be reduced in comparison with that of a pulse light source 202a that is constituted to electrically drive the LN modulator 222a.

Figure 17:
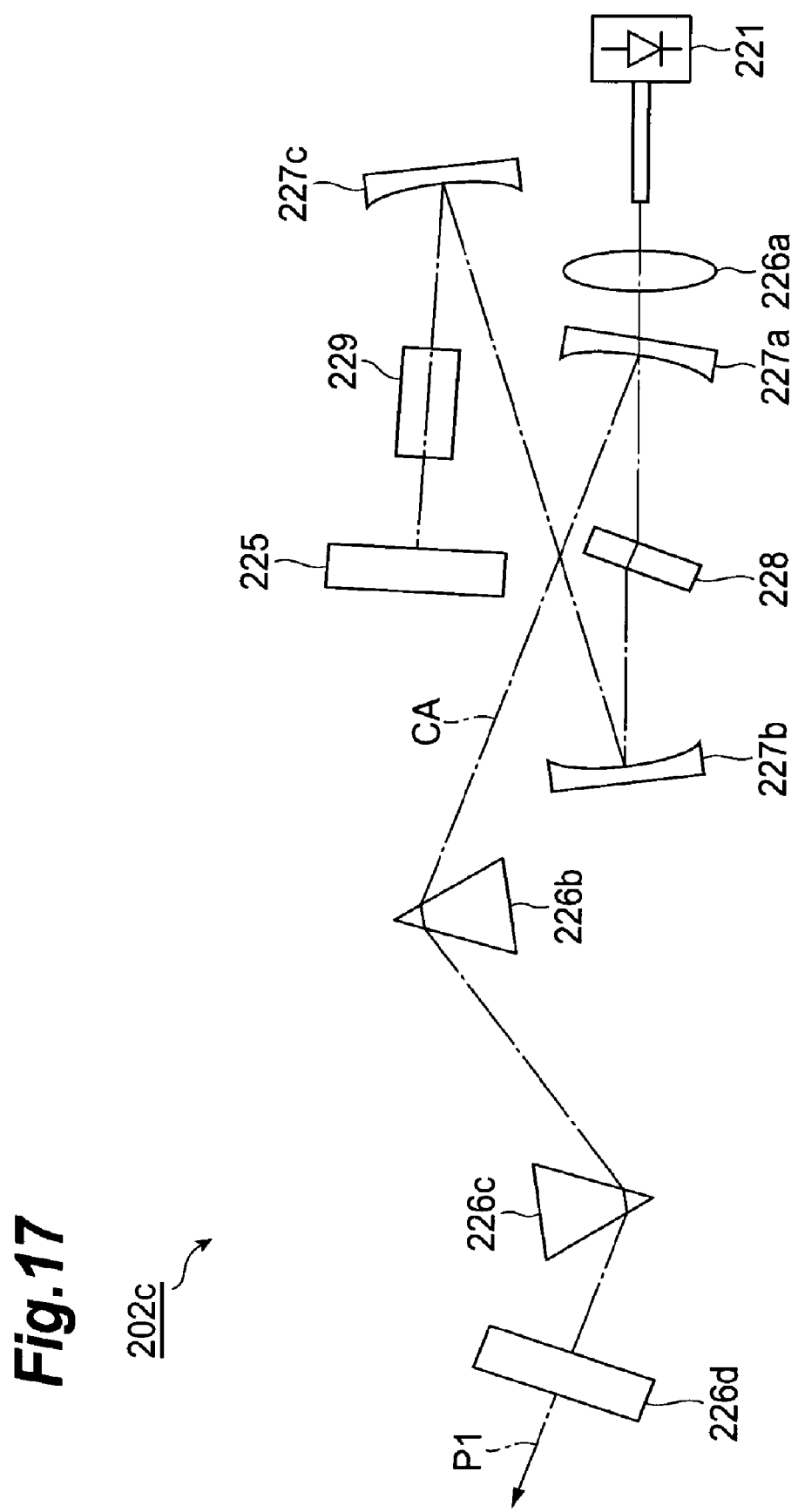
FIG. 17 shows a third constitution of the pulse light source that can be applied to the light source apparatus according to the second embodiment.

Further, FIG. 17 shows the constitution of the pulse light source 202c as a third constitution of the pulse light source 202. The pulse light source 202c is the so-called passive mode synchronization type ultrashort pulse light generation source and is constituted by a solid-state laser using the Er: Yb-co-doped glass. In other words, the pulse light source 202c comprises the semiconductor laser device 221, the saturable absorber mirror 225 in which saturable absorber and minor reflector are constituted as one unit, a collimator lens 226a, prisms 226b and 226c, an output coupler 226d, minors 227a to 227c, an Er: Yb-co-doped glass plate 228, a transparent medium 229. The constitution elements other than the semiconductor laser device 221 and collimator lens 226a constitute cavity CA for laser oscillation. Furthermore, the transparent medium 229 is provided if necessary.

The excitation light emitted by the semiconductor laser device 221 reaches the Er: Yb-co-doped glass plate 228 via the collimator lens 226a and minor 227a. As a result, the Er: Yb-co-doped glass plate 228 is excited. The Er: Yb-co-doped glass plate 228 is disposed on the cavity CA that comprises the saturable absorber minor 225, the prisms 226b and 226c, the output coupler 226d and minors 227a to 227c. The light that advances through the cavity CA goes back and forth between the saturable absorber minor 225 and output 226d while being amplified by the Er: Yb-co-doped glass plate 228.

The saturable absorber minor 225 has the property of absorbing weak light and reflecting strong light. The intensity of the light is maximum when the phases of the respective modes contained in the light that reaches the saturable absorber mirror 225 are synchronized. Therefore, the saturable absorber mirror 225 functions as a minor reflector only at that instant such that laser oscillation is generated. Hence, the laser light is ultrashort pulse light with a pulse width on the order of a few femtoseconds and emitted to the outside by the output coupler 226d as the optical pulse train P1. Thereupon, the frequency of repetition of the optical pulse train P1 assumes a value that corresponds to the length of the cavity CA.

Of the light source apparatuses 201a and 201b constituted as above, the operation of the light source apparatus 201a will be described next. The operation of the light source apparatus 201b is substantially similar to the operation of the light source apparatus 201a.

A pulse light source 202 with any of the constitutions of the pulse light sources 202a to 202c shown in FIGS. 15 to 17 emits the optical pulse train P1 to the time division multiplexing processing section 203. The optical pulse train P1 is constituted having ultrashort pulse light with a pulse width on the order of a few femtoseconds aligned cyclically (cycle T1). Thereupon, in the time division multiplexing processing section 203, the optical pulse train P1 is divided off to the optical waveguides 232 and 233 in cases where the divider 231 is set so that the optical pulse train P1 is divided off to the optical waveguides 232 and 233. Further, a delay of only (T1/2) seconds, for example, is produced by the delay device 234 in the optical pulse train P1 that advances toward one optical waveguide 232. Thereafter, the optical pulse trains P1 that have advanced in the respective optical waveguides 232 and 233 respectively are once again combined in the combiner 235. Further, in the time division multiplexing processing section 203, in cases where the branch filter 231 is set so that the optical pulse train P1 is not divided off to the optical waveguide 232, the optical pulse train P1 advances along the optical waveguide 233.

Figure 18:
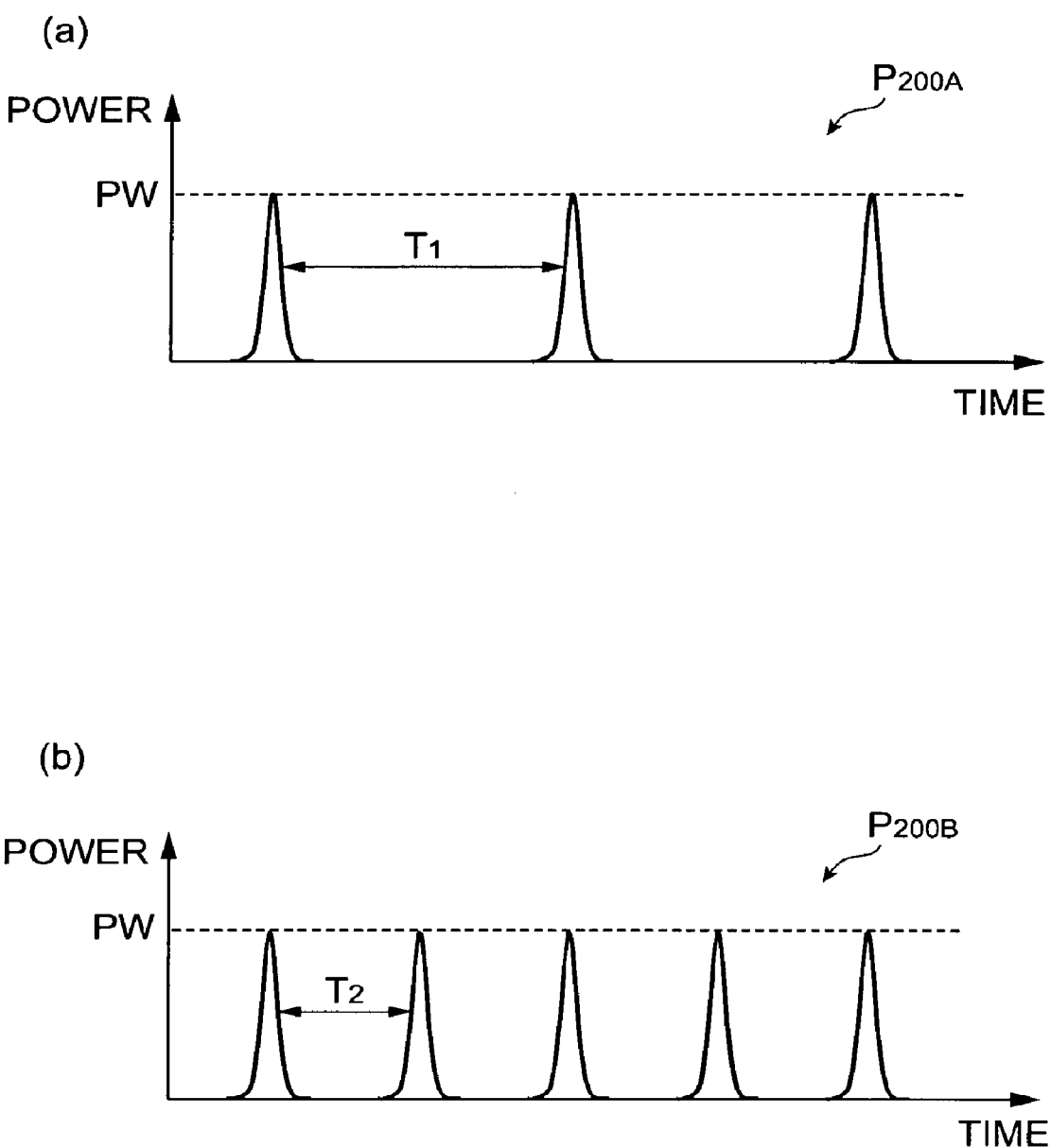
FIG. 18 is a graph that shows the output waveform from the time division multiplexing processing section of the light source apparatus according to the second embodiment.

Here, the areas (a) and (b) of FIG. 18 are graphs representing output waveforms P200A and P200B from the time division multiplexing processing section 203 in each of the cases where the optical pulse train P1 is not divided and divided respectively by the divider 231. In cases where the optical pulse train P1 is not divided by the divider 231, the optical pulse train P1 emitted by the pulse light source 202 remains the output waveform from the time division multiplexing processing section 203, which is a waveform in which there is a row of optical pulses with a cycle T1 as per the output waveform P200A shown in the area (a) of FIG. 18. However, in cases where the optical pulse array P1 is divided by the divider 231, the result is a waveform in which there is a row of optical pulses with a cycle T2 (=T1/2) which is half of cycle T1 of the optical pulse train P1 emitted by the pulse light source 202 as per the output waveform P200B shown in the area (b) of FIG. 18.

In this case, the drop in the intensity of the respective pulses resulting from division by the divider 231 may be compensated for by increasing the amount of current supplied to the semiconductor laser device 221 (See FIGS. 15 to 17), for example. As a result, as shown in the areas (a) and (b) of FIG. 18, the value of the point of each optical pulse of the output waveform P200B is the same (PW) as the value of the point of each optical pulse of the output waveform P200A. Thus, the frequency of repetition of the optical pulse array P1 is preferably changed while maintaining the point value of the power waveform of the optical pulses contained in the optical pulse array P1 introduced to the optical fiber 211.

Further, the point value PW of the respective optical pulses of the output waveforms P200A and P200B is 80 kW, for example. Further, the frequency of repetition of the output waveform P200A (in other words, the inverse of the cycle T1 of the optical pulse train P1, for example) is 25 MHz, for example and the frequency of repetition of the output waveform P200B is 50 MHz, for example. In addition, the pulse width of the output waveforms P200A and P200B is 200 femtoseconds, for example. Further, the temporal average power of the output waveform P200A is 40 mW, for example and the temporal average power of the output waveform P200B is 80 mW, for example.

An output waveform of this kind is introduced to the optical fiber 211 by the time division multiplexing processing section 203. Further, the linear optical effect of the optical fiber 211 (adiabatic soliton compression effect) generates SC light P2 in which the spectral bandwidth of the respective optical pulses is extended by a factor of two or more. The frequency of repetition of the SC light P2 generated at this time matches the frequency of repetition of the optical pulse train P1 that enters the optical fiber 11. The SC light P2 is emitted to the outside from the optical exit end of the light source apparatus 201a. Further, the length (interaction length) of the nonlinear part of the optical fiber 211 may be 2 meters, for example.

Figure 19:
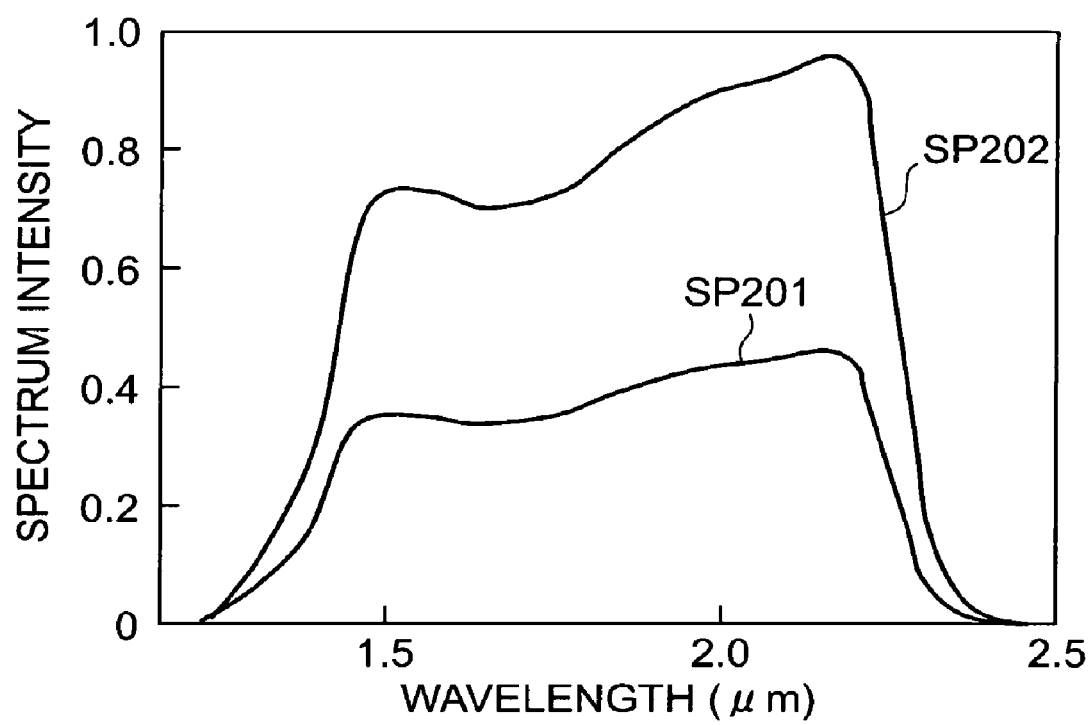
FIG. 19 is a graph showing an example of the spectral shape of the SC light generated in the optical fiber of the light source apparatus according to the second embodiment.

Here, FIG. 19 shows spectra of SC light P2 generated by the optical fiber 211. In FIG. 19, the spectrum SP201 is a spectrum of SC light P2 that corresponds with the output waveform P200A shown in the area (a) of FIG. 18 and spectrum SP202 is a spectral shape of SC light P2 that corresponds with the output waveform P200B shown in the area (b) of FIG. 18. In FIG. 19, the vertical axis is the normalized spectrum intensity.

When the spectrum SP201 and spectrum SP202 shown in FIG. 19 are compared, it is judged that, in comparison with the value of the frequency of repetition of the optical pulse train P1 that enters the optical fiber 211, the total power (temporal average power) of the SC light P2 increases. Further, the respective spectral waveforms of the spectra SP201 and SP202 (state of undulation along the wavelength axis) are substantially the same. In other words, it is judged that the ratio of the spectrum intensities before and after the change are substantially equal over all the bandwidths and it is known that the spectral waveform is suitably maintained.

In other words, in the second embodiment, the spectral shape of the individual optical pulses contained in the SC light P2 are the same irrespective of a change in the frequency of repetition of the SC light P2. Therefore, the temporal average power and spectral shape of the SC light P2 are a combination of the individual spectrum intensities that correspond with the frequency of repetition of the SC light P2. As a result, the power of the SC light P2 can be changed in proportion to the frequency of repetition while maintaining the spectral waveform of the SC light P2.

Thus, according to the light source apparatus 201a (or light source apparatus 201b) according to the second embodiment, the power of the SC light P2 (temporal average power) can be changed by the time division multiplexing processing section 203 (or time division multiplexing processing section 204) while maintaining the spectral waveform of the SC light P2 emitted by the light source apparatus 201a. As a result, when the object to be measured in the infrared spectroscopy measurement is a low scatterer, for example, the temporal average power of the SC light P2 irradiated onto the object to be measured can be increased while maintaining the spectral waveform of the SC light P2, the measurement accuracy can be increased. Further, because the temporal average power of the SC light P2 irradiated onto the object to be measured can be suitably weakened while maintaining the spectral waveform of the SC light, deterioration and degeneration of the object to be measured due to the interaction between the SC light P2 and the object to be measured can be avoided.

First Modified Example of the Second Embodiment

Figure 20:
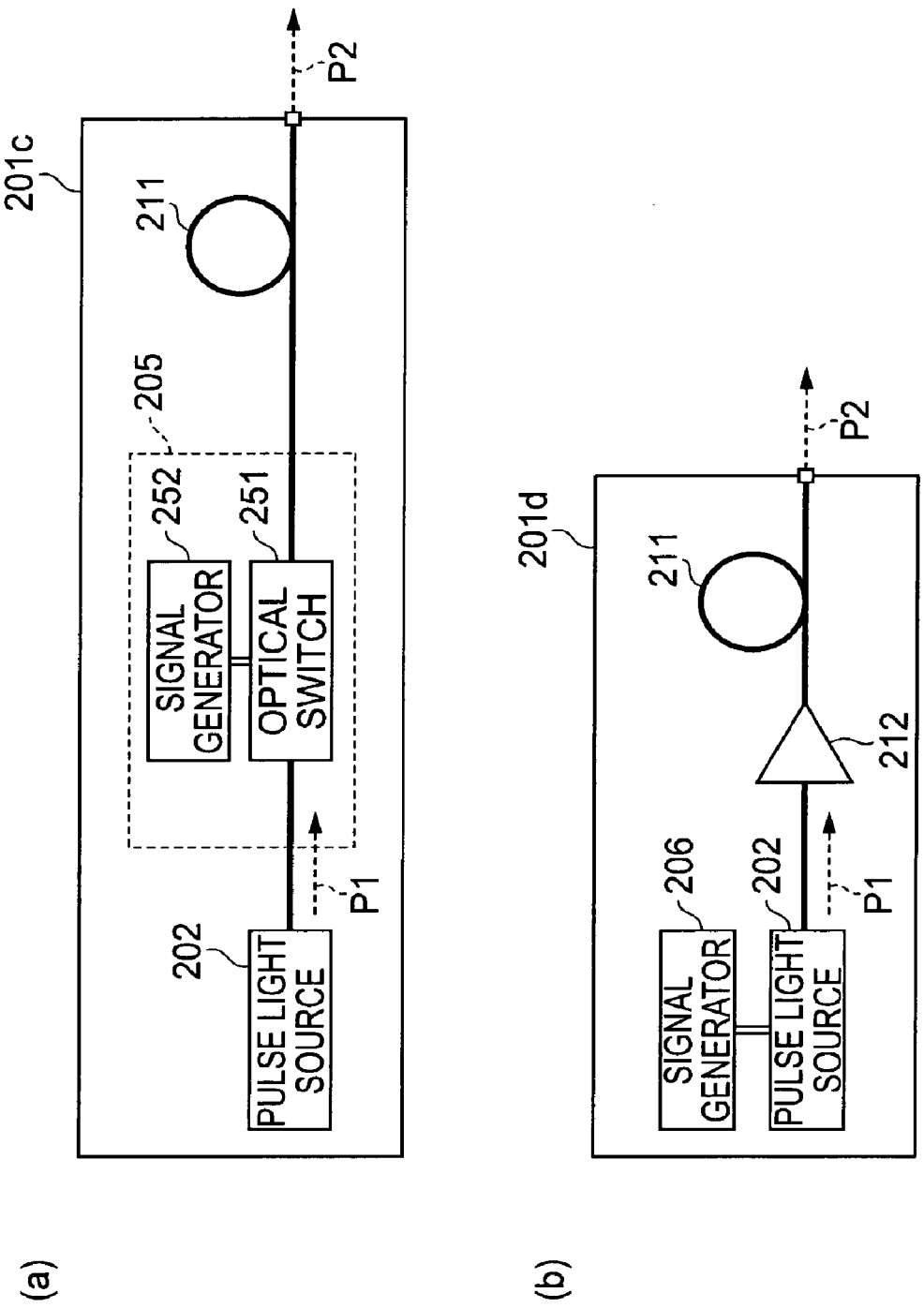
FIG. 20 shows the respective constitutions of the first and second modified examples of the light source apparatus according to the second embodiment.

The area (a) of FIG. 20 shows the constitution of the first modified example of the light source apparatus according to the second embodiment. The light source apparatus 201c according to the first modified example shown in the area (a) of FIG. 20 comprises the pulse light source 202, a pulse extraction section 205, and the optical fiber 211. Because the constitution of the pulse light source 202 and optical fiber 211 is the same as that of light source apparatuses 201a and 201b, a detailed description thereof is omitted.

The pulse extraction section 205 is contained in the power adjustment means for making the power of the SC light P2 variable. The pulse extraction section 205 changes the frequency of repetition of the SC light P2 by changing the frequency of repetition of the optical pulse train P1. As a result, the pulse extraction section 205 changes the temporal average power of the SC light P2.

More specifically, the pulse extraction section 205 is disposed in a state where the pulse light source 202 and optical fiber 211 are optically connected and comprises an optical switch 251 and signal generator 252. The optical switch 251 is a constituent element for extracting optical pulses cyclically from the optical pulse train P1 emitted by the pulse light source 202. Further, the signal generator 252 is a constituent element for driving the optical switch 251.

The signal generator 252 sends an electrical pulse signal having a cycle that is an integer multiple of the repetition cycle of the optical pulse train P1 to the optical switch 251. As a result, among the optical pulses contained in the optical pulse train P1, an optical pulse matching the timing of the electrical pulse signal is emitted by the pulse extraction section 5. Thus, the pulse extraction section 205 changes the frequency of repetition of the optical pulse train P1 that is introduced to the optical fiber 211 by extracting the optical pulses cyclically from the optical pulse train P1 emitted by the pulse light source 202.

Thereupon, the frequency of repetition of the SC light P2 emitted by the optical fiber 211 matches the frequency of repetition of the optical pulse train P1 introduced to the optical fiber 211. Hence, according to the light source apparatus 201c according to the first modified example, the frequency of repetition of the SC light P2 can be suitably changed and, therefore, as per the light source apparatuses 201a and 201b, the temporal average power of the SC light P2 can be changed while suitably maintaining the spectral waveform of the SC light P2 emitted by the light source apparatus 201c. Further, the signal generator 252 may be provided outside the light source apparatus 201c. In addition, the pulse extraction cycle of the pulse extraction section 205 is preferably variable and, in this case, the freedom for changing the temporal average power of the SC light P2 increases.

Second Modified Example of the Second Embodiment

The area (b) of FIG. 20 shows the constitution of the second modified example of the light source apparatus according to the second embodiment. The light source apparatus 201d according to the second modified example shown in the area (b) of FIG. 20 comprises the pulse light source 202, a signal generator 206, the optical fiber 211, and the optical amplifier 212. The constitution of the pulse light source 202 and optical fiber 211 is the same as that of the light source apparatuses 201a and 201b.

The signal generator 206 is included in the power adjustment means for making the power of the SC light P2 variable. The signal generator 206 changes the frequency of repetition of the SC light P2 by changing the frequency of repetition of the optical pulse train P1. As a result, the signal generator 206 changes the temporal average power of the SC light P2.

More specifically, the signal generator 206 changes the frequency of repetition when the pulse light source 202 emits the optical pulse train P1. For example, in cases where the pulse light source 202 is a pulse light source 202a of a first constitution which is shown in FIG. 15, the signal generator 206 corresponds to the signal generator 222b. Further, in cases where the pulse light source 202 is the pulse light source 202b of the second constitution shown in FIG. 16, the signal generator 206 corresponds to the signal generator 224c. Thus, as a result of changing the frequency of repetition of the optical pulse train P1 by directly controlling the pulse light source 202, the signal generator 206 is able to change the frequency of repetition of the SC light P2 by means of a simple constitution and is, accordingly, able to change the temporal average power of the SC light P2.

The optical amplifier 212 is disposed so as to be optically connected between the pulse light source 202 and optical fiber 211. The optical amplifier 212 is a constituent element for amplifying the optical pulse train P1 emitted by the pulse light source 202 and is constituted by an erbium-doped optical fiber (EDF), for example. The optical amplifier 212 is used to keep the point value of the power of the respective pulses substantially constant even in cases where the frequency of repetition of the optical pulse train P1 introduced to the optical fiber 211, has changed, for example.

Third Modified Example of the Second Embodiment

Figure 21:
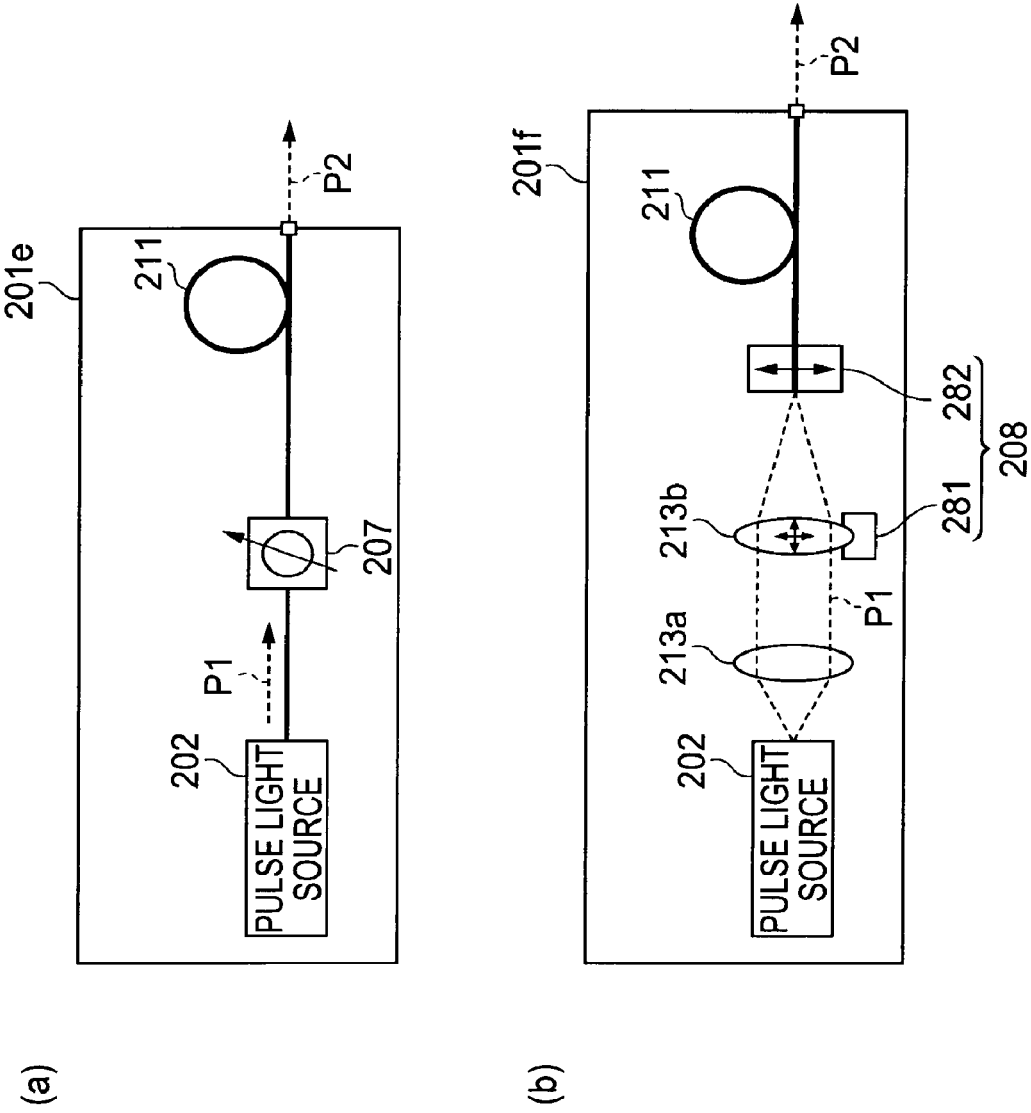
FIG. 21 shows the respective constitutions of the third and fourth modified examples of the light source apparatus according to the second embodiment.

The area (a) of FIG. 21 shows the constitution of the third modified example of the light source apparatus according to the second embodiment. The light source apparatus 201e according to the third modified example shown in the area (a) of FIG. 21 comprises a pulse light source 202, a variable attenuation rate optical attenuator 207, and an optical fiber 211. The constitution of the pulse light source 202 and optical fiber 211 is the same as that of the light source apparatuses 201a and 201b.

The optical attenuator 207 is included in power adjustment means for changing the power of the SC light P2. According to the third modified example, by changing the point value of the power waveform of the respective pulses contained in the optical pulse train P1, the power adjustment means changes the power of the SC light P2. More specifically, the optical attenuator 207 is disposed so as to be optically connected between the pulse light source 202 and optical fiber 211 and reduces the point value of the power waveform of the respective pulses contained in the optical pulse train P1 emitted by the pulse light source 202. Furthermore, the attenuation rate of the optical attenuator 207 is variable and the point value of the power waveform of the respective pulses contained in the optical pulse train P1 can be reduced using an optional attenuation rate.

By changing the point value of the power waveform of the respective pulses contained in the optical pulse train P1 as per the third modified example, for example, in addition to changing the frequency of repetition of the optical pulse train P1 as per the modified example, the power of the SC light can be changed to the desired intensity while suitably maintaining the spectral waveform of the SC light emitted by the light source apparatus 201e. Further, as per the third modified example, it is possible to control the point value of the power waveform of the respective pulses of the optical pulse train P1 without influencing the spectral shape, temporal waveform, and noise characteristic of the optical pulse train P1 by reducing the point value of the power waveform of the respective pulses contained in the optical pulse train P1 by means of the optical attenuator 7 and by making the attenuation rate variable. Hence, according to the light source apparatus 201e of the third modified example, the temporal average power of the SC light P2 can be accurately approximated accordingly to the desired intensity.

Fourth Modified Example of Second Embodiment

The area (b) of FIG. 21 shows the constitution of the fourth modified example of the light source apparatus according to the second embodiment. The light source apparatus 201f according to the fourth modified example shown in the area (b) of FIG. 21 comprises the pulse light source 202, an optical axis adjustment section 208, an optical fiber 211, a collimator lens 213a, and a condensing lens 213b. The constitution of the pulse light source 202 and optical fiber 211 is the same as that of the light source apparatuses 201a and 201b. In addition, the collimator lens 213a and condensing lens 213b are disposed between the pulse light source 202 and optical fiber 211. The optical pulse train P1 is collimated by the collimator lens 213a and then condensed by the condensing lens 213b.

The optical axis adjustment section 208 is included in the power adjustment means for changing the power of the SC light P2. The optical axis adjustment section 208 utilizes the optical axis shift between the pulse light source 202 and optical fiber 211 to change the optical coupling efficiency of the pulse light source 202 and optical fiber 211. Thereupon, because the point value of the power waveform of the respective pulses included in the optical pulse train P1 changes, the power of the SC light P2 can be changed. The optical axis adjustment section 208 according to the fourth modified example comprises a first drive section 281 that displaces the condensing lens 213b and a second drive section 282 that displaces the light entrance end of the optical fiber 211. The first drive section 281 displaces the condensing lens 213b in the optical axis direction and in a direction that intersects the optical axis direction to change the optical coupling efficiency of the pulse light source 202 and optical fiber 211. The second drive section 282 displaces the light entrance end of the optical fiber 211 in a direction that intersects the optical axis direction to change the optical coupling efficiency of the pulse light source 202 and optical fiber 211.

As per the fourth modified example, the power adjustment means (optical axis adjustment section 208) may change the point value of the power waveform of the respective pulses contained in the optical pulse train P1 by changing the optical coupling efficiency of the pulse light source 202 and optical fiber 211 by utilizing the optical axis shift between the pulse light source 202 and optical fiber 211. As a result, the temporal average power of the SC light P2 can be changed while suitably maintaining the spectral waveform of the SC light P2 emitted by the light source apparatus 201f and, in comparison with a case where an optical amplifier and optical attenuator are used (the third modified example above, for example), the light loss can be kept low.

Fifth Modified Example of the Second Embodiment

Figure 22:
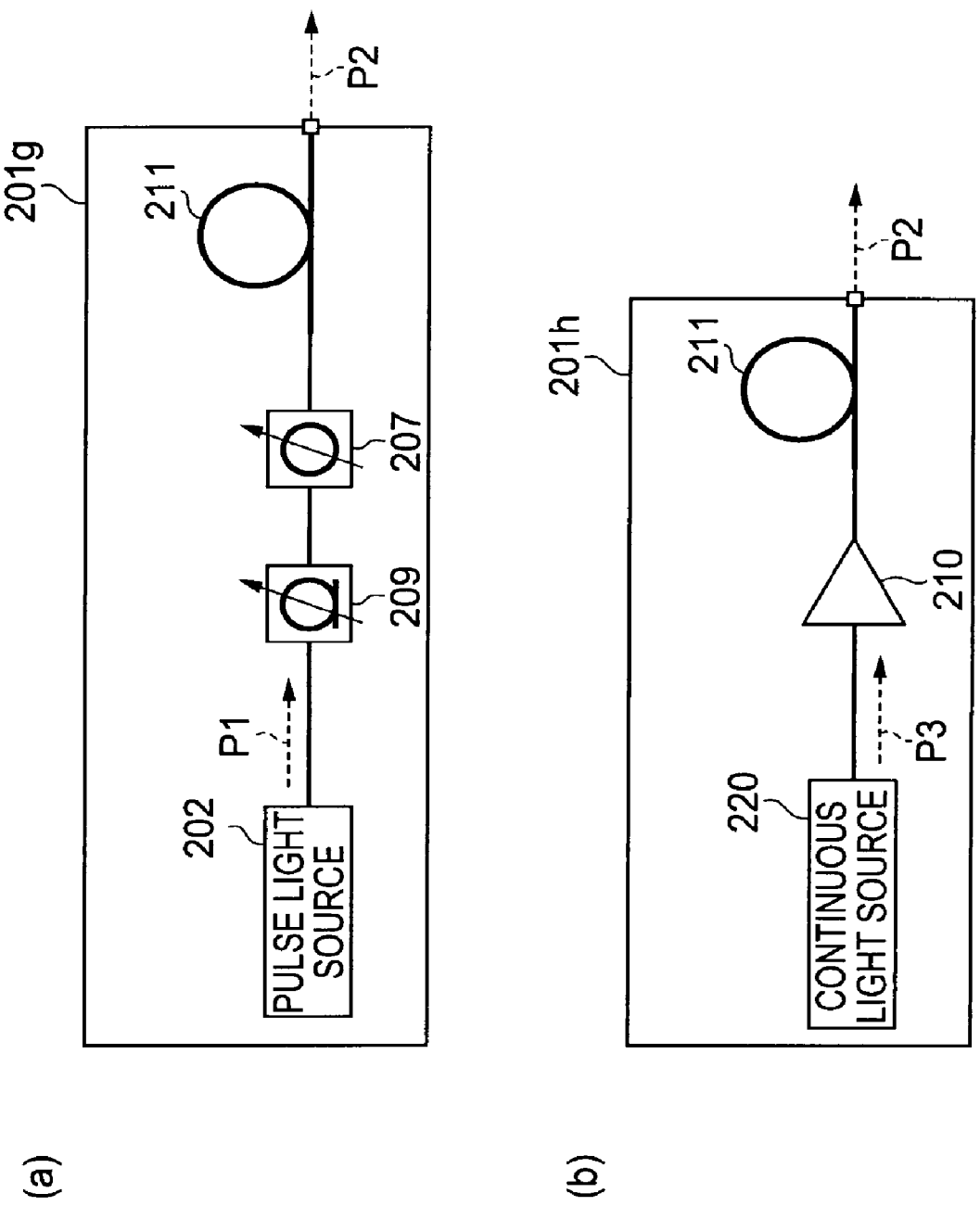
FIG. 22 shows the respective constitutions of the fifth and sixth modified examples of the light source apparatus according to the second embodiment.

The area (a) of FIG. 22 shows the constitution of the fifth modified example of the light source apparatus according to the second embodiment. A light source apparatus 201g according to the fifth modified example shown in the area (a) of FIG. 22 comprises the pulse light source 202, the variable attenuation optical attenuator 207, a pulse compressor/enlarger 209, and the optical fiber 211. The constitution of the pulse light source 202 and optical fiber 211 is the same as that of the light source apparatuses 201a and 201b. Further, the constitution of the optical attenuator 207 is the same as that of the third modified example (area (a) of FIG. 21).

The pulse compressor/enlarger 209 constitutes power adjustment means as well as the optical attenuator 207. More specifically, the pulse compressor/enlarger 209 is optically connected in series to the optical attenuator 207 between the pulse light source 202 and optical fiber 211. In this constitution, the spectral waveform of the SC light P2 is suitably maintained by changing the temporal waveform of the respective optical pulses contained in the optical pulse train P1. A dispersion device such as a variable dispersion compensator, for example, is suitable as the pulse compressor/enlarger 209.

As per the fifth modified example, the spectral waveform of the light P2 emitted by the light source apparatus 201g is also suitably maintained further by including the pulse compressor/enlarger 209.

Sixth Modified Example of the Second Embodiment

The area (b) of FIG. 22 shows the constitution of the sixth modified example of the light source apparatus according to the second embodiment. A light source apparatus 201h according to the sixth modified example which is shown in the area (b) of FIG. 22 comprises a continuous light source 220, an optical amplifier 210 having a variable gain, and the optical fiber 211. The constitution of the optical fiber 211 is the same as that of the light source apparatuses 201a and 201b.

The continuous light source 220 is a seed light source that emits continuous light P3. The continuous light source 220 supplies continuous light P3 to the optical fiber 211 via the optical amplifier 210. Further, even when the light emitted to the optical fiber 211 is continuous light, the SC light P2 can be generated in the optical fiber 211 as long as the continuous light has a relatively high power. Thereupon, the power of the continuous light P3 introduced to the optical fiber 211 is preferably 100 mW or more. As a result, the SC light P2 can be suitably produced in the optical fiber 211.

Furthermore, the optical amplifier 210 is included in the power adjustment means for changing the power of the SC light P2. The optical amplifier 210 changes the power of the SC light P2 to the desired value by changing the power of the continuous light P3. In other words, when the power of the continuous light P3 introduced to the optical fiber 211 is changed, the conditions for generating the pulse-shaped SC light P2 in the optical fiber 211 change. Hence, the frequency of repetition of the pulse-shape SC light P2 also change. Thus, according to the sixth modified example, the frequency of repetition of the SC light P2 can be changed by the power means (optical amplifier 210). Therefore, the temporal average power of the SC light P2 can be changed while suitably maintaining the spectral waveform of the SC light P2 emitted by the light source apparatus 201h as per light source apparatuses 201a and 201b.

Seventh Modified example of the Second Embodiment

Figure 23:
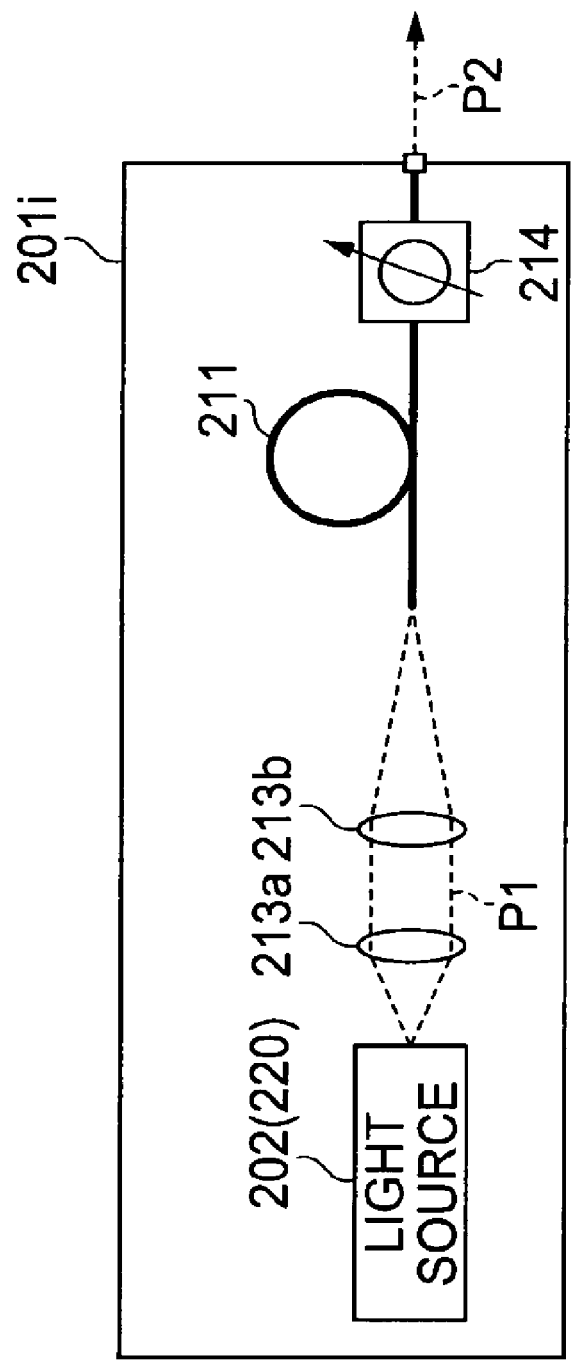
FIG. 23 shows the constitution of a seventh modified example of the light source apparatus according to the second embodiment.

FIG. 23 shows the constitution of the seventh modified example of the light source apparatus according to the second embodiment. A light source apparatus 201i according to the seventh modified example shown in FIG. 23 comprises the pulse light source 202 (or continuous light source 220), the optical fiber 211, the collimator lens 213a, the condensing lens 213b, and the optical attenuator 214 whose attenuation rate is variable. The constitution of the pulse light source 202 (or continuous light source 220) and optical fiber 211 is the same as that of the light source apparatuses 201a and 201b. Further, the constitution of the collimator lens 213a and condensing lens 213b is the same as that of the fourth modified example (FIG. 21B).

The optical attenuator 214 is included in the power adjustment means for changing the SC light P2. The optical attenuator 214 is optically connected to the light exit end of the optical fiber 211 and attenuates the temporal average power of the SC light P2 while substantially maintaining the spectral waveform of the SC light P2 emitted by the optical fiber 211. More specifically, the optical attenuator 214 attenuates the point value of the power waveform of the optical pulse comprising the SC light P2 while substantially maintaining the spectral waveform of the SC light P2 in the total wavelength region of the spectral bandwidths of the SC light P2 or in a partial wavelength region that is utilized in measurement.

In the seventh modified example, the wavelength dependence of the attenuation rate of the optical attenuator 214 in the whole spectral wavelength region of the SC light P2 or a partial wavelength region that is utilized in the measurement of the whole spectral bandwidth of the SC light P2 is preferably sufficiently small that it can be disregarded. For example, the difference between the maximum attenuation rate and the minimum attenuation rate of the optical attenuator 214 in the wavelength region is preferably equal to or less than 20 dB. In addition, the wavelength dependence of the attenuation rate in the variation range of the attenuation rate required for measurement (10 dB, for example) is preferably small enough to be disregarded in the desired wavelength region. As an optical attenuator 214 for which the wavelength dependence of the attenuation rate in a partial wavelength region of the SC light P2 is small, a filter-type optical attenuator that blocks light outside the bandwidth, for example, may be cited.

Here, the area (a) of FIG. 24 shows the spectra of the output light from the optical attenuator 214 in a case where the wavelength dependence of the attenuation rate of the optical attenuator 214 is sufficiently small in the whole spectral bandwidth of the SC light P2. Further, the area (b) of FIG. 24 shows the spectra of the output light from the optical attenuator 214 in a case where the wavelength dependence of the attenuation rate of the optical attenuator 214 is sufficiently small in a partial bandwidth of the spectral bandwidth of the SC light P2. Further, in the areas (a) and (b) in FIG. 24, the spectra SP203 and SP206 represent spectra of the SC light P2 prior to entering the optical attenuator 214; the spectra SP204 and SP207 represent output light spectra when the attenuation rate of the optical attenuator 214 is 2 dB; and the spectra SP205 and SP208 represent the output light spectra when the attenuation rate of the optical attenuator 214 is 6 dB. Furthermore, in the areas (a) and (b) in FIG. 24, the vertical axis is the normalized spectrum intensity.

As shown in the area (a) of FIG. 24 (or area (b) of FIG. 24), with the light source apparatus 201i according to the seventh modified example, it is judged that the wavelength dependence of the output light spectrum after attenuation of all or part of the spectral bandwidth of the SC light P2 is suitably maintained irrespective of the attenuation rate. Thus, with the light source apparatus 201i according to the seventh modified example, the optical intensity (that is, the temporal average power) of the SC light P2 can be changed while suitably maintaining all or part of the spectral waveform of the SC light P2 emitted by the light source apparatus 201i.

Eighth Modified Example of the Second Embodiment

The area (a) of FIG. 25 shows the constitution of the eighth modified example of the light source apparatus according to the second embodiment. A light source apparatus 201j according to the eighth modified example shown in the area (a) of FIG. 25 comprises the pulse light source 202 (or continuous light source 220), the optical fiber 211, and an optical amplifier 215 having a variable gain. The constitution of the pulse light source 202 (continuous light source 220) and optical fiber 211 is the same as that of the light source apparatuses 201a and 201b.

The optical amplifier 215 is included in the power adjustment means for changing the power of the SC light P2. The optical amplifier 215 is disposed so as to be optically connected to the light exit end of the optical fiber 211 and amplifies the temporal average power of the SC light P2 while substantially maintaining the spectral waveform of the SC light P2 emitted by the optical fiber 211. More specifically, the optical amplifier 215 amplifies the point value of the power waveform of the optical pulses comprising SC light P2 in the wavelength region amplified by the optical amplifier 215 in the spectral bandwidth of the SC light P2 while substantially maintaining the spectral waveform of the SC light P2 in this wavelength region. An erbium-doped fiber (EDFA) or the like that is capable of amplification in a wide wavelength region (1535 to 1605 nm) that ranges from the C band to the L band, for example, is suitably used as the optical amplifier 215.

Here, the area (b) of FIG. 25 illustrates the output optical spectra from the optical amplifier 15. Further, in area (b) of FIG. 25, the spectrum SP209 represents the spectrum of the SC light P2 prior to entering the optical amplifier 215 and the spectrum SP210 represents the output light spectrum when the gain of the optical amplifier 215 is 2.5 dB and the spectrum SP211 represents the output light spectrum when the gain of the optical amplifier 215 is 6 dB. Further, in the area (b) of FIG. 25, the vertical axis is the normalized spectrum intensity.

As shown in the area (b) of FIG. 25, with the light source apparatus 201j according to the eighth modified example, it is judged that the wavelength dependence of the spectral waveform of the amplified output light in the bandwidth amplified by the optical amplifier 215 (bandwidth A shown in the area (b) of FIG. 25) is suitably maintained irrespective of the gain. Thus, with the light source apparatus 201j according to the eighth modified example, the optical intensity (in other words, the temporal average power) of the SC light P2 can be changed while suitably maintaining all or part of the spectral waveform of the SC light P2 emitted by the light source apparatus 201j.

Ninth Modified Example of the Second Embodiment

The area (a) of FIG. 26 is a block diagram showing the constitution of the ninth modified example of the light source apparatus according to the second embodiment. The light source apparatus 201k according to the ninth modified example shown in the area (a) of FIG. 26 comprises the pulse light source 202, optical fiber 211, a pulse shaping section 216, and a control section 217a. The constitution of the pulse light source 202 and optical fiber 211 is the same as that of the light source apparatuses 201a and 201b.

The pulse shaping section 216 is included in the power adjustment means for changing the power of the SC light P2 and is disposed so as to be optically connected between the pulse light source 202 and optical fiber 211. Components that can be applied as the pulse shaping section 216 include, for example, the time division multiplexing processing sections 203 and 204 of the light source apparatuses 201a and 201b respectively shown in the areas (a) and (b) in FIG. 14, the pulse extraction section 205 according to the first modified example shown in the area (a) of FIG. 20, the optical attenuator 207 of the third modified example shown in the area (a) of FIG. 21, the optical axis adjustment section 208 according to the fourth modified example shown in the area (b) of FIG. 21, or the pulse compressor/enlarger 209 of the fifth modified example shown in the area (a) of FIG. 22.

In addition to the above constitution, the band-variable filter or the like, for example, can be applied as the pulse shaping section 216. In this case, the spectral waveform of the SC light P2 may be maintained by changing the spectral shape (the center wavelength in particular) of the optical pulse train P1 introduced to the optical fiber 211. The spectral shape of the SC light P2 is influenced by the spectral shape of the optical pulse train P1 and, in particular, the center wavelength in addition to being influenced by the dispersion characteristic of the optical fiber 211. Hence, as a result of the insertion of the band-variable filter between the pulse light source 202 and optical fiber 211, the temporal average power of the SC light P2 can be changed while suitably maintaining the spectral waveform of the SC light P2 emitted by the light source apparatus 201k.

Further, in addition to the above constitution, the pulse shaping section 216 may change the power of the SC light P2 by changing the polarization direction of the optical pulse train P1 that is introduced to the optical fiber 211. The spectral shape of the SC light P2 is influenced by the polarization of the optical pulse train P1 and the polarization dependence of the optical fiber 211. Hence, according to the constitution, the temporal average power of the SC light P2 can be changed while more suitably maintaining the spectral waveform of the SC light P2 emitted by the light source apparatus 201k according to the ninth modified example.

The control section 217a according to the ninth modified example also functions as the power adjustment means for making the power of the SC light P2 variable. In other words, the control section 217a sends an electrical control signal 51 for controlling the output power of the excitation laser light source of the pulse light source 202 (the semiconductor laser device 221 shown in FIGS. 15 to 17, for example) to the pulse light source 202. This control changes the output power of the excitation laser light source and the point value of the power waveform of the respective pulses contained in the optical pulse train P1. For example, although the optical attenuator 207 is used to change the point value of the power waveform of the respective pulses of the optical pulse train P1 in the third modified example above (see the area (a) of FIG. 21), the point value of the power waveform of the respective pulses of the optical pulse train P1 can also be easily changed by changing the output power of the excitation laser light source. In addition, the output power of the excitation laser light source can be easily controlled by means of a current amount that is supplied to the excitation laser light source. Therefore, as a result of this constitution, the point value of the power waveform of the respective pulses of the optical pulse train P1 can be easily changed by using one parameter such as the current amount of the excitation laser light source. Accordingly, the temporal average power of the SC light P2 can be easily changed while suitably maintaining the spectral waveform of the SC light P2 emitted by the light source apparatus 201k according to the ninth modified example.

Furthermore, the control section 217a is also able to vary the power of the SC light P2 by changing the frequency of repetition of the optical pulse train P1. In other words, the control section 217a sends the control signal 51 for changing the cavity length of the pulse light source 202 to the pulse light source 202. Thereupon, because the frequency of repetition of the optical pulse train P1 emitted by the pulse light source 202 changes, the frequency of repetition of the SC light P2 changes. As a result, the temporal average power of the SC light P2 changes. The control signal 51 is sent to a signal generator or the like for controlling the positions of the saturable absorber mirror 225 and mirror 227c of the pulse light source 202c of the third constitution shown in FIG. 17, for example. Further, the length of the cavity CA can be changed as a result of the saturable absorber mirror 225 and mirror 227c changing position in accordance with control signal 51. Accordingly, the frequency of repetition of the SC light P2 can be suitably changed and the temporal average power of the SC light P2 can be easily changed while maintaining the spectral waveform of the SC light P2 emitted by the light source apparatus 201k according to the ninth modified example.

The control section 217a more preferably maintains the spectral waveform of the SC light P2 emitted by the light source apparatus 201k according to the ninth modified example by controlling the temperature of the optical fiber 211. In other words, the control section 217a sends an electrical control signal S2 for performing temperature control of the optical fiber 211 to a temperature adjustment element 211a such as a Peltier element that is provided in contact with the optical fiber 211. Accordingly, because the dispersion characteristic of the optical fiber 211 can be suitably changed, the power of the SC light P2 can be approximated more accurately in accordance with the desired value while more suitably maintaining the spectral waveform of the SC light P2 emitted by the light source apparatus 201k. Further, the optical fiber 211 easily conducts the temperature of the temperature adjustment element 211a and is therefore preferably wound in a coil shape.

The control section 217a electrically controls the pulse shaping section 216 in order to obtain the desired power while maintaining the spectral waveform of the SC light P2. For example, in cases where the pulse shaping section 216 comprises the time division multiplexing processing sections 203 and 204 (areas (a) and (b) of FIG. 14), the control signal S3 for controlling the optical switch provided in the dividers 231 and 241 is sent to the pulse shaping section 216. In cases where the pulse shaping section 216 comprises the pulse extraction section 205 (area (a) of FIG. 20), control signal S3 for controlling the signal generator 252 is sent to the pulse shaping section 216. In cases where the pulse shaping section 216 comprises optical attenuator 207 (area (a) of FIG. 21) and pulse compressor/enlarger 209 (area (a) of FIG. 22), the control section 217a sends the control signal S3 for controlling the optical attenuator 207 and pulse compressor/enlarger 209 to the pulse shaping section 216. In cases where the pulse shaping section 216 comprises the optical axis adjustment section 208 (area (b) in FIG. 21), the control section 217a sends the drive signal for driving the first and second drive sections 281 and 282 to the pulse shaping section 216 as the control signal S3.

Thus, by providing the control section 217a for electrically controlling the pulse shaping section 216, the spectral waveform and temporal average power of the SC light P2 emitted by the light source apparatus 201k according to the ninth modified example can be automatically controlled or remotely controlled. Further, replacement of parts is also unnecessary and the temporal average power of the SC light P2 can be easily adjusted to the desired value. In addition, even in cases where power is adjusted so as to be different for each object to be measured, adjustment can be performed in a short time.

Tenth Modified Example of the Second Embodiment

The area (b) of FIG. 26 is a block diagram showing the constitution of the tenth modified example of the light source apparatus according to the second embodiment. A light source apparatus 201m according to the tenth modified example that is shown in the area (b) of FIG. 26 comprises the pulse light source 202 (or continuous light source 220), the optical fiber 211, a control section 217b, an optical amplifier 218, and a power adjustment section 219. The constitution of the pulse light source 202 (continuous light source 220) and optical fiber 211 is the same as that of the light source apparatuses 201a and 201b.

The optical amplifier 218 is contained in the power adjustment means for changing the power of the SC light P2. The optical amplifier 218 changes the temporal average power of the SC light P2 by changing the point value of the power waveform of the respective pulses contained in the optical pulse train P1. The optical amplifier 218 has a variable gain and receives the control signal S4 for controlling the gain from the control section 217a and amplifies the optical pulse train P1 (or continuous light P3 from the continuous light source 220) from the pulse light source 202 at a gain that corresponds with the control signal S4.

As per the tenth modified example, the power adjustment means may be the optical amplifier 218 having a variable gain that is disposed so as to be optically connected between the pulse light source 202 (continuous light source 220) and optical fiber 211. As a result, the power of the SC light P2 can be easily controlled to the desired intensity. In this case, the output power of the pulse light source 202 (continuous light source 220) may be constant and, therefore, the optical pulse train P1 is obtained stably. Further, in this case, the spectral shape of the light entering the optical amplifier 218 and the spectral shape of the light emitted by the optical amplifier 218 may also be different from one another. By also considering a variation in the spectral shape of the optical pulse train P1 in the optical amplifier 218 in addition to the point value of the power waveform of the respective pulses of the optical pulse train P1 introduced to the optical fiber, the power of the SC light P2 can be accurately approximated in accordance with the desired intensity while suitably maintaining the spectral waveform of the SC light P2 emitted by the light source apparatus 201m.

The power adjustment section 219 is included in another power adjustment means for changing the power of the SC light P2. The optical attenuator 214 according to the seventh modified example shown in FIG. 23 or the optical amplifier 215 according to the eighth modified example shown in the area (a) of FIG. 25, for example, can be applied to the power adjustment section 219. Further, the power adjustment section 219 may be a curved portion of variable curvature that is formed in the optical waveguide for emitting the SC light P2 outside the apparatus. As a result of the provision of such a curved portion in the optical waveguide for emitting SC light P2, the SC light P2 is provided with an optional bending loss and the power of the SC light P2 can be changed while suitably maintaining the spectral waveform of the SC light P2. The power adjustment section 219 receives control signal S5 for controlling the temporal average power and spectral waveform of the SC light P2 from the control section 217b. Further, the power adjustment section 219 changes the gain and attenuation rate or changes the curvature of the optical waveguide to establish a spectral waveform and temporal average power that correspond with the control signal S5.

In addition to the control signals S4 and S5 above, the control section 217b sends the control signal 51 for controlling the output power of the excitation laser light source of the pulse light source 202 (continuous light source 220) to the pulse light source 202 (continuous light source 220) as per the control section 217a of the ninth modified example. Accordingly, the point value (maximum power of the continuous light P3) of the power waveform of the optical pulse train P1 is changed by changing the output power of the excitation laser light source. Furthermore, the control section 217b changes the dispersion characteristic of the optical fiber 211 by sending the control signal S2 for performing temperature control of the optical fiber 211 to the temperature adjustment element 211a provided in contact with the optical fiber 211.

Eleventh Modified Example of the Second Embodiment

Figure 27:
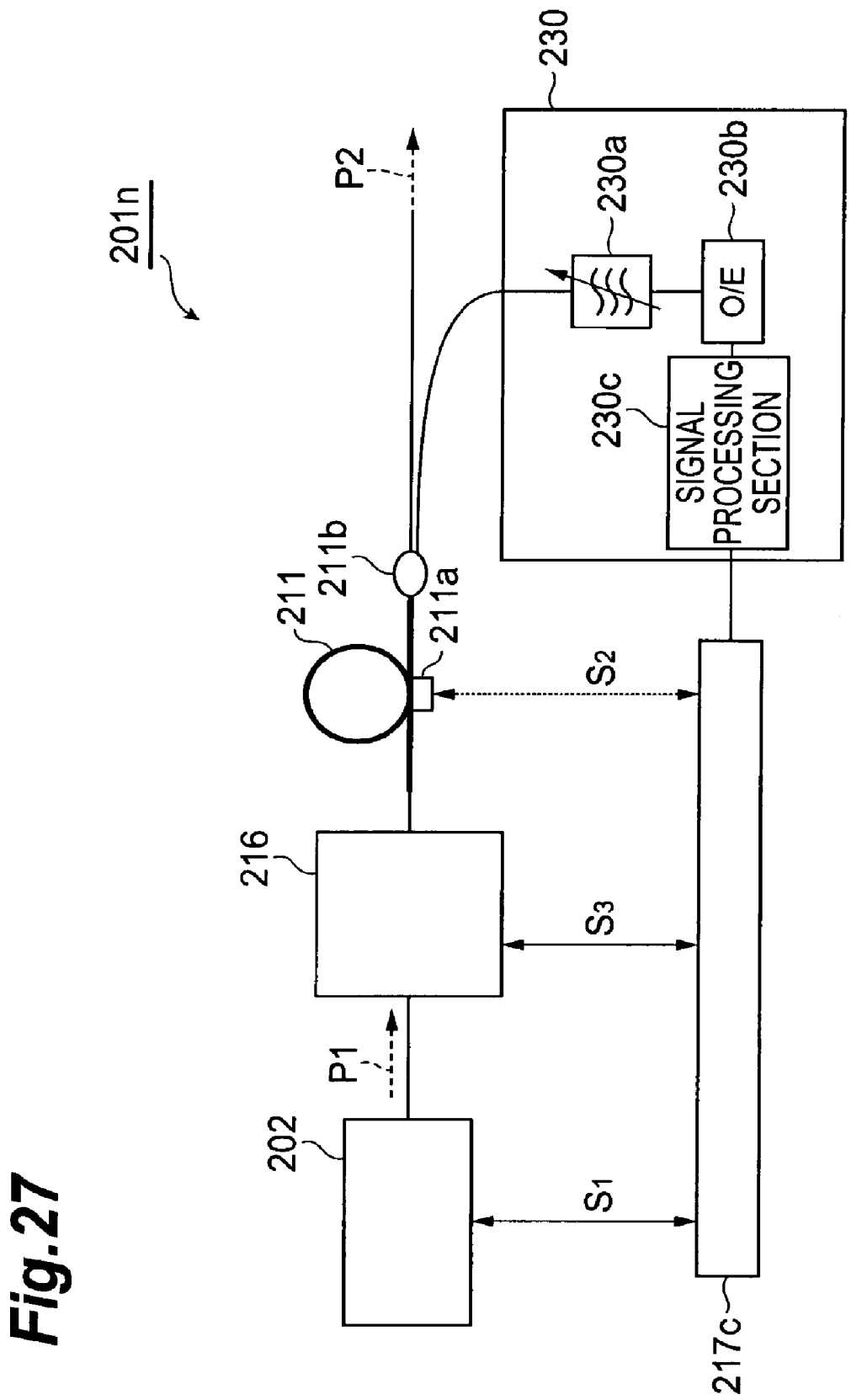
FIG. 27 is a graph showing the constitution of an eleventh modified example of the light source apparatus according to the second embodiment.

FIG. 27 is a block diagram showing the constitution of the eleventh modified example of the light source apparatus according to the second embodiment. The light source apparatus 201n according to the eleventh modified example shown in FIG. 27 comprises the pulse light source 202, the optical fiber 211, the pulse shaping section 216, a control section 217c, and a detector 230. The constitution of the pulse light source 202, optical fiber 211, and pulse shaping section 216 is the same as that of the light source apparatuses 201a and 201b.

The detector 230 is included in the detection means for detecting at least one of the temporal average power and spectral shape of the SC light P2. The detector 230 is optically connected via the exit end of the optical fiber 211 and divider 211b and captures a portion of the SC light P2. The detector 230 comprises a wavelength-variable filter 230a, an optical detection element 230b, and a signal processing section 230c. The partial SC light P2 captured by the detector 230 is O/E converted by the optical detection element 230b after passing through the wavelength-variable filter 230a to yield a cyclical electrical signal. Further, at least one of the temporal average power and spectral shape of the signal processing section 230c is detected based on the electrical signal. The detection result is sent to the control section 217c.

The control section 217c generates control signal S1 for changing the output power of excitation laser light source of the pulse light source 202, the control signal S2 for performing temperature control of the optical fiber 211, and the control signal S3 for controlling the pulse shaping section 216 on the basis of the detection result from the detector 230. The control signal S1, control signal S2, and control signal S3 thus generated are sent to the pulse light source 202, temperature adjustment element 211a and pulse shaping section 216 respectively. Thus, by detecting at least one of the temporal average power and the spectral shape of the SC light P2 by means of the detector 230, the power adjustment means (pulse shaping section 216 and control section 217c) can be subjected to feedback control by utilizing the detection result. In other words, maintenance of the spectral waveform of the SC light P2 and highly accurate and stable control of the power of the SC light P2 are possible.

The light source apparatus according to the second modified example is not limited to the above constitution. It is possible to make a variety of modifications and add constituent elements. For example, although a variety of aspects of the power adjustment means were described in the description of the above embodiment and modified example, the light source apparatus according to the second embodiment may be a constitution in which an optional plurality of means among the power adjustment means above are combined.

Third Embodiment

The third embodiment of the light source apparatus according to the present invention will be described in detail hereinbelow with reference to FIGS. 28 to 39.

Figure 28:
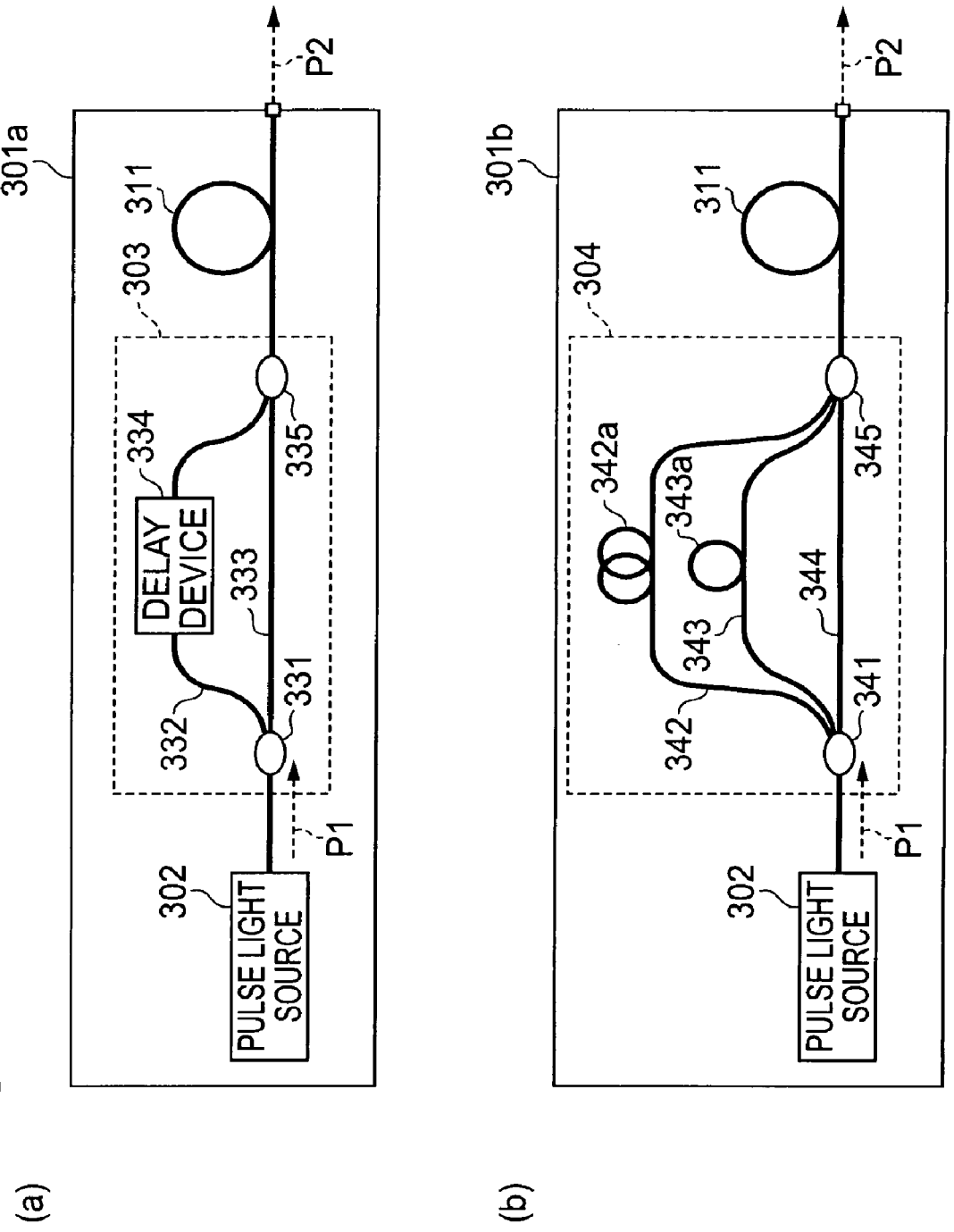
FIG. 28 shows a representative constitution of a third embodiment of a light source apparatus of the present invention.

FIG. 28 shows a representative constitution of a third embodiment of the light source apparatus according to the present invention. The light source apparatus 301a shown in the area (a) of FIG. 28 comprises a pulse light source 302, a time division multiplexing processing section 303, and an optical fiber 311. The pulse light source 302 is a seed light source according to the third embodiment that emits the optical pulse train P1 upon receipt of a supply of power from the power supply device.

Furthermore, the optical fiber 311 is optically connected to the pulse light source 302 via the time division multiplexing processing section 303 and emits an SC optical pulse train P2 that contains supercontinuum (SC) light upon receipt of the optical pulse train P1. More specifically, the optical fiber 311 generates the SC optical pulse train P2 by enlarging the spectral width of the optical pulse train P1 by a factor of two or more, for example. Further, the center wavelength of the optical pulse train P1 is preferably close to 1550 nm. As a result, SC light can be efficiently generated in a low-loss region of the optical fiber 311.

The time division multiplexing processing section 303 includes frequency adjustment means for changing the frequency of repetition of the SC optical pulse train P2. The time division multiplexing processing section 303 is disposed in an optically connected state between the pulse light source 302 and optical fiber 311 and comprises a divider 331, a plurality of optical waveguides 332 and 333, a delay device 334, and a combiner 335. The divider 331 divides the optical pulse train P1 from the pulse light source 302 off to the optical waveguide 332 and 333. The delay device 334 temporally delays the optical pulse train P1. The delay device 334 is provided in one of the optical waveguides 332 and 333 (the optical waveguide 332 in the third embodiment). Further, the combiner 335 combines the optical pulse train P1 from the optical waveguides 332 and 333. The divider 331 is provided with an optical switch for electing to divide off the optical pulse train P1 to the optical waveguides 332 and 333 or guide the optical pulse train P1 to only the optical waveguide (optical waveguide 433) in which the delay device 334 is not provided.

The light source apparatus 301b shown in the area (b) of FIG. 28 comprises the pulse light source 302, a time division multiplexing processing section 304, and an optical fiber 311. The constitution and functions of the pulse light source 302 and optical fiber 311 are the same as those of the light source apparatus 301a.

The time division multiplexing processing section 304 is included in the frequency adjustment means for changing the frequency of repetition of the SC optical pulse train P2. The time division multiplexing processing section 304 is disposed in an optically connected state between the pulse light source 302 and optical fiber 311 and comprises a divider 341, a plurality of optical waveguides 342 to 344 and a combiner 345. The divider 341 divides off the optical pulse train P1 from the pulse light source 302 to the optical waveguides 342 to 344. Further, the combiner 345 combines the optical pulse train P1 from the optical waveguides 342 to 344.

Delay paths 342a and 343a are disposed in some of the optical waveguides 342 and 343 respectively of the optical waveguides 342 to 344. The delay paths 342a and 343a are parts for temporally delaying the optical pulse train P1 that passes through the optical waveguides 342 and 343 and constitute the delay section of the time division multiplexing processing section 304. Further, the delay path 342a is longer than the delay path 343a and the delay time of the optical pulse train P1 increases for the optical waveguide 342, optical waveguide 343, and optical waveguide 344 in that order. The divider 341 is provided with an optical switch for electing to divide off the optical pulse train P1 to the optical waveguides 342 to 344 or guide the optical pulse train P1 to only the optical waveguide (optical waveguide 344) in which a delay path is not provided.

Figure 29:
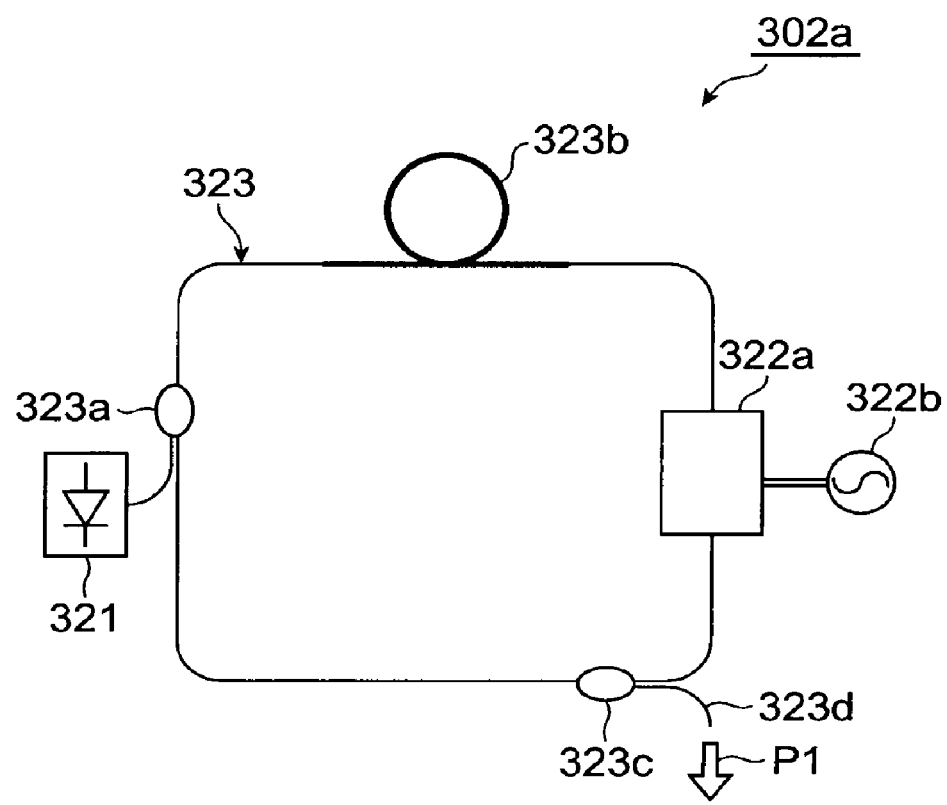
FIG. 29 shows a first constitution of the pulse light source that can be applied to the light source apparatus according to the third embodiment.

FIG. 29 shows the constitution of a pulse light source 302a as a first constitution of the pulse light source 302 that can be applied to the light source apparatus according to the third embodiment. The pulse light source 302a is a so-called active-mode synchronization-type ultrashort pulse light generator which is constituted by a ring-type resonator. In other words, the pulse light source 302a comprises a semiconductor laser device 321, an LN modulator 322a, a signal generator 322b that drives the LN modulator 322a, and a ring-like cavity (optical waveguide) 323. The semiconductor laser device 321 is optically connected to the ring-like part of the cavity 323 via the coupler 323a. Further, the ring-like part of the cavity 323 is optically connected to an output optical waveguide 323d via a coupler 323c. An erbium-doped fiber (EDF) 323b and the LN modulator 322a are optically connected in series to the ring-like part of the cavity 323.

When the signal generator 322b sends an electrical pulse signal of a predetermined frequency to the LN modulator 322a, the optical loss of the LN modulator 322a decreases at the cycle corresponding with the frequency. The excitation light from the semiconductor laser device 321 is introduced to the ring-like part of the cavity 323. Further, if the LN modulator 322a is controlled so that oscillation occurs when the phases of the respective modes contained in the light excited by the excitation light are in sync, ultrashort pulse laser light with a pulse width on the order of a few femtoseconds is produced and cyclically emitted to the outside from the output optical waveguide 323d. The light source apparatuses 301a and 301b shown in the areas (a) and (b) in FIG. 28 utilize the cyclical ultrashort pulse light as the optical pulse train P1.

Thereupon, the frequency of repetition of the optical pulse train P1 matches the frequency of the electrical pulse signal that is sent to the LN modulator 322a by the signal generator 322b.

Figure 30:
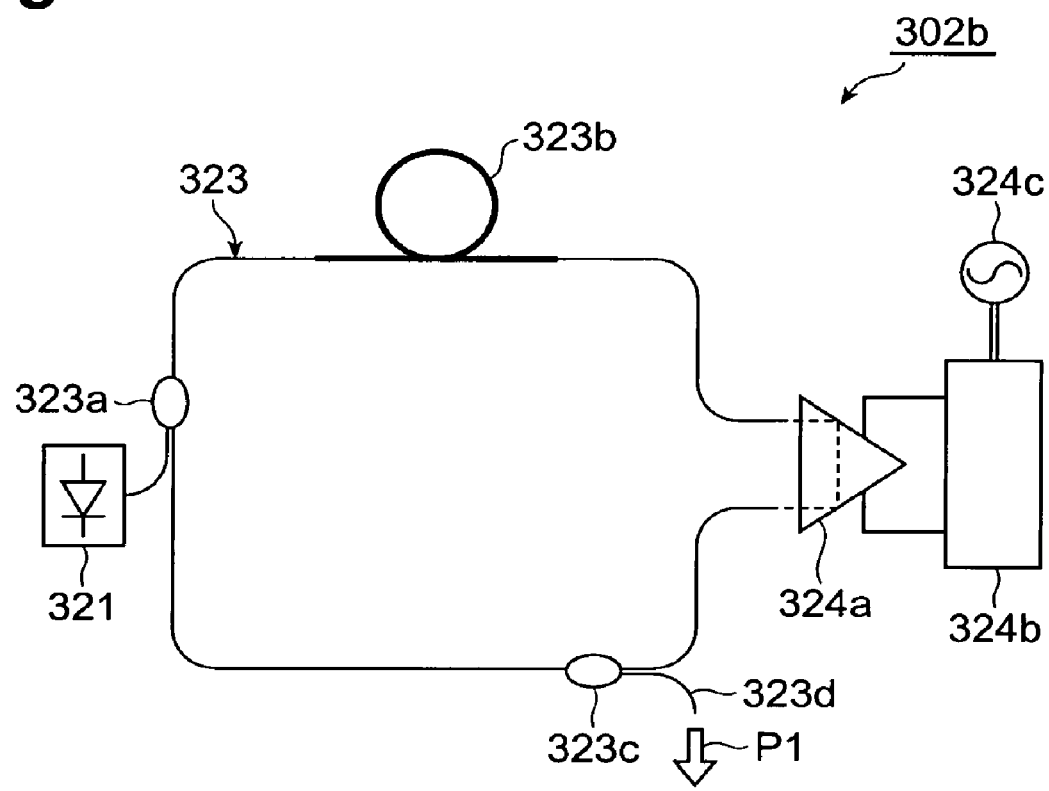
FIG. 30 shows a second constitution of the pulse light source that can be applied to the light source apparatus according to the third embodiment.

Furthermore, FIG. 30 shows the constitution of the pulse light source 302b as the second constitution of the pulse light source 302. The pulse light source 302b is a so-called passive-mode synchronization-type ultrashort pulse light source which is constituted by a ring-type resonator. In other words, the pulse light source 302b comprises a semiconductor laser device 321, a ring-like cavity (optical waveguide) 323, a minor reflector 324a, a piezo motor 324b that is attached to the mirror reflector 324a, and a signal generator 324c that drives the piezo motor 324b. The second constitution pulse light source 302b is the same as the first constitution pulse light source 302a (FIG. 29) in that the semiconductor laser device 321 is coupled to the cavity 323, the cavity 323 has an output optical waveguide 323d, and the EDF 323b is optically coupled to the ring-like part of the cavity 323.

The pulse light source 302b is provided with a minor reflector 324a in place of the LN modulator 322a of the first constitution pulse light source 302a. The minor reflector 324a constitutes part of the ring-like part of the cavity 323 and the length of the ring-like part of the cavity 323 changes cyclically as a result of the vibratory motion of the position of the minor reflector 324a. The vibratory motion of the minor reflector 324a is supplied by the piezo motor 324b. Further, the frequency of vibratory motion is controlled by the signal generator 324c that drives the piezo motor 324b.

When the signal generator 324c sends an electrical pulse signal of a predetermined frequency to the piezo motor 324b, the length of the cavity 323 changes according to a cycle that corresponds with the frequency. The excited light from the semiconductor laser device 321 is made to enter the ring-like part of the cavity 323. Further, ultrashort pulse laser light having a pulse width on the order of a few femtoseconds is produced at the instant that the length of the cavity 323 satisfies the soliton condition. The ultrashort pulse light is emitted cyclically to the outside from the output optical waveguide 323d as the optical pulse train P1. Here, the frequency of repetition of the optical pulse train P1 matches the frequency of the electrical pulse signal sent to the piezo motor 324b by the signal generator 324c. In the case of the pulse light source 302b, because the cyclical ultrashort pulse light is produced as a result of the mirror reflector 324a being driven mechanically, there is a tendency for the frequency of repetition of the optical pulse train P1 to be small in comparison with the pulse light source 302a which has a constitution that electrically drives the LN modulator 322a.

Figure 31:
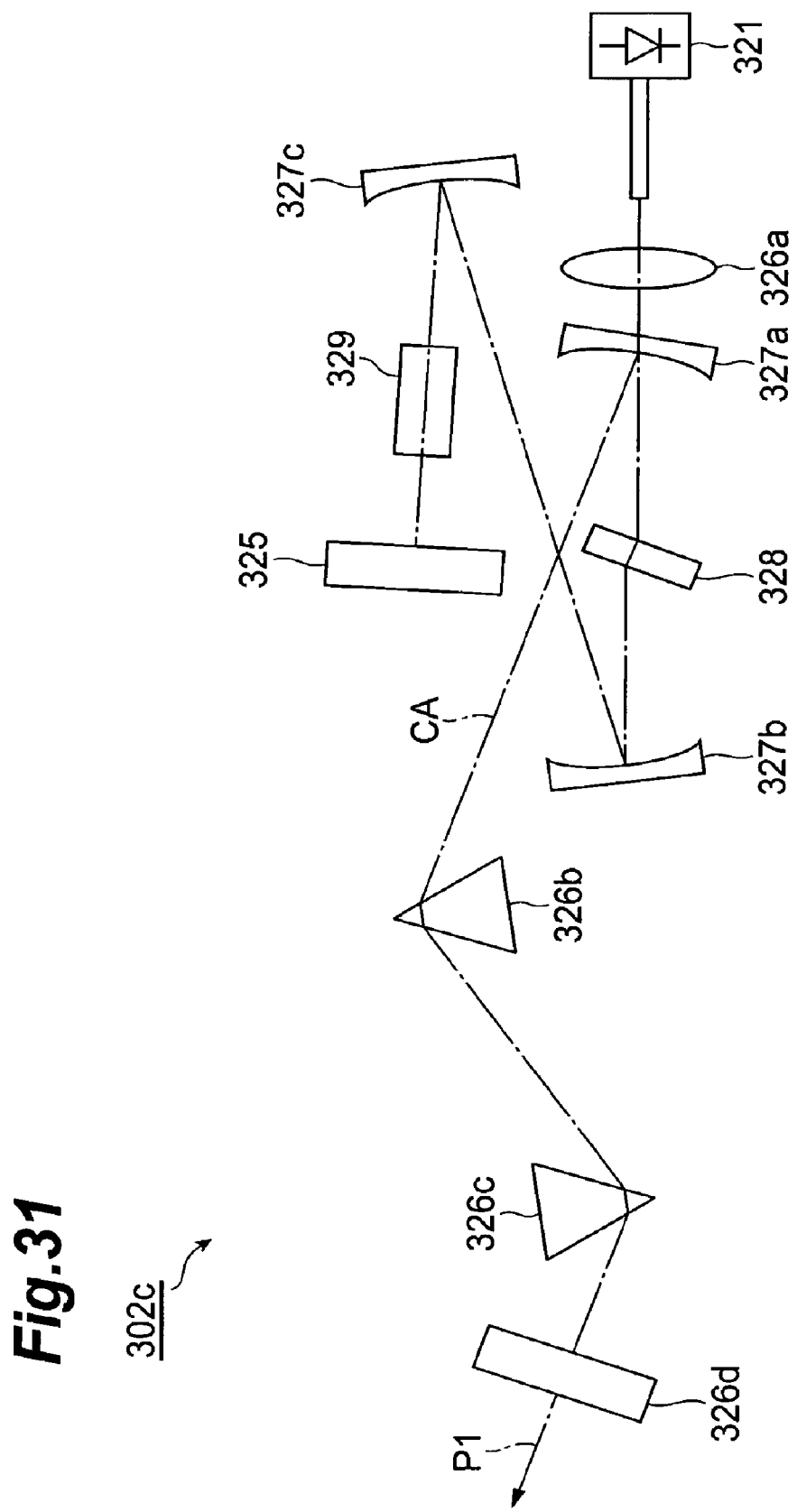
FIG. 31 shows a third constitution of the pulse light source that can be applied to the light source apparatus according to the third embodiment.

Furthermore, FIG. 31 shows the constitution of the pulse light source 302c as a third constitution of the pulse light source 302. The pulse light source 302c is a so-called passive mode synchronization-type ultrashort pulse light generation source and is constituted by a solid-state laser made of Er: Yb-co-doped glass. In other words, the pulse light source 302c comprises the semiconductor laser device 321, a saturable absorber mirror 325 in which a saturable absorber and minor reflector are integrally constituted, a collimator lens 326a, prisms 326b and 326c, an output coupler 326d, minors 327a to 327c, an Er: Yb-co-doped glass plate 328, and a transparent medium 329. Among these constituent elements, those constituent elements other than the semiconductor laser device 321 and collimator lens 326a constitute a cavity CA for laser oscillation and the transparent medium 329 is provided if necessary.

The excitation light emitted by the semiconductor laser device 321 reaches the Er: Yb-co-doped glass plate 328 via the collimator lens 326a and minor 327a and excites the Er: Yb-co-doped glass plate 328. The Er: Yb-co-doped glass plate 328 is disposed on cavity CA that comprises minors 327a to 327c together with the saturable absorber minor 325, prisms 326b and 326c, and output coupler 326d. The light passing along the cavity CA travels back and forth between the saturable absorber minor 325 and output coupler 326d while being amplified by the Er:Yb-co-doped glass plate 328.

The saturable absorber minor 325 possesses the property of absorbing weak light and reflecting strong light. Because the intensity of the light is maximum when the phases of the respective modes contained in the light that reaches the saturable absorber minor 325 are synchronized, the saturable absorber minor 325 functions as a minor reflector and laser oscillation occurs only at this moment. Therefore, the laser light is ultrashort pulse light having a pulse width on the order of a few femtoseconds and is emitted to the outside from the output coupler 326d as the optical pulse train P1. Here, the frequency of repetition of the optical pulse train P1 has a value that corresponds with the length of the cavity CA.

The operation of the light source apparatus 301a of the light source apparatuses 301a and 301b which have a constitution of this kind will now be described. Further, the operation of the light source apparatus 301b is substantially the same as the operation of the light source apparatus 301a.

The pulse light source 302 with any of the constitutions of the pulse light sources 302a to 302c shown in FIGS. 29 to 31 emits the optical pulse train P1 to the time division multiplexing processing section 303. The optical pulse train P1 is constituted having a row of cyclical (cycle T1) ultrashort pulse light with a pulse width of a few femtoseconds. Here, in cases where the divider 331 is set so that the optical pulse train P1 is divided off to the optical waveguides 332 and 333 in the time division multiplexing processing section 303, the optical pulse train P1 is divided off to the optical waveguides 332 and 333. Further, the optical pulse train P1 that proceeds to the first optical waveguide 332 is delayed by (T1/2) seconds, for example, by the delay device 334. Thereafter, the optical pulse train P1 that has proceeded to the optical waveguides 332 and 333 respectively is again combined by the combiner 335. Further, in cases where the divider 331 is set so that the optical pulse train P1 is not divided off to the optical waveguides 332 and 333 in the time division multiplexing processing section 303, the optical pulse train P1 proceeds along the optical waveguide 333.

Here, the areas (a) and (b) in FIG. 32 are graphs showing output waveforms P300A and P300B from the time division multiplexing processing section 303 in a case where the optical pulse train P1 is not divided by the divider 331 and in a case where the optical pulse train P1 is divided by the divider 331 respectively. In cases where the optical pulse train P1 is not divided off by the divider 331, the optical pulse train P1 is an output waveform that is output from the time division multiplexing processing section 303 as is as per the output waveform P300A shown in the area (a) of FIG. 32 and constitutes a waveform in which there is a row of optical pulses with a cycle T1. On the other hand, in cases where the optical pulse train P1 is divided off by the divider 331, the waveform is then a waveform in which there is a row of optical pulses with a cycle T2 which is half that of cycle T1 (=T1/2) of the optical pulse train P1 as per the output waveform P300B shown in the area (b) of FIG. 32. In this case, because the optical pulse train P1 is divided off by the divider 331, the maximum power PW2 of the respective optical pulses of the output waveform P300B are substantially half the maximum power PW1 of the respective optical pulses of the output waveform P300A.

Further, the maximum power PW1 of the respective optical pulses of the output waveform P300A is 80 kW, for example, and the maximum power PW2 of the respective optical pulses of the output waveform P300B is 40 kW, for example. In addition, the frequency of repetition of the output waveform P300A (that is, the inverse of the cycle T1 of the optical pulse train P1) is 25 MHz, for example, and the frequency of repetition of the output waveform P300B is 50 MHz, for example. The pulse width of the output waveform P300A and P300B is 200 femtoseconds, for example. Further, the temporal average power of the output waveforms P300A and P300B is 40 mW, for example.

Such an output waveform from the time division multiplexing processing section 303 is introduced to the optical fiber 311. Further, SC optical pulse train P2 in which the spectral bandwidth of the respective optical pulses has been extended by a factor of two or more as a result of the non-linear optical effect (adiabatic soliton compression effect) of the optical fiber 311 is generated. The SC optical pulse train P2 is emitted to the outside from the light exit end of the light source apparatus 301a. Further, the length of the non-linear part of the optical fiber 311 (interaction length) may be set at 2 meters, for example.

Figure 33:
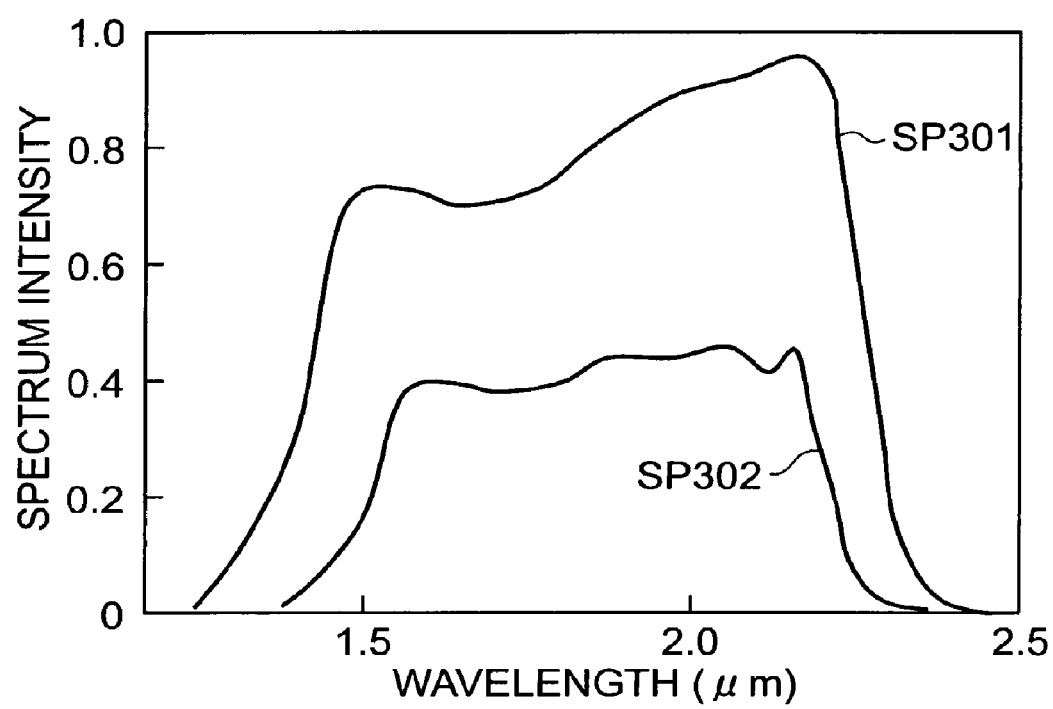
FIG. 33 is a graph showing the spectral shape of an SC optical pulse train generated in the optical fiber of the light source apparatus according to the third embodiment.

Here, FIG. 33 shows spectra of the SC optical pulse train P2 generated by the optical fiber 311. In FIG. 33, the spectrum SP301 shows the spectrum of the SC optical pulse train P2 that corresponds with the output waveform P300A shown in the area (a) of FIG. 32, the spectrum SP302 shows a spectrum of the SC optical pulse train P2 that corresponds with the output waveform P300B shown in the area (b) of FIG. 32. Further, in FIG. 33, the vertical axis is the normalized spectrum intensity.

In the case that the spectrum SP301 and spectrum SP302 shown in FIG. 33 are compared, although the spectrum intensity changes in accordance with the maximum power of the optical pulses entering the optical fiber 311, the overall spectral shape extends over a wide bandwidth and is judged to be mostly suitable for the SC light. The SC optical pulse train P2 with such a spectral shape is repeatedly emitted by the light source apparatus 301a with a frequency of repetition (1/T1) or (1/T2).

Thus, with the light source apparatus 301a (or light source apparatus 301b) according to the third embodiment, the frequency of repetition of the SC optical pulse train P2 can be varied by means of the time division multiplexing processing section 303. Accordingly, when the wavelength dependence of the fluorescence life of the object to be measured is examined, for example, the SC light can be irradiated with a cycle that corresponds with the length of the fluorescence life of various objects to be measured and, therefore, the measurement accuracy and measurement efficiency can be improved. Alternatively, in the case of an optical sampling waveform that utilizes the four-wave mixing phenomenon, sampling with optimum timing of the waveform to be measured is possible and the monitoring accuracy can be improved. In addition, the comb interval in the optical frequency comb (that is, the wavelength interval of the light) can be adjusted.

Figure 34:
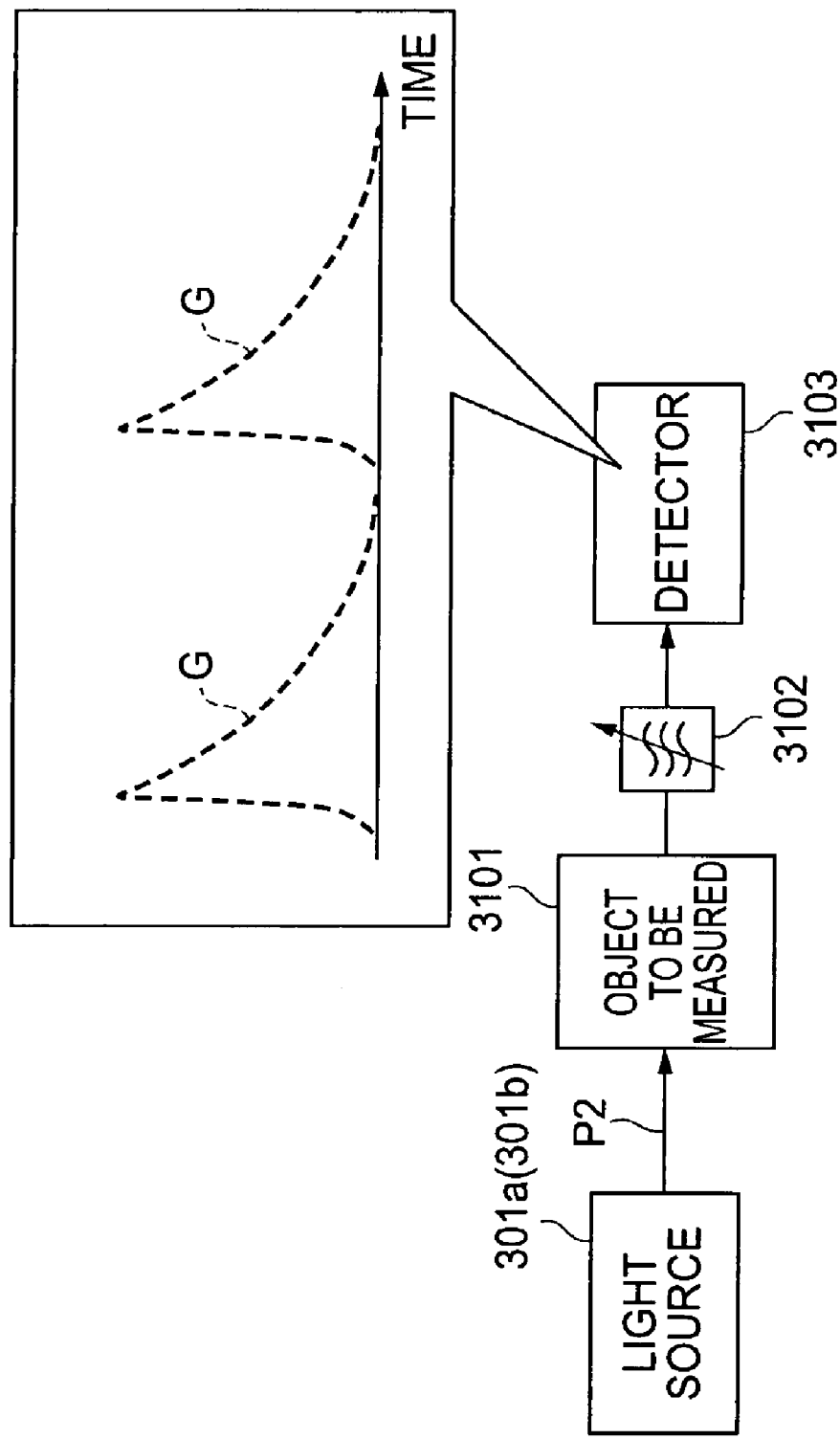
FIG. 34 shows a diagram for explaining the measurement of the wavelength dependence of the fluorescence life.

Here, FIG. 34 shows a diagram for explaining the measurement of the wavelength dependence of the fluorescence life. First, the SC optical pulse train P2 emitted by the light source apparatus 301a (301b) is irradiated onto the object to be measured 3101. Thereafter, the fluorescence emitted by the material to be measured that is contained in the object to be measured 3101 is detected by a detector 3103 via a wavelength-variable filter 3102. Here, because the fluorescence life varies according to wavelength, the wavelength dependence of the fluorescence life of the material to be measured is judged by sequentially measuring the fluorescence life for each wavelength. The method of carrying out such measurement is used when investigating the wavelength dependence of the fluorescence life of hemoglobin under certain oxygen saturation conditions, for example.

In the measurement of the wavelength dependence of the fluorescence life, as shown in FIG. 34, for example, graph G, which shows the temporal transition of the fluorescence intensity is obtained. This graph G is obtained using a cycle that corresponds with the frequency of repetition of the SC optical pulse train P2. Therefore, in cases where the frequency of repetition of the SC optical pulse train P2 is large with respect to the fluorescence life of the object to be measured (that is, the pulse interval is short), adjacent graphs G are superposed on one another and accurate measurement of the fluorescence life is then difficult. In such a case, according to the light source apparatus 301a (or 301b) of this embodiment, the frequency of repetition of the SC optical pulse train P2 can be changed by the time division multiplexing processing section 303 and, therefore, the SC optical pulse train P2 can be irradiated using a cycle that corresponds with the length of the fluorescence life of the object to be measured.

Figure 35:
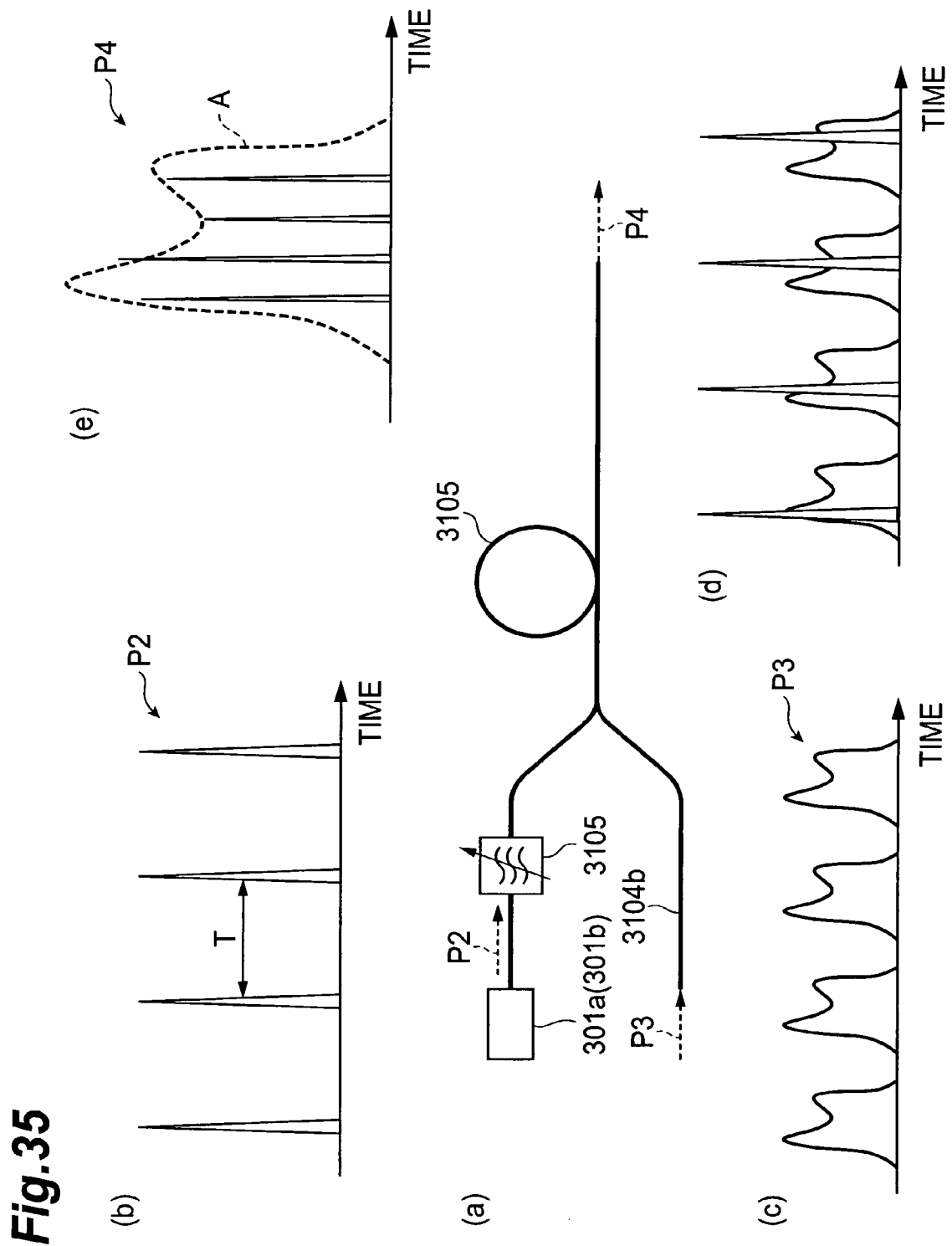
FIG. 35 shows diagrams for explaining an optical sampling waveform monitor that utilizes the four-wave mixing phenomenon.

Furthermore, the areas (a) to (e) of FIG. 35 show diagrams for explaining light sampling waveform monitoring that utilizes the four-wave mixing phenomenon. In this measurement system, as shown in the area (a) of FIG. 35, the SC optical pulse train P2 that is emitted by the light source apparatus 301a (301b) (see the area (b) of FIG. 35. Cycle is cycle T) is supplied to the optical fiber 3104a via a wavelength-variable filter 3105. Further, the optical pulse train P3 to be measured which is the measurement object (see the area (c) of FIG. 35) is introduced to the optical fiber 3104b. The wavelength-variable filter 3105 is set so that only the wavelength component suited to the sampling of the optical pulse train P3 to be measured in the wideband wavelength component of the SC optical pulse train P2 passes through the wavelength-variable filter 3105. The light that has passed through the wavelength-variable filter 3105 and the optical pulse train P3 to be measured are combined (See the area (d) in FIG. 35) and the result is sent to the high nonlinear optical fiber 3105. Thereafter, a converted optical pulse train P4 of cycle T (see the area (e) of FIG. 35) that has the maximum power corresponding with the waveform of the optical pulse train P3 to be measured is generated according to the four-wave mixing phenomenon of the high nonlinear optical fiber 3105. As a result, the envelope A of the converted optical pulse train P4 is confirmed as an enlarged waveform of the optical pulse train P3 to be measured.

In the optical sampling waveform monitoring that utilizes the four-wave mixing phenomenon, the timing for the superposition of the SC optical pulse train P2 on the waveform of the optical pulse train P3 to be measured becomes important. In other words, as shown in the area (d) of FIG. 35, envelope A shown in the area (e) of FIG. 35 is accurately obtained by superposing (sampling) the respective pulses of the SC optical pulse train P2 little by little onto the waveform of the waveform of the optical pulse train P3 to be measured. However, the waveform shown in the area (c) of FIG. 35 is an example of the optical pulse train P3 to be measured and the waveform and frequency and so forth of the optical pulse train P3 to be measured vary. With the light source apparatus 301a (301b) according to the third embodiment, by changing the frequency of repetition of the SC optical pulse train P2 in accordance with the waveform and frequency of the optical pulse train P3 to be measured, the optical pulse train P3 to be measured can be sampled with optimal timing with any waveform and frequency, whereby the monitoring accuracy can be improved.

The spectral width of the SC optical pulse train P2 in the light source apparatus 301a (301b) may be ten or more times the spectral width of the optical pulse train P1 received by the optical fiber 11. When the spectral width of the SC optical pulse train P2 is ten or more times the spectral width of the optical pulse train P1, the deformation of the spectral shape of the SC optical pulse train P2 that arises from the fluctuations in the characteristic of the optical pulse train P1 and optical fiber 11 (nonlinearity) is striking. Therefore, in such a case, the frequency of repetition of the SC optical pulse train P2 is desirably controlled by the frequency adjustment means (time division multiplexing processing sections 303 and 304 in the third embodiment). Further, in a case such as this one, the freedom in the spectrum control of the SC optical pulse train P2 can also be increased by making the frequency of repetition of the SC optical pulse train P2 variable.

In the light source apparatus 301a (301b), the frequency of repetition of the SC optical pulse train P2 is preferably 1 kHz or more but 1 GHz or less and the width of the variable range of the frequency adjustment means (time division multiplexing processing sections 303 and 304) is preferably equal to or more than 20% of the value of the center frequency in the variable range. As a result, fine adjustment of the measurement cycle in the measurement of the wavelength dependence of the fluorescence life, the sampling cycle in the optical sampling waveform monitoring, and the comb interval of the optical frequency comb, for example can be suitably performed.

In the light source apparatus 301a (301b), the frequency of repetition of the SC optical pulse train P2 may be 1 MHz or more but 100 MHz or less and the width of the variable range of the frequency adjustment means (time division multiplexing processing sections 303 and 304) may also be 20% or more of the value of the center frequency in the variable range. In particular, the frequency of repetition can be changed by 20% or more in the frequency range up to 100 MHz. Hence, stable low noise detection through synchronization with an optical detector disposed outside the light source apparatus 301a (301b) is possible while performing variable control of the spectral shape of the SC optical pulse train P2.

In addition, in the light source apparatus 301a (301b), the frequency of repetition of the SC optical pulse train P2 may be 10 MHz or more but 100 MHz or less, and the width of the variable range implemented by the frequency adjustment means (time division multiplexing processing sections 303 and 304) may be 10 MHz or more. As a result, the responsiveness of multiple materials can be suitably measured in the measurement of the wavelength dependence of the fluorescence life, for example. In addition, a sufficient variable range for the sampling cycle is obtained in the optical sampling waveform monitoring, for example.

First Modified Example of the Third Embodiment

Figure 36:
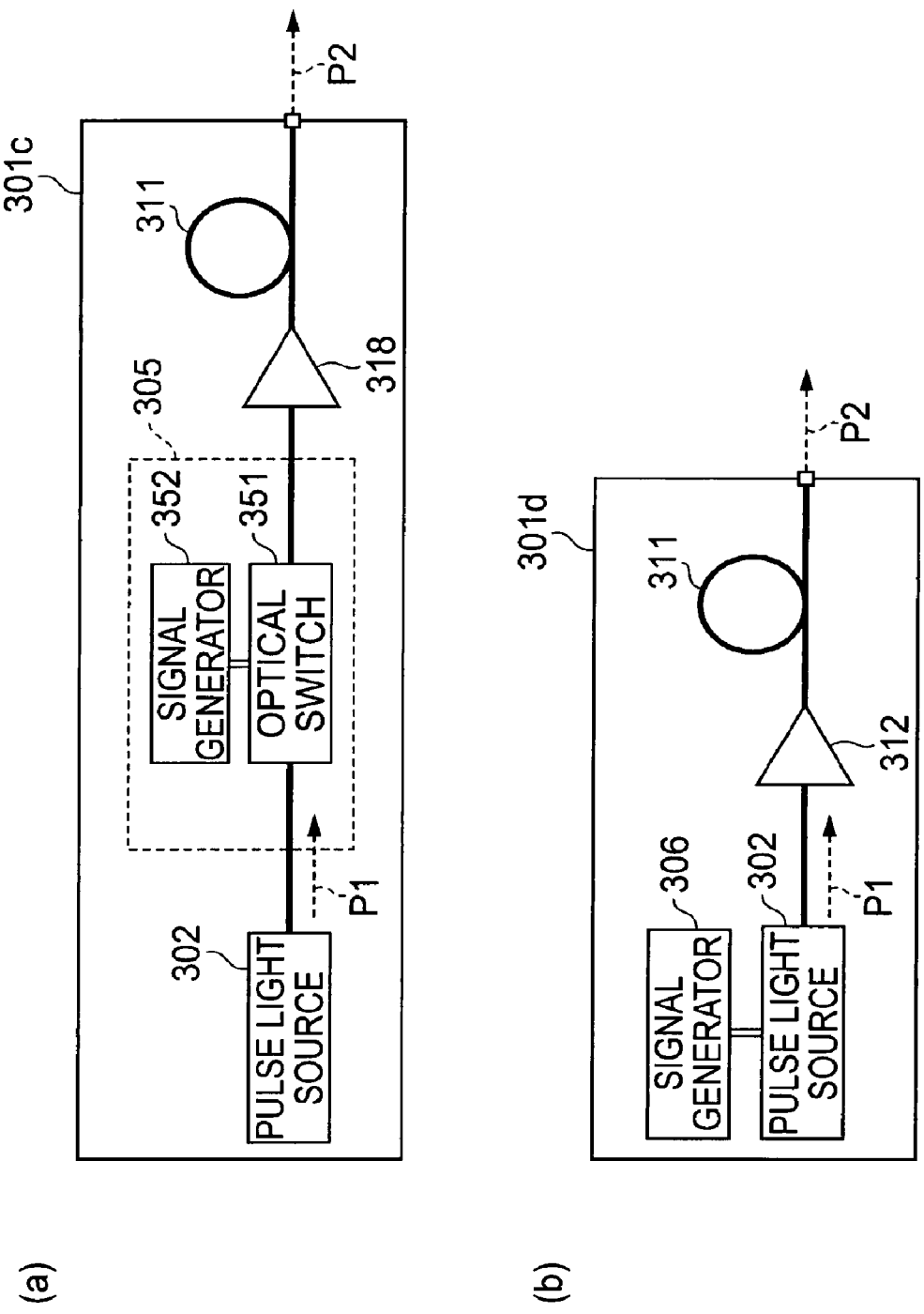
FIG. 36 shows the respective constitutions of the first and second modified examples of the light source apparatus according to the third embodiment.

The area (a) of FIG. 36 shows the constitution of the first modified example of the light source apparatus according to the third embodiment. The light source apparatus 301c according to the first modified example shown in the area (a) of FIG. 36 comprises the pulse light source 302, a pulse extraction section 305, the optical fiber 311, and the optical amplifier 318. The constitution of the pulse light source 302 and optical fiber 311 is the same as that of the light source apparatuses 301a and 301b and, hence, a detailed description thereof is omitted.

The pulse extraction section 305 comprises frequency adjustment means for changing the frequency of repetition of the SC optical pulse train P2. The pulse extraction section 305 is disposed so as to be optically connected between the pulse light source 302 and optical fiber 311 and comprises an optical switch 351 and signal generator 352. The optical switch 351 is a constituent element for extracting optical pulses cyclically from the optical pulse train P1 emitted by the pulse light source 302. Further, the signal generator 352 is a constituent element for driving the optical switch 351.

The signal generator 352 sends an electrical pulse signal of a cycle which is an integer multiple of the repetition cycle of the optical pulse train P1 to the optical switch 351. Thus, the optical pulses that match the timing of the electrical pulse signal among the optical pulses contained in the optical pulse train P1 are emitted by the pulse extraction section 305. Thus, the pulse extraction section 305 is able to change the frequency of repetition of the optical pulse train P1 that enters the optical fiber 311 by extracting the optical pulses cyclically from the optical pulse train P1 emitted by the pulse light source 302. Further, the frequency of repetition of the SC optical pulse train P2 emitted by the optical fiber 311 matches the frequency of repetition of the optical pulse train P1 entering the optical fiber 311. Therefore, with the light source apparatus 301c, the frequency of repetition of the SC optical pulse train P2 can be suitably changed. The signal generator 352 may be provided outside the light source apparatus 301c.

The pulse extraction cycle of the pulse extraction section 305 is preferably changeable. Accordingly, the freedom with which the frequency of repetition of the SC optical pulse train P2 is changed increases. Therefore, an increase in the freedom of adjustment of the synchronization corresponding with the frequency characteristic of the optical detector installed outside the light source apparatus 301c and an increase in the freedom of adjustment of the synchronization corresponding with the travel speed of the image processing apparatus installed outside the light source apparatus 301c.

The optical amplifier 318 is installed so as to be optically connected between the pulse extraction section 305 and optical fiber 311. The optical amplifier 318 amplifies the optical pulse train P1 after same is extracted by the pulse extraction section 305. The light source apparatus 301c preferably comprises such an optical amplifier 318. In this case, the high-power optical pulse train P1 can be efficiently generated and, therefore, the spectrum of the SC optical pulse train P2 can be efficiently afforded a wider bandwidth.

Second Modified Example of the Third Embodiment

The area (b) of FIG. 36 shows the constitution of the second modified example of the light source apparatus according to the third embodiment. The light source apparatus 301d according to the second modified example shown in the area (b) of FIG. 36 comprises the pulse light source 302, a signal generator 306, the optical fiber 311, and an optical amplifier 312. The constitution of the pulse light source 302 and optical fiber 311 are the same as that for the light source apparatuses 301a and 301b above.

The signal generator 306 is included in the frequency adjustment means for changing the frequency of repetition of the SC optical pulse train P2. The signal generator 306 changes the frequency of repetition when the pulse light source 302 emits the optical pulse train P1. For example, in cases where the pulse light source 2 is the pulse light source 302a shown in FIG. 29, the signal generator 306 corresponds to the signal generator 322b. Further, in cases where the pulse light source 302 is the pulse light source 302b shown in FIG. 30, the signal generator 306 corresponds to the signal generator 324c. Thus, the frequency of repetition of the SC optical pulse train P2 can be changed by means of a simple constitution as a result of the signal generator 306 directly controlling the pulse light source 302 to change the frequency of repetition of the optical pulse train P1.

The optical amplifier 312 is included in the pulse intensity adjustment means for changing the maximum power of the respective pulses included in the optical pulse train P1. The optical amplifier 312 is optically coupled between the pulse light source 302 and optical fiber 311. The optical amplifier 312 is a constituent element for amplifying the optical pulse train P1 emitted by the pulse light source 302 which is constituted by an erbium-doped fiber (EDF), for example. The optical amplifier 312 is used to keep the temporal average power of the optical pulse train P1 entering the optical fiber 311 constant or to control the maximum power and the spectrum intensity of the respective pulses included in the SC optical pulse train P2 while keeping the spectral shape of the SC optical pulse train P2 substantially constant. The light source apparatus according to the third embodiment is not limited to the light source apparatus 301d according to the second modified example and preferably comprises the optical amplifier 312. Further, the light source apparatus according to the third embodiment may comprise an optical attenuator in place of the optical amplifier 312 or may have a constitution in which the optical coupling efficiency between the pulse light source 302 and optical fiber 311 is changed by utilizing the optical axis shift between pulse light source 302 and optical fiber 311.

In addition, the light source apparatus according to the third embodiment may comprise polarization adjustment means for changing the polarization direction of the optical pulse train P1 entering the optical fiber 311 in place of the optical amplifier 312. In cases where the polarization dependence of the optical fiber 311 is relatively large, by providing such polarization adjustment means between the pulse light source 302 and optical fiber 311, the maximum power and spectrum intensity of the respective pulse light contained in the SC optical pulse train P2 can be suitably controlled while the spectral shape of the SC optical pulse train P2 is kept substantially constant.

Third Modified Example of the Third Embodiment

The area (a) of FIG. 37 is a block diagram showing the constitution of the third modified example of the light source apparatus according to the third embodiment. The light source apparatus 301e according to the third modified example shown in the area (a) of FIG. 37 comprises the pulse light source 302, a control section 307, and the optical fiber 311. The constitution of the pulse light source 302 and optical fiber 311 is the same as that of the light source apparatuses 301a and 301b.

The control section 307 is included in the frequency adjustment means for changing the frequency of repetition of the SC optical pulse train P2. The control section 307 sends the control signal S1 for changing the cavity length of the pulse light source 302 to the pulse light source 302. Accordingly, the frequency of repetition of the optical pulse train P1 emitted by the pulse light source 302 is changed and, as a result, the frequency of repetition of the SC optical pulse train P2 is changed. The control signal S1 is sent to a signal generator or the like for controlling the position of the mirror 327c and saturable absorber mirror 325 of the pulse light source 302c of the third constitution shown in FIG. 31, for example. Further, the length of the cavity CA can be changed as a result of changing the position of the mirror 327c and saturable absorber mirror 325 in accordance with the control signal S1. Accordingly, the frequency of repetition of the SC optical pulse train P2 can be suitably controlled.

The control section 307 of the third modified example is temperature control means for controlling the temperature of the optical fiber 311. In other words, the control section 307 sends the control signal S2 for performing temperature control of the optical fiber 311 to a temperature control element such as a Peltier element that is provided in the optical fiber 311. As a result, because the dispersion characteristic of the optical fiber 311 can be suitably changed, the maximum power and spectrum intensity of the respective pulses contained in the SC optical pulse train P2 can be suitably controlled while keeping the spectral shape of the SC optical pulse train P2 substantially constant. The light source apparatus according to the third embodiment is not limited to the light source apparatus 301e according to the third modified example and preferably comprises such temperature control means.

Fourth Modified Example of the Third Embodiment

The area (b) of FIG. 37 is a block diagram showing the constitution of the fourth modified example of the light source apparatus according to the third embodiment. The light source apparatus 301f according to the third modified example
shown in the area (b) of FIG. 37 comprises the pulse light source 302, a control section 308, the optical fiber 311, an optical amplifier 313, and a frequency control section 314. The constitution of the pulse light source 302 and optical fiber 311 is the same as that of the light source apparatuses 301a and 301b above.

The optical amplifier 313 is included in the pulse intensity adjustment means for changing the maximum power of the respective pulses contained in the optical pulse train P1 and has the same constitution as that of the optical amplifier 312 of the second modified example above. However, the optical amplifier 313 of the fourth modified example has a variable gain and receives the control signal S3 for controlling the gain from the control section 308. Therefore, the optical amplifier 313 amplifies the optical pulse train P1 from the pulse light source 302 by means of a gain that corresponds with the control signal S3. As per the second modified example, the light source apparatus 301f according to the fourth modified example may comprise an optical attenuator whose attenuation rate is variable in place of the optical amplifier 313 or may have a constitution in which the optical coupling efficiency between the light source 302 and optical fiber 311 is changed by utilizing the optical axis shift between the pulse light source 302 and optical fiber 311.

The frequency control section 314 is included in the frequency adjustment means for changing the frequency of repetition of the SC optical pulse train P2. The frequency control section 314 has an internal constitution that is similar to that of the pulse extraction section 305 of the first modified example shown in the area (a) of FIG. 36 or the time division multiplexing processing sections 303 and 304 of the light source apparatuses 301a and 301b shown in the areas (a) and (b) in FIG. 28, for example. In other words, the frequency control section 314 changes the frequency of repetition of the SC optical pulse train P2 by increasing or reducing the optical pulse contained in the SC optical pulse train P2. The frequency control section 314 receives the control signal S4 for controlling the frequency of repetition of the SC optical pulse train P2 from the control section 308 and increases or reduces the optical pulse of the SC optical pulse train P2 to establish the frequency of repetition that corresponds with the control signal S4. As a result, the frequency of repetition of the SC optical pulse train P2 can be suitably changed. Furthermore, in cases where the frequency control section 314 has an internal constitution that is the same as that of the pulse extraction section 305 (area (a) of FIG. 36), the average power of the SC optical pulse train P2 can be easily adjusted downward.

The control section 308 sends control signal S1 for changing the cavity length of the pulse light source 302 to the pulse light source 302 as per the control section 307 of the third modified example in addition to the control signals S3 and S4. Further, the control section 308 sends the control signal S2 for performing temperature control of the optical fiber 311 to a temperature control element such as a Peltier element that is provided in the optical fiber 311.

Fifth Modified Example of the Third Embodiment

Figure 38:
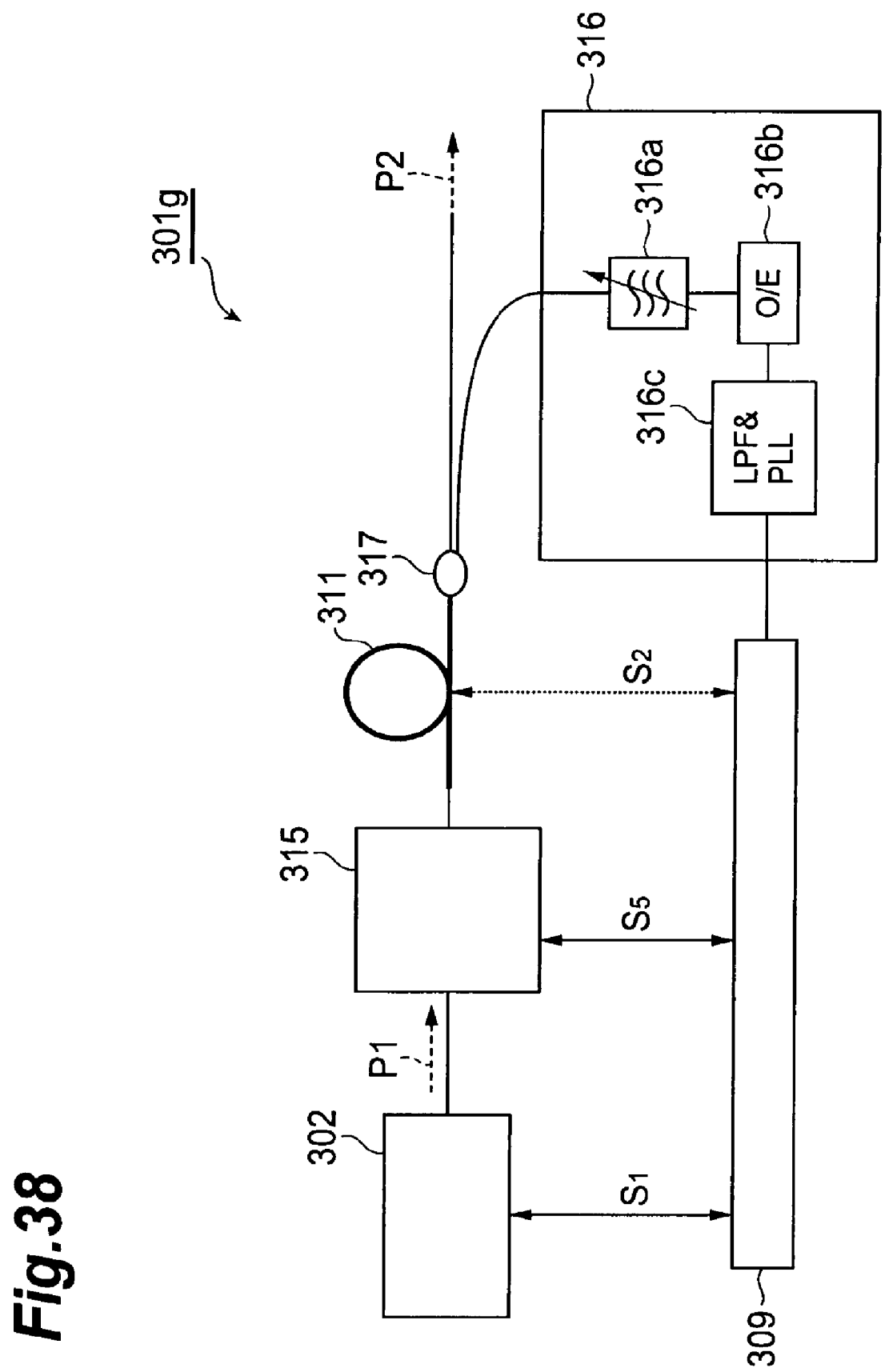
FIG. 38 is a block diagram showing the constitution of the fifth modified example of the light source apparatus according to the third embodiment.

FIG. 38 is a block diagram showing the constitution of the fifth modified example of the light source apparatus according to the third embodiment. The light source apparatus 301g according to the fifth modified example shown in FIG. 38 comprises a pulse light source 2, a control section 309, the optical fiber 311, a frequency control section 315, a detector 316, and a divider 317. The constitution of the pulse light source 302 and optical fiber 311 is the same as that of the light source apparatuses 301a and 301b above.

The frequency control section 315 is included in the frequency adjustment means for changing the frequency of repetition of the SC optical pulse train P2. The frequency control section 315 has an internal constitution that is the same as that of the pulse extraction section 305 of the first modified example shown in the area (a) of FIG. 36 or the time division multiplexing processing sections 303 and 304 of the light source apparatuses 301a and 301b shown in the areas (a) and (b) in FIG. 28, for example. In other words, the frequency control section 315 changes the frequency of repetition of the SC optical pulse train P2 by increasing or reducing the optical pulses contained in the optical pulse train P1. The frequency control section 315 receives control signal 55 for controlling the frequency of repetition of the SC optical pulse train P2 from the control section 309 and increases or reduces the optical pulse of the optical pulse train P1 to establish the frequency of repetition corresponding with the control signal S5.

The detector 316 is included in the detection means for detecting the frequency of repetition of the SC optical pulse train P2. The detector 316 is optically connected via the divider 317 to the exit end of the optical fiber 311 and captures a portion of the SC optical pulse train P2. The detector 316 comprises a wavelength-variable filter 316a, an optical detection element 316b, and a PLL circuit 316c. A portion of the SC optical pulse train P2 captured by the detector 316 is O/E converted by the optical detection element 316b after passing through the wavelength-variable filter 316a to produce a cyclical electrical signal. Further, the frequency of repetition of the PLL circuit 316c is detected on the basis of the electrical signal. The value of the detected frequency of repetition is sent to the control section 309.

The control section 309 generates control signal 51 changing the cavity length of the pulse light source 302, control signal S2 for performing temperature control of the optical fiber 311 and control signal S5 for controlling the frequency control section 315 on the basis of the frequency of repetition of the SC optical pulse train P2 detected by the detector 316. The control signals S1, S2 and S5 thus generated are sent to the pulse light source 302, the temperature control element of the optical fiber 311, and the frequency control section 315.

The light source apparatus according to the third embodiment preferably comprises a detector 316 for detecting the frequency of repetition of the SC optical pulse train P2 that is optically connected to the exit end of the optical fiber 311 as per the fifth modified example. As a result of the frequency of repetition of the SC optical pulse train P2 being detected by the detector 316, the frequency of repetition can be fed back to the frequency adjustment means such as the frequency control section 315. Consequently, highly accurate and stable control of the frequency of repetition can be performed.

Sixth Modified Example of the Third Embodiment

Figure 39:
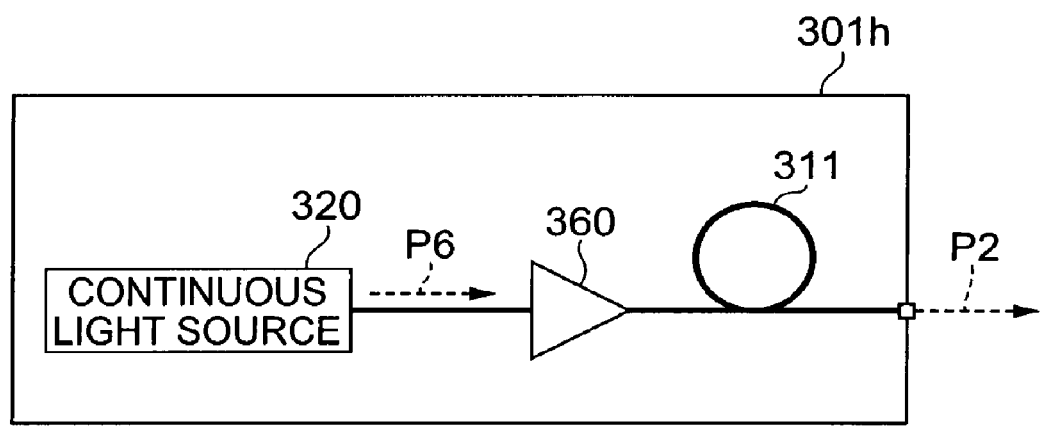
FIG. 39 is a block diagram showing the constitution of the sixth modified example of the light source apparatus according to the third embodiment.

FIG. 39 is a block diagram of the constitution of the sixth modified example of the light source apparatus according to the third embodiment. The light source apparatus 301h according to the sixth modified example shown in FIG. 39 comprises the continuous light source 320, optical amplifier 360, and optical fiber 311. The constitution of the optical fiber 311 is the same as that of the light source apparatuses 301a and 301b.

The continuous light source 320 according to the sixth modified example is a seed light source that emits continuous light P6. The continuous light source 320 supplies continuous light P6 to the optical fiber 311 via the optical amplifier 360. Further, even when the light entering the optical fiber 311 is continuous light, provided that the continuous light has relatively high power, the SC optical pulse train P2 can be generated in the optical fiber 311.

The optical amplifier 360 is frequency adjustment means for changing the frequency of repetition of the SC optical pulse train P2. More specifically, the optical amplifier 360 changes the frequency of repetition of the SC optical pulse train P2 by changing the power of the continuous light P6. In other words, when the power of the continuous light P6 introduced to the optical fiber 311 is changed, the conditions of the pulses generated in the optical fiber 311 (SC optical pulse train P2) change. As a result, the frequency of repetition of the SC optical pulse train P2 changes. Essentially, the generation of wideband light using the continuous light realized through the generation of soliton pulses that arise as a result of fluctuations in the input intensity, and the frequency shift and division of the soliton pulses and the temporal interval of the generated pulses is therefore random. Hence, the temporal interval of the generated pulses changes and, therefore, in a macro view, it is considered possible to monitor increases and decreases in the frequency of repetition. A shortening of the measurement time for temporal degradation measurement and an increase in the optical SN are achieved with the sixth modified example.

According to the sixth modified example, the power of the continuous light P6 received by the optical fiber 311 is preferably equal to or more than 500 mW. In this case, because the pulse conditions in the optical fiber 311 can be suitably changed, the frequency of repetition of the SC optical pulse train P2 can be suitably changed.

The light source apparatus according to the third embodiment is not limited to the above constitution; a variety of modifications and the addition of constituent elements are possible. For example, in the case of the light source apparatus according to the third embodiment, the optical waveguide for emitting the SC optical pulse train outside the apparatus may comprise a curved portion and the curvature of the curved portion may be variable. As a result of the provision of such a curved portion in the optical waveguide of the SC optical pulse train, an optional bend loss can be supplied to the SC optical pulse train to change the spectral shape.

Further, in each of the above modified examples, an optical amplifier and optical attenuator are used in order to increase and decrease the maximum power of the respective pulses contained in the optical pulse train P1. Otherwise, the maximum power of the respective pulses contained in the optical pulse train P1 may be increased and decreased by increasing and decreasing the output power of the semiconductor laser device (semiconductor laser device 321) used for excitation of the seed light source (pulse light sources 302a to 302c and so forth), for example. The output power of the semiconductor laser device can be easily controlled by increasing and decreasing the drive current amount and, therefore, with this constitution, the spectral shape of the SC optical pulse train can be controlled easily by means of one parameter.

When the light source apparatus comprises an optical amplifier, the spectral shape of the light output by the optical amplifier may also be different from the spectral shape of the light that is input to the optical amplifier or optical attenuator. In such a case, by considering the change in the spectral shape of the optical amplifier, the spectrum intensity or maximum power of the respective optical pulses can be controlled freely while maintaining the spectral shape of the SC optical pulse train P2 that is output from the optical fiber. In addition, in order to implement this characteristic, a change in the spectral shape in the optical amplifier is also suitably optimally designed beforehand.

Further, in the light source apparatus according to the third embodiment, the temporal waveform of the respective pulses of the optical pulse train P1 input to the optical fiber may also be variable. By changing the temporal waveform of the respective pulses in accordance with the change in the average power of the optical pulse train P1, only the maximum power and spectrum intensity of the respective pulses contained in the SC optical pulse train P2 can be controlled while keeping the spectral shape of the SC optical pulse train P2 substantially constant.

In the light source apparatus according to the third embodiment, the center wavelength of the optical pulse train P1 that is introduced to the optical fiber may also be variable. By changing the center wavelength together with the temporal waveform of the respective pulses and the average power of the optical pulse train P1 in accordance with the dispersion characteristic of the optical fiber, only the maximum power and spectrum intensity of the respective pulses contained in the optical pulse train P2 can be controlled while keeping the spectral shape of the SC optical pulse train P2 substantially constant.

With the light source apparatus according to the third embodiment, the spectral shape of the optical pulse train P1 input to the optical fiber can also be changed. By changing the spectral shape together with the average power of the optical pulse train P1, the temporal waveform of the respective pulses, and the center wavelength and so forth, only the maximum power and spectrum intensity of the respective pulses contained in the SC optical pulse train P2 can be controlled while keeping the spectral shape of the SC optical pulse train P2 substantially constant.

In addition, the light source apparatus according to the third embodiment may also comprise, at the exit end of the optical fiber, an optical attenuator that has a variable attenuation rate and changes the spectrum intensity or maximum power of the respective optical pulses while maintaining the spectral shape of the SC optical pulse train P2. With this constitution, only the maximum power and spectrum intensity of the respective pulses contained in the SC optical pulse train P2 can be controlled while the spectral shape of the SC optical pulse train P2 is kept substantially constant. Further, for such an optical attenuator, the wavelength dependence of the optical transmission characteristic is preferably small enough to be negligible in the spectral bandwidth of the SC optical pulse train P2. Further, for an optical attenuator of this kind, the wavelength dependence of the optical transmission characteristic at the desired wavelength while the variable attenuation amount is 10 dB is preferably small enough to be negligible. In this case, the desired part within the wavelength region in the spectral shape of the SC optical pulse train P2 is extracted and the shape thereof maintained and only the maximum power and spectrum intensity of the respective pulses contained in the SC optical pulse train P2 can be controlled.

In addition, the light source apparatus according to the third embodiment may also comprise, at the output end of the optical fiber, an optical amplifier of a variable attenuation rate for changing the spectrum intensity or maximum power of the respective optical pulses while maintaining the spectral shape of the SC optical pulse train P2. With this constitution, only the maximum power and spectrum intensity of the respective pulses contained in the SC optical pulse train P2 can be controlled while keeping the spectral shape of the SC optical pulse train P2 substantially constant.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The light source apparatus according to the present invention can be suitably applied as a light source in a variety of optical measuring apparatuses that utilize light of the near-infrared region.

The invention claimed is:

1. A light source apparatus, comprising:
a seed light source emitting seed light;
an optical fiber optically connected to said seed light source, said optical fiber generating supercontinuum light the spectral width of which is enlarged in response to the input of seed light from said seed light source; and
spectrum shaping means for partially or completely deforming the spectral shape of the supercontinuum light generated in said optical fiber, said spectrum shaping means including a curved portion that has a variable curvature and is formed in an optical waveguide for emitting the supercontinuum light outside said light source apparatus, and a control section capable of changing the curvature,
wherein said spectrum shaping means changes the spectral shape of the supercontinuum light by adding the supercontinuum light with a predetermined bending loss.

* * * * *